United States Patent
Ohta

[11] Patent Number: 6,108,253
[45] Date of Patent: Aug. 22, 2000

[54] FAILURE ANALYSIS SYSTEM, FATAL FAILURE EXTRACTION METHOD AND RECORDING MEDIUM

[75] Inventor: Fumihito Ohta, Tokyo, Japan

[73] Assignee: Mitsubishi Denki Kabushiki Kaisha, Tokyo, Japan

[21] Appl. No.: 09/401,848

[22] Filed: Sep. 22, 1999

[30] Foreign Application Priority Data

Apr. 13, 1999 [JP] Japan ................... 11-105456

[51] Int. Cl.[7] .................... G11C 29/00
[52] U.S. Cl. .......... 365/201; 365/200; 714/718; 714/799
[58] Field of Search ................. 365/200, 201; 714/718, 799, 723, 46, 25

[56] References Cited

U.S. PATENT DOCUMENTS

| | | | |
|---|---|---|---|
| 5,844,850 | 12/1998 | Tsutsui et al. | 365/200 |
| 5,946,214 | 8/1999 | Heavlin et al. | 365/200 |
| 6,009,545 | 12/1999 | Tsutsui et al. | 714/718 |

FOREIGN PATENT DOCUMENTS 10-222998 8/1998 Japan .................. G11C 29/00

*Primary Examiner*—Son Mai
*Attorney, Agent, or Firm*—Oblon, Spivak, McClelland, Maier & Neustadt, P.C.

[57] ABSTRACT

An EWS for data analysis automatically performs automatic fatal failure extract processing on the basis of FBM information accumulated in a computer for a tester. In the automatic fatal failure extract processing, X-line repair judgment processing and Y-line repair judgment processing are continuously performed so that the X-line repair processing is performed in consideration of failures in a Y-line direction, and the Y-line repair judgment processing is performed in consideration of failures in an X-line direction. Further, the failures in the Y-line and X-line directions are taken into consideration from maximum ability decided by Y-line substitutability and X-line substitutability to zero. Thus provided is a failure analysis system capable of automatically investigating the cause for fatal failures.

18 Claims, 39 Drawing Sheets

FIG. 12

| | | | | | | | |
|---|---|---|---|---|---|---|---|
| $a(1,1)=a$ | $a(2,1)=a$ | $a(3,1)=a$ | $a(4,1)=a$ | ⋮ | $a\left(\dfrac{n}{n1 \cdot nx}-2,\,1\right)=a$ | $a\left(\dfrac{n}{n1 \cdot nx}-1,\,1\right)=a$ | $a\left(\dfrac{n}{n1 \cdot nx},\,1\right)=a$ |
| $a\left(1,\dfrac{m}{m1 \cdot mx}\right)=a$ | $a\left(2,\dfrac{m}{m1 \cdot mx}\right)=a$ | $a\left(3,\dfrac{m}{m1 \cdot mx}\right)=a$ | $a\left(4,\dfrac{m}{m1 \cdot mx}\right)=a$ | ⋮ | $a\left(\dfrac{n}{n1 \cdot nx}-2,\,\dfrac{m}{m1 \cdot mx}\right)=a$ | $a\left(\dfrac{n}{n1 \cdot nx}-1,\,\dfrac{m}{m1 \cdot mx}\right)=a$ | $a\left(\dfrac{n}{n1 \cdot nx},\,\dfrac{m}{m1 \cdot mx}\right)=a$ | nx PIXELS mx PIXELS

F I G . 1 3
| | ny PIXELS | |
|---|---|---|
| my PIXELS | b(1,1)=b | b(n/(n1·ny),1)=b |
| | b(1,2)=b | b(n/(n1·ny),2)=b |
| | ⋮ | ⋮ |
| | b(1,m/(m1·my)−1)=b | b(n/(n1·ny),m/(m1·my)−1)=b |
| | b(1,m/(m1·my))=b | b(n/(n1·ny),m/(m1·my))=b |
F I G . 1 4
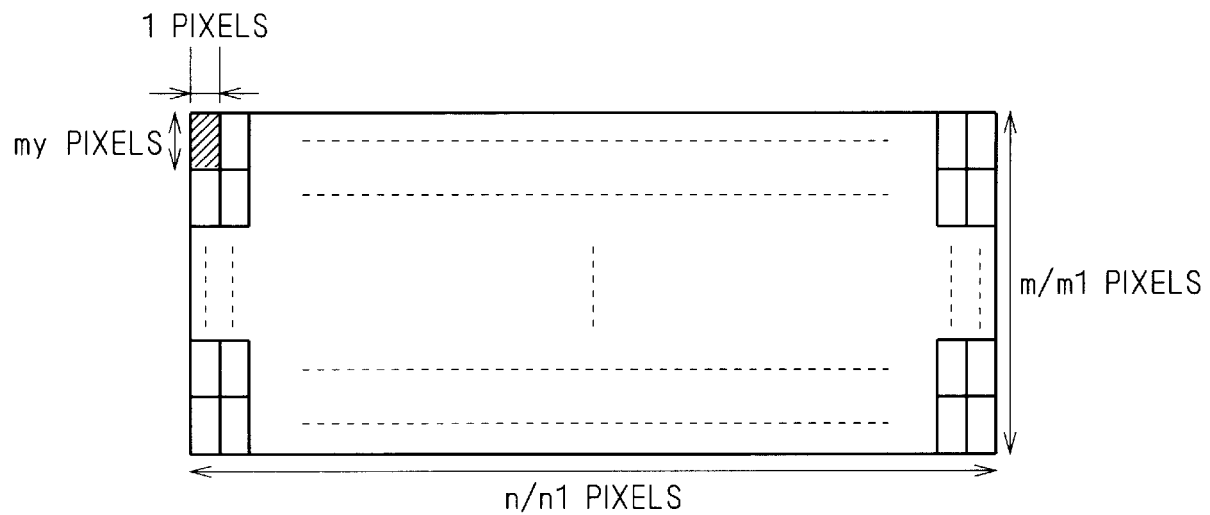

F I G . 15
F I G . 16
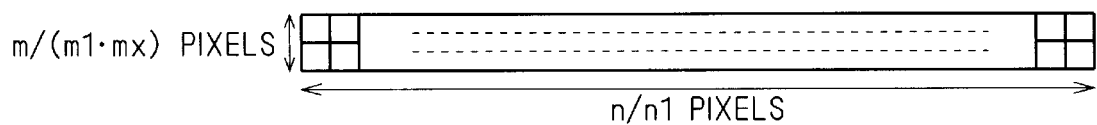
F I G . 17
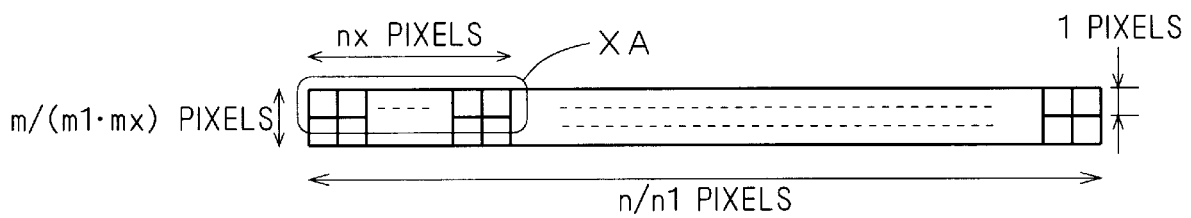

F I G . 1 8
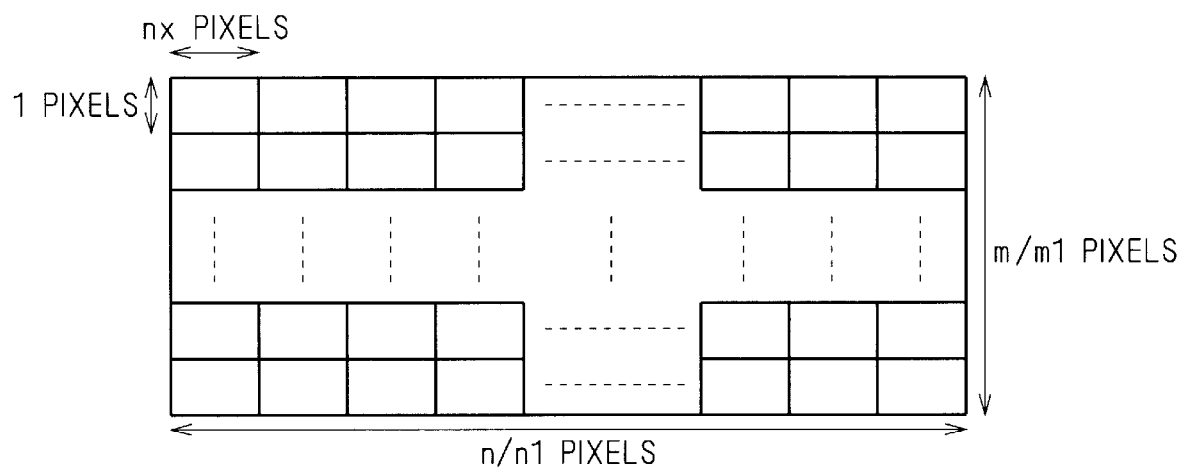
F I G . 1 9
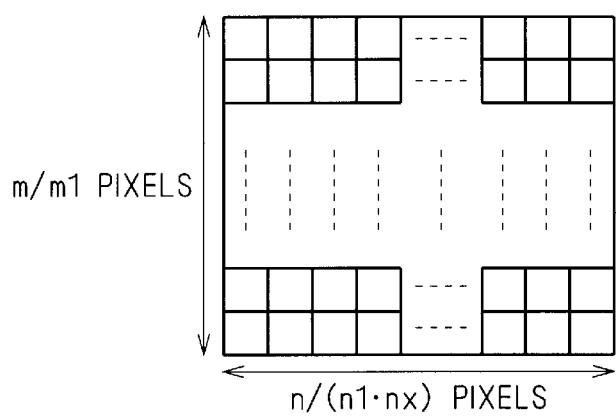

m/m1 PIXELS n/(n1·ny) PIXELS

1 PIXELS my PIXELS

YA

F I G . 3 1
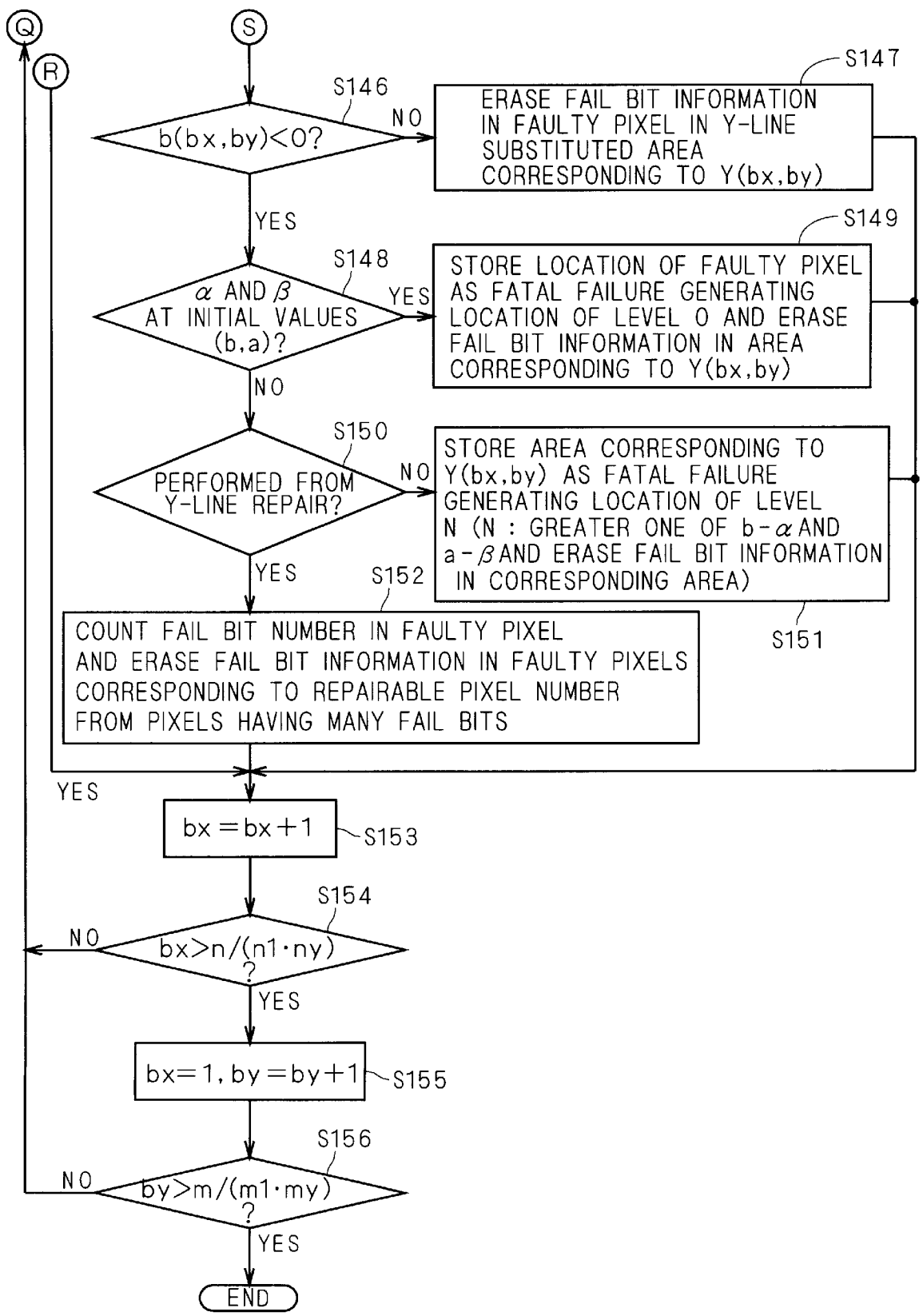

F I G . 3 2
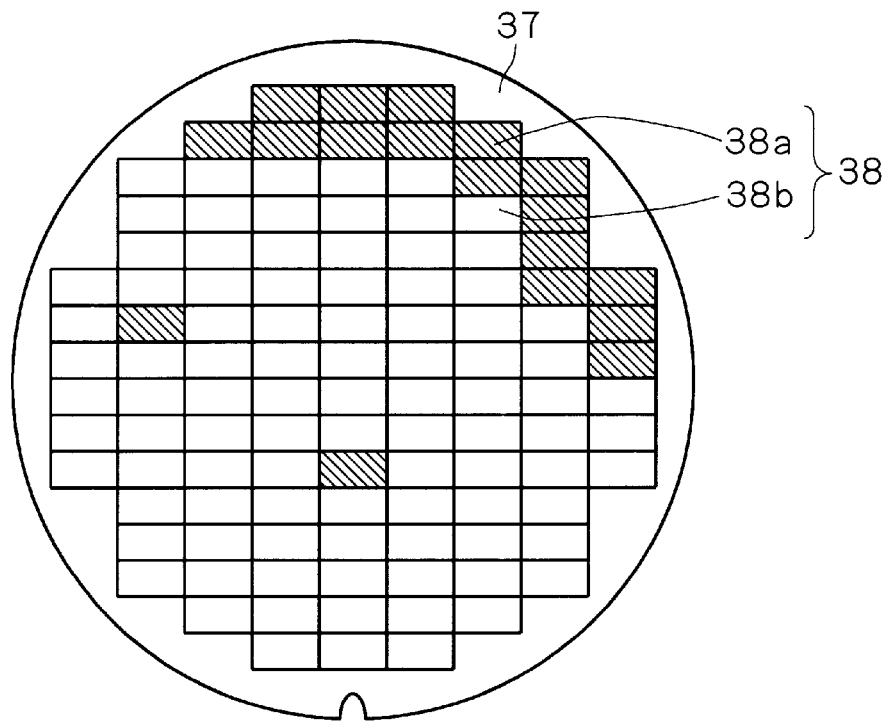
F I G . 3 3
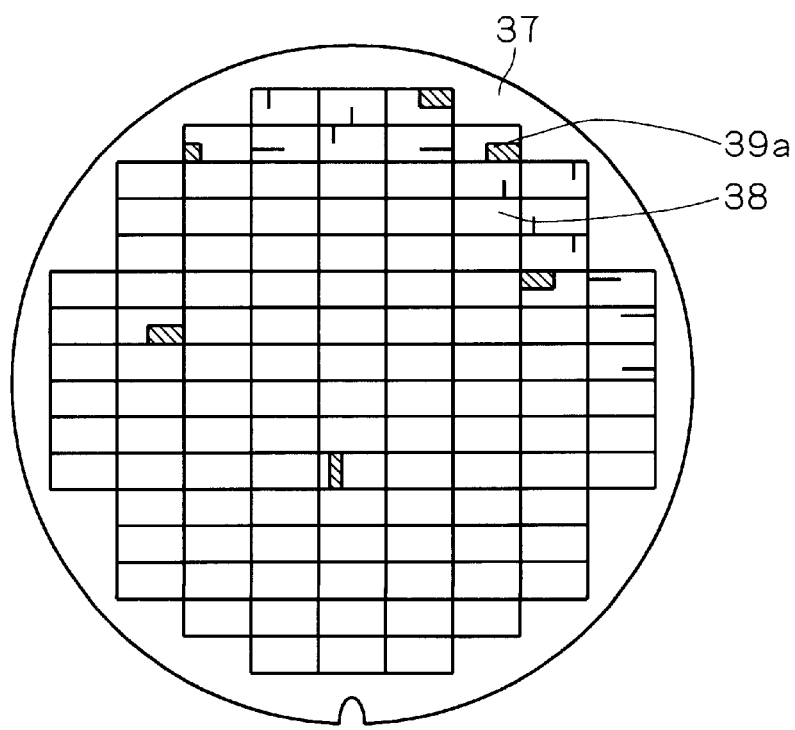

LEVEL A

F I G . 3 6
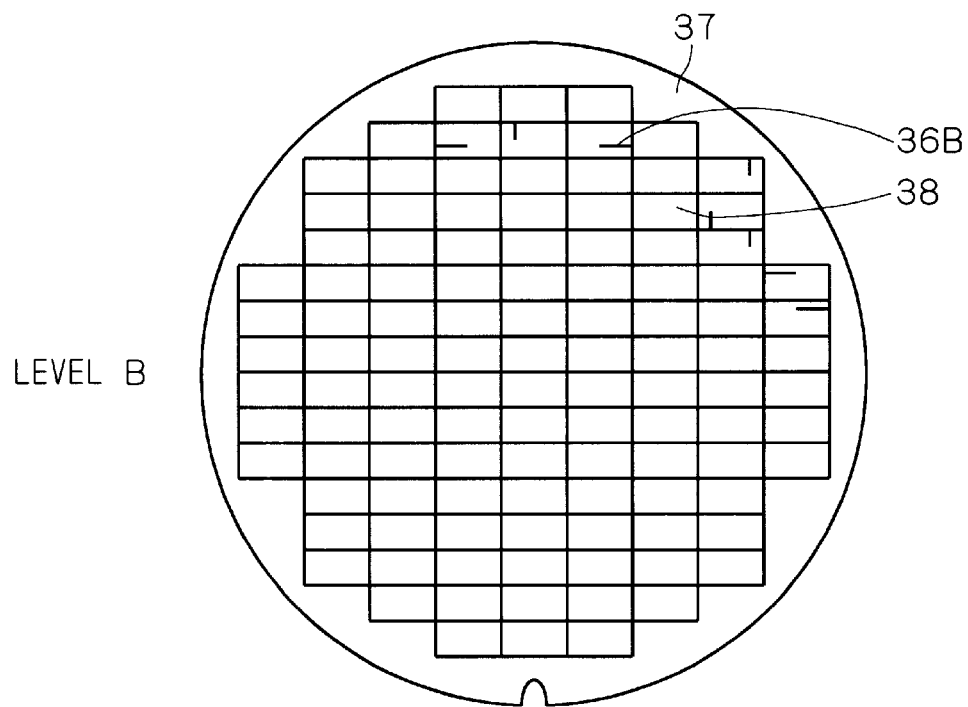
LEVEL B
F I G . 3 7
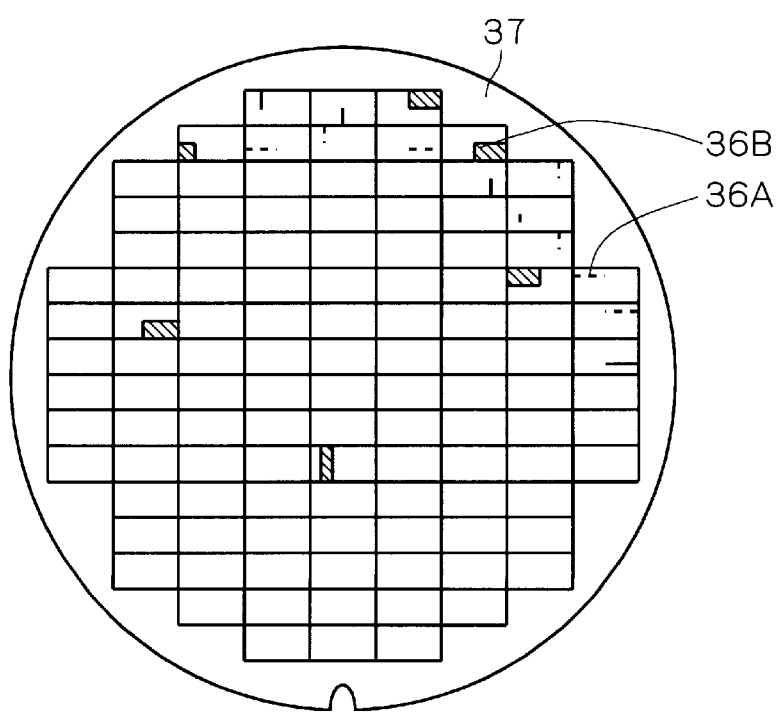

F I G . 4 1
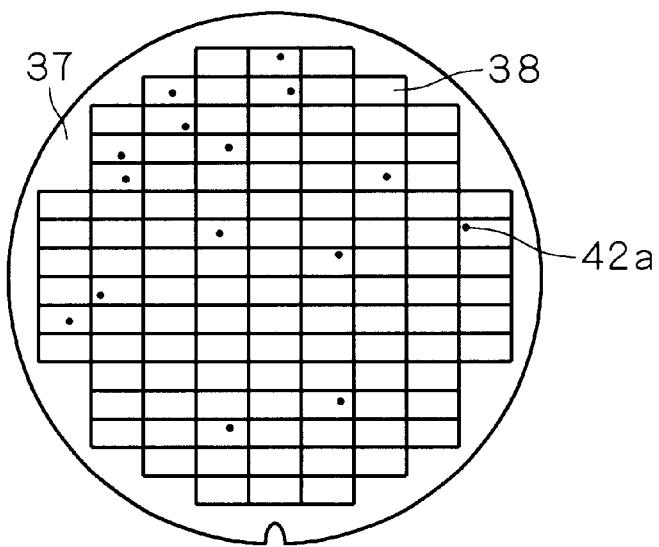
F I G . 4 2
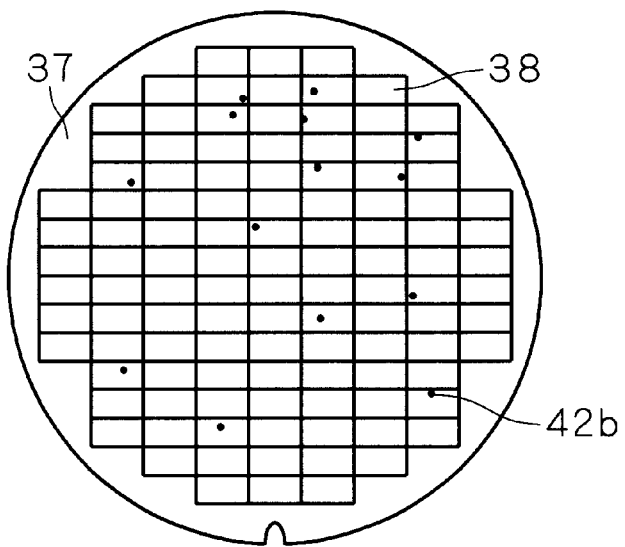

● : DISTRIBUTION OF FATAL DEFECTS (42a)

▲ : DEFECTS MATCHING WITH FAILURES OTHER THAN FATAL FAILURES (42b)

○ : DEFECTS NOT FORMING FAILURES (42c)

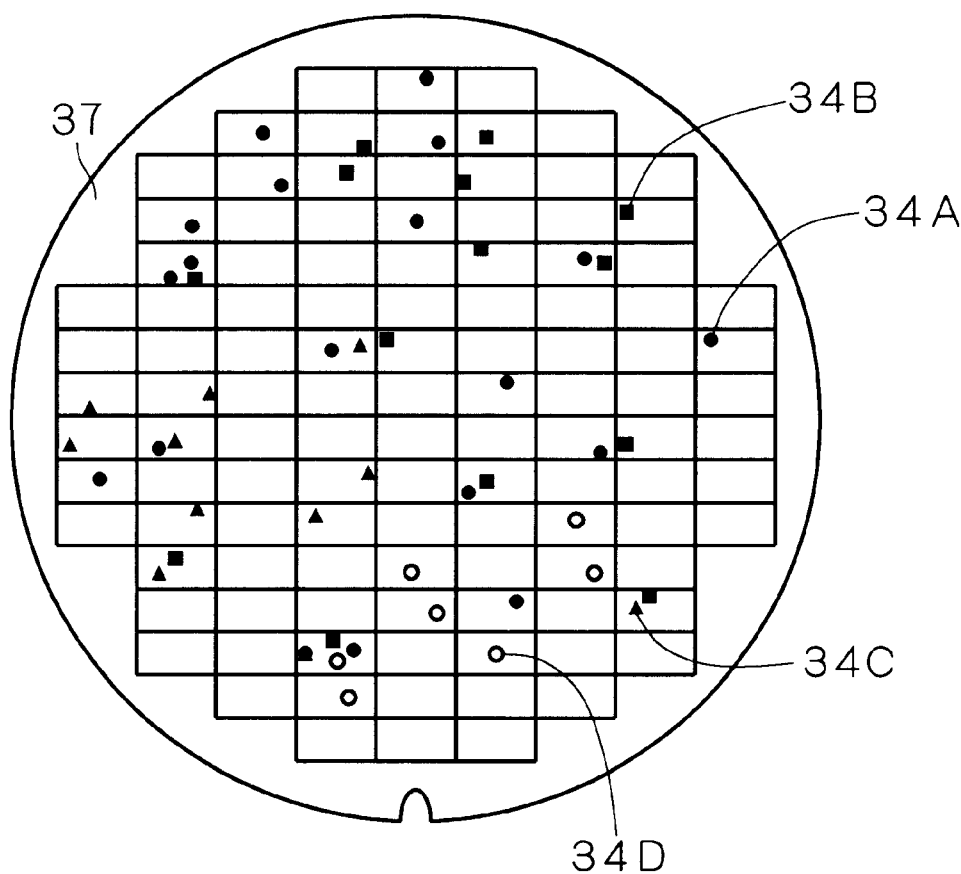
F I G . 49
- • : DISTRIBUTION OF FATAL DEFECTS OF LEVEL A (34A)
- ■ : DISTRIBUTION OF FATAL DEFECTS OF LEVEL B (34B)
- ▲ : DEFECTS MATCHING WITH FAILURES OTHER THAN FATAL FAILURES EVERY LEVEL (34C)
- ○ : DEFECTS NOT FORMING FAILURES (34D)

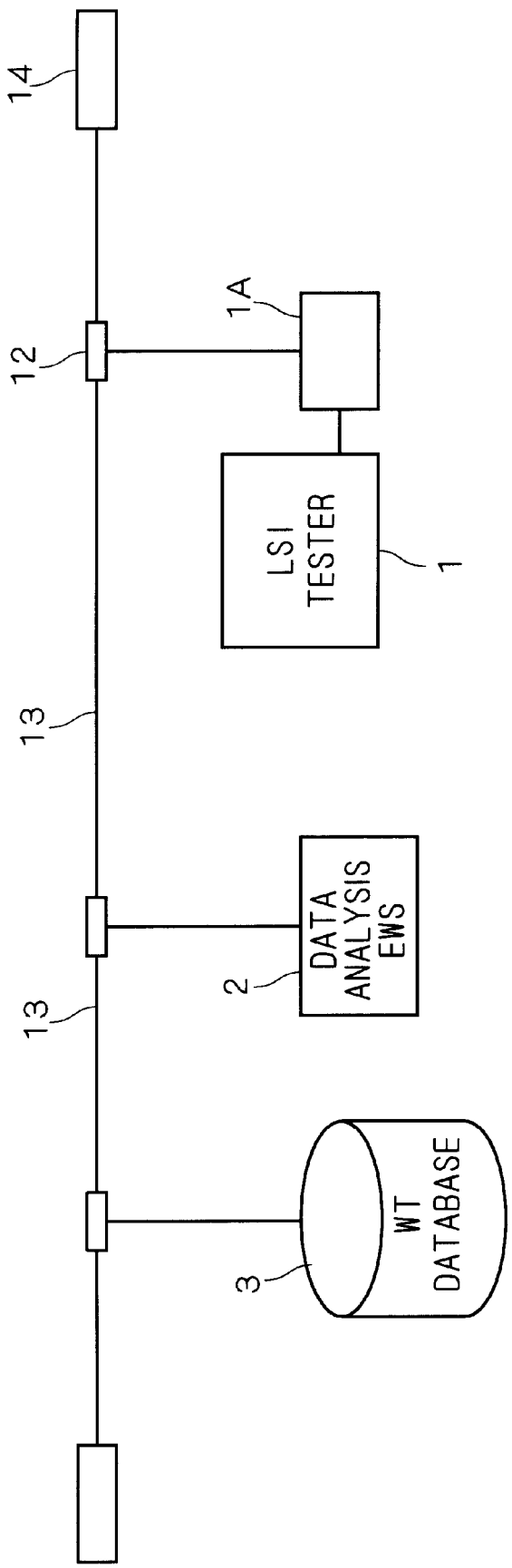

F I G . 5 1
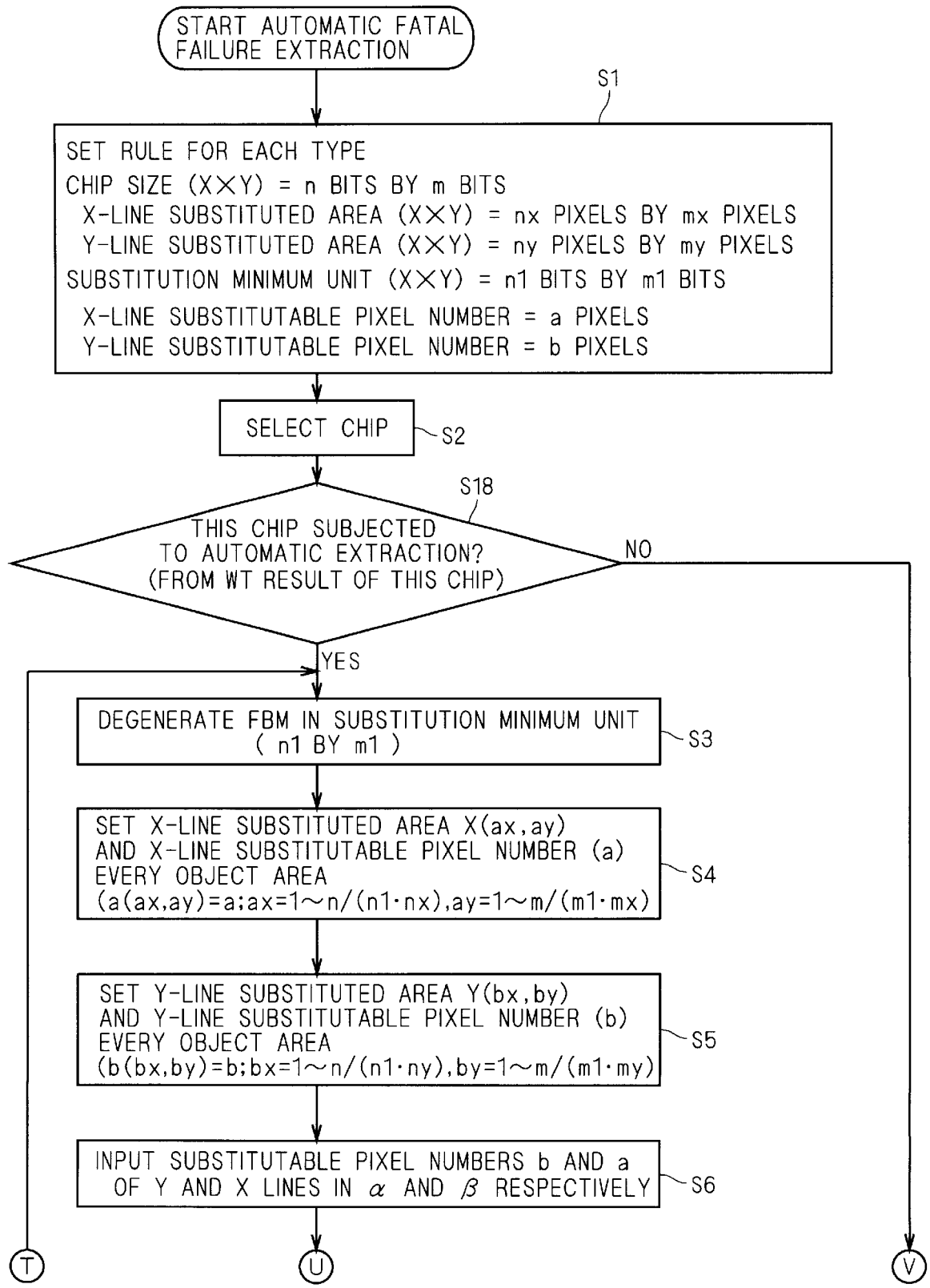

FAILURE ANALYSIS SYSTEM, FATAL FAILURE EXTRACTION METHOD AND RECORDING MEDIUM

BACKGROUND OF THE INVENTION

1. Field of the Invention

The present invention relates to a failure analysis system automatically extracting fatal failures of a semiconductor wafer formed with a plurality of chips each having a plurality of memory cells.

2. Description of the Background Art

As a failure analysis method for a semiconductor wafer formed with a plurality of semiconductor chips having a plurality of memory cells, generally arranged in the form of a matrix specified by rows and columns, a method employing a tester (also referred to as an LSI tester) is generally known. According to this method, all memory cells in the semiconductor wafer are tested in relation to electric characteristics so that memory cell failures detected as a result are displayed in a coordinate space defined by x-coordinates along the row direction and y-coordinates along the column direction in the form of failure patterns (generally a fail bit map, hereinafter abbreviated as FBM) for estimating the failure factors with the FBM.

In general, a semiconductor chip having a plurality of memory cells has redundancy (substitute) memory cells for repairing faulty memory cells, and can repair faulty memory cells in a range repairable with the redundancy memory cells. Therefore, failures in the semiconductor chip having a plurality of memory cells can be classified into repairable failures and unrepairable failures. The repairable failures and the unrepairable failures can be regarded as failures exerting no influence on the yield and fatal failures lowering the yield respectively. It is extremely important to know what kind of failures the unrepairable failures (hereinafter also referred to as fatal failures) are, in order to perform failure analysis of a semiconductor wafer formed with a plurality of semiconductor chips each having a plurality of memory cells.

In order to know what kind of failures the aforementioned fatal failures are, however, a failure analysis engineer merely manually extracts fatal failures from FBM information in general, to disadvantageously require excess time and limit the number of samples.

SUMMARY OF THE INVENTION

A first aspect of the present invention is directed to a failure analysis system for a wafer for analysis having a plurality of chips. Each of the plurality of chips has a plurality of memory cells arranged in the form of a matrix defined in an X-direction and a Y-direction and a substitute memory cell group capable of substituting for a faulty memory cell among the plurality of memory cells, and the substitute memory cell group is substitutable with prescribed X-directional substitutability and prescribed Y-directional substitutability in the X- and Y-directions. The failure analysis system comprises memory cell test means detecting non-faultiness/faultiness of the plurality of memory cells in each of the plurality of chips and outputting a memory cell test result adding fail bit information with respect to a faulty memory cell, and data analysis means executing automatic fatal failure extract processing including consecutive processing of X-directional repair judgment processing with the X-directional substitutability in consideration of failures in the Y-direction and with the Y-directional substitutability in consideration of failures in the X-direction and fatal failure accumulation processing on the basis of the memory cell test result, while the X-directional repair judgment processing includes steps (a) and (b) of degenerating the plurality of memory cells to a plurality of X-directional substituted memory cell groups and judging non-faultiness/faultiness of each of the plurality of X-directional substituted memory cell groups on the basis of the fail bit information and predetermined Y-directional virtual substitutability in consideration of failures in the Y-direction and performing repair judgment on each of a first number of X-directional substituted memory cell groups in a range repairable on the basis of the X-directional substitutability, the first number of X-directional substituted memory cell groups being judged as faulty in the step (a) among the plurality of X-directional substituted memory cell groups, the Y-directional repair judgment processing includes steps (c) and (d) of degenerating the plurality of memory cells to a plurality of Y-directional substituted memory cell groups and judging non-faultiness/faultiness on each of the plurality of Y-directional substituted memory cell groups on the basis of the fail bit information and predetermined X-directional virtual substitutability in consideration of failures in the X-direction and performing repair judgment on each of a first number of Y-directional substituted memory cell groups in a range repairable on the basis of the Y-directional substitutability, the first number of Y-directional substituted memory cell groups being judged as faulty in the step (c) among the plurality of Y-directional substituted memory cell groups, and the fatal failure accumulation processing includes a step (e) of accumulating fatal fail bit information which is fail bit information of a memory cell unrepairable through the X-directional repair judgment processing and the Y-directional repair judgment processing among the fail bit information of the memory cell test result.

As described above, the data analysis means of the failure analysis system according to the first aspect of the present invention can automatically accumulate fatal fail bit information by executing the automatic fatal failure extract processing including the consecutive processing of the X-directional repair judgment processing with the X-directional substitutability in consideration of failures in the Y-direction and the Y-directional repair judgment processing with the Y-directional substitutability in consideration of failures in the X-direction and the fatal failure accumulation processing.

In this case, the X-directional repair judgment processing is performed in consideration of failures in the Y-direction and the Y-directional repair judgment processing is performed in consideration of failures in the X-direction, whereby relatively precise fatal fail bit information can be obtained.

According to a second aspect of the present invention, the Y-directional virtual substitutability includes a third number of Y-directionally set virtual substitutability set respectively from maximum ability decided by the Y-directional substitutability to zero, the X-directional virtual substitutability includes the third number of X-directionally set virtual substitutability set respectively from maximum ability decided by the X-directional substitutability to zero, the third number of X-directionally set virtual substitutability corresponds to the third number of Y-directionally set virtual substitutability, and the X-directional repair judgment processing and the Y-directional repair judgment processing are continuously performed the third number of times every third number of Y-directionally set virtual substitutability and the X-directionally set virtual substitutability for recognizing unrepairable fatal fail bit information per time.

In the failure analysis system according to the second aspect of the present invention, the Y-directional virtual substitutability and the X-directional virtual substitutability include the third number of Y-directionally set virtual substitutability and the third number of X-directionally set virtual substitutability set respectively from the maximum ability decided by the Y-directional substitutability and the X-directional substitutability respectively to zero and the X-directional repair judgment processing and the Y-directional repair judgment processing are continuously performed the third number of times continuously every third number of Y-directional virtual substitutability and every third number of X-directional virtual substitutability, whereby X-directional repair judgment processing and Y-directional repair judgment processing in consideration of failures in the Y-direction and the Y-direction finely along actual Y-directional substitutability and X-directional substitutability can be performed, and correct fatal fail bit information can be obtained as a result.

According to a third aspect of the present invention, the level of the fatal fail bit information is set at any of a plurality of previously set levels on the basis of at least one of the Y-directionally set virtual substitutability and the X-directionally set virtual substitutability when regarded as unrepairable in the X-directional repair judgment processing and the Y-directional repair judgment processing performed the third number of times, and the fatal failure accumulation processing accumulates the fatal fail bit information in classification into the plurality of levels.

In the failure analysis system according to the third aspect of the present invention, the level of the fatal fail bit information is set at any of the previously set plurality of levels on the basis of at least one of the Y-directionally set virtual substitutability and the X-directionally set virtual substitutability when judged as unrepairable in the X-directional repair judgment processing and the Y-directional repair judgment processing performed by the third number of times, whereby the risk of failures can be recognized by verifying the level of the fatal fail bit information.

According to a fourth aspect of the present invention, the Y-directional virtual substitutability includes first to Z-th Y-directionally set virtual substitutability subjected to first to Z-th ($Z \geq 2$) level setting and the X-directional virtual substitutability includes first to Z-th X-directionally set virtual substitutability subjected to the first to Z-th level setting, the X-directional repair judgment processing and the Y-directional repair judgment processing are continuously performed Z times for first to Z-th Y-directionally set virtual substitutability and X-directional virtual substitutability for recognizing unrepairable fatal fail bit information per time, the fatal fail bit information is classified as an i-th (i=any one of 1 to Z) level when recognized as unrepairable in i-th X-directional repair judgment processing and Y-directional repair judgment processing, and the fatal failure accumulation processing accumulates the fatal fail bit information in classification into first to Z-th levels.

In the failure analysis system according to the fourth aspect of the present invention, the fatal fail bit information can be classified as the i-th level when recognized as unrepairable in the i-th (i=any one of 1 to Z) X-directional repair judgment processing and Y-directional repair judgment processing, whereby the risk of failures can be recognized by verifying the level of the fatal fail bit information.

According to a fifth aspect of the present invention, the fatal failure accumulation processing further includes a step (f) of displaying a display wafer allowing visual recognition of a chip having the fatal fail bit information among the plurality of chips, the step (f) being performed after the step (e).

The fatal failure accumulation processing in the data analysis means of the failure analysis system according to the fifth aspect of the present invention includes the step (f) of displaying a display wafer allowing visual recognition of a chip having the fatal fail bit information among the plurality of chips, whereby distribution of fatal failure chips on the wafer can be recognized by observing the display wafer.

According to a sixth aspect of the present invention, the fatal failure accumulation processing further includes a step (f) of displaying a display wafer allowing visual recognition of a faulty area defined by the fatal fail bit information, the step (f) being performed after the step (e).

The fatal failure accumulation processing in the data analysis means of the failure analysis system according to the sixth aspect of the present invention includes the step (f) of displaying a display wafer allowing visual recognition of a faulty area defined by the fatal fail bit information, whereby distribution of fatal faulty areas on the wafer can be recognized by observing the display wafer.

According to a seventh aspect of the present invention, the fatal failure accumulation processing further includes a step (f) of displaying a display wafer allowing visual recognition of a faulty area defined by a non-fatal fail bit information obtained by excluding the fatal fail bit information from the fail bit information, the step (f) being performed after the step (e).

The fatal failure accumulation processing in the data analysis means of the failure analysis system according to the seventh aspect of the present invention includes the step (f) of displaying a display wafer allowing visual recognition of a faulty area defined by non-fatal fail bit information obtained by excluding the fatal fail bit information from the fail bit information, whereby distribution of non-fatal faulty areas on the wafer can be recognized by observing the display wafer.

According to an eighth aspect of the present invention, the fatal failure accumulation processing further includes steps (f) and (g) of displaying a first display wafer allowing visual recognition of a faulty area defined by the fatal fail bit information of a first level and displaying a second display wafer allowing visual recognition of a faulty area defined by the fatal fail bit information of a second level different from the first level, the steps (f) and (g) being performed after the step (e).

The fatal failure accumulation processing in the data analysis means of the failure analysis system according to the eight aspect of the present invention includes the steps (f) and (g) of displaying a first display wafer allowing visual recognition of a faulty area defined by the fatal fail bit information of a first level and displaying a second display wafer allowing visual recognition of a faulty area defined by the fatal fail bit information of a second level different from the first level, whereby distribution of fatal faulty areas of the first and second levels on the wafer can be recognized by observing the first and second display wafers respectively.

According to a ninth aspect of the present invention, the fatal failure accumulation processing further includes a step (f) of displaying a display wafer allowing identification and visual recognition of a faulty area defined by the fatal fail bit information of a first level and a faulty area defined by the fatal fail bit information of a second level different from the first level, the step (f) being performed after the step (e).

The fatal failure accumulation processing in the data analysis means of the failure analysis system according to the ninth aspect of the present invention includes the step (f) of displaying a display wafer allowing identification and visual recognition of a faulty area defined by the fatal fail bit information of a first level and a faulty area defined by the fatal fail bit information of a second level different from the first level, whereby distribution of fatal faulty areas of the first and second levels on the wafer can be simultaneously recognized by observing the display wafer.

According to a tenth aspect of the present invention, the failure analysis system further comprises defective area information supply means supplying defective area information defining a defective area including a pattern defect in the wafer for analysis, while the fatal failure accumulation processing further includes a step (f) of classifying the defective area defined by the defective area information obtained by the defective area information supply means into a fatal failure defective area existing in a first area based on a faulty area defined by the fatal fail bit information, a non-fatal failure defective area existing in a second area based on a faulty area defined by non-fatal fail bit information obtained by excluding the fatal fail bit information from the fail bit information and a non-influential defective area not existing in the first and second areas, the step (f) being performed after the step (e).

The fatal failure accumulation processing in the data analysis means of the failure analysis system according to the tenth aspect of the present invention includes the step (f) of classifying the defective area defined by the defective area information obtained by the defective area information supply means into a fatal failure defective area existing in a first area based on a faulty area defined by the fatal fail bit information, a non-fatal failure defective area existing in a second area based on a faulty area defined by non-fatal fail bit information obtained by excluding the fatal fail bit information from the fail bit information and a non-influential defective area not existing in the first and second areas, whereby defective areas can be classified in relation to the fatal fail bit information.

According to an eleventh aspect of the present invention, the fatal failure accumulation processing further includes steps (g), (h) and (i) of displaying a first display wafer allowing visual recognition of the fatal failure defective area, displaying a second display wafer allowing visual recognition of the non-fatal failure defective area and displaying a third display wafer allowing visual recognition of the non-influential defective area, the steps (g), (h), and (i) being performed after the step (f).

The fatal failure accumulation processing in the data analysis means of the failure analysis system according to the eleventh aspect of the present invention further includes the steps (g), (h) and (i) of displaying a first display wafer allowing visual recognition of the fatal failure defective area, displaying a second display wafer allowing visual recognition of the non-fatal failure defective area and displaying a third display wafer allowing visual recognition of the non-influential defective area after the step (f), whereby distribution of fatal failure defective areas, non-fatal failure defective areas and non-influential defective areas on the wafer can be recognized respectively.

According to a twelfth aspect of the present invention, the fatal failure accumulation processing further includes a step (g) of displaying a display wafer allowing identification and visual recognition of each of the fatal failure defective area, the non-fatal failure defective area and the non-influential defective area, the step (g) being performed after the step (f).

The fatal failure accumulation processing in the data analysis means of the failure analysis system according to the twelfth aspect of the present invention includes the step (g) of displaying a display wafer allowing identification and visual recognition of each of the fatal failure defective area, the non-fatal failure defective area and the non-influential defective area after the step (f), whereby distribution of fatal failure defective areas, non-fatal failure defective areas and non-influential defective areas on the wafer can be simultaneously recognized by observing the display wafers respectively.

According to a thirteenth aspect of the present invention, the failure analysis system further comprises defective area information supply means supplying defective area information defining a defective area including a pattern defect in the wafer for analysis, while the fatal failure accumulation processing further includes a step (f) of classifying the defective area defined by the defective area information obtained by the defective area information supply means into a fatal failure defective area of a first level existing in a first area based on a faulty area defined by the fatal fail bit information of a first level, a fatal failure defective area of a second level existing in a second area based on a faulty area defined by the fatal fail bit information of a second level different from the first level, a non-fatal failure defective area existing in a third area based on a faulty area defined by non-fatal fail bit information obtained by excluding the fatal fail bit information of the first and second level from the fail bit information and a non-influential defective area not existing in the first to third areas, the step (f) being performed after the step (e).

The fatal failure accumulation processing in the data analysis means of the failure analysis system according to the thirteenth aspect of the present invention includes the step (f) of classifying the defective area defined by the defective area information obtained from the defective area information supply means into a fatal failure defective area of a first level existing in a first area based on a faulty area defined by the fatal fail bit information of a first level, a fatal failure defective area of a second level existing in a second area based on a faulty area defined by the fatal fail bit information of a second level different from the first level, a non-fatal failure defective area existing in a third area based on a faulty area defined by non-fatal fail bit information obtained by excluding the fatal fail bit information from the fail bit information and a non-influential defective area not existing in the first to third areas after the step (e), whereby the defective area can be classified in relation to the fatal fail bit information of the first and second levels.

According to a fourteenth aspect of the present invention, the fatal failure accumulation processing further includes steps (g), (h), (i) and (j) of displaying a first display wafer allowing visual recognition of the fatal failure defective area of the first level, displaying a second display wafer allowing visual recognition of the fatal failure defective area of the second level, displaying a third display wafer allowing visual recognition of the non-fatal failure defective area and displaying a fourth display wafer allowing visual recognition of the non-influential defective area, the steps (g), (h), (i), and (j) being performed after the step (f).

The fatal failure accumulation processing in the data analysis means of the failure analysis system according to the fourteenth aspect of the present invention includes the steps (g), (h), (i) and (j) of displaying a first display wafer allowing visual recognition of the fatal failure defective area of the first level, displaying a second display wafer allowing visual recognition of the fatal failure defective area of the second level, displaying a third display wafer allowing visual recognition of the non-fatal failure defective area and displaying a fourth display wafer allowing visual recognition of the non-influential defective area after the step (f), whereby distribution of fatal failure defective areas of the first and second levels, non-fatal failure defective areas and non-influential defective areas on the wafer can be recognized respectively by observing the first to fourth display wafers respectively.

According to a fifteenth aspect of the present invention, the fatal failure accumulation processing further includes a step (g) of displaying a display wafer allowing identification and visual recognition of each of the fatal failure defective area of the first level, the fatal failure defective area of the second level, the non-fatal failure defective area and the non-influential defective area, the step (g) being performed after the step (f).

The fatal failure accumulation processing in the data analysis means of the failure analysis system according to the fifteenth aspect of the present invention includes the step (g) of displaying a display wafer allowing identification and visual recognition of each of the fatal failure defective area of the first level, the fatal failure defective area of the second level, the non-fatal failure defective area and the non-influential defective area after the step (f), whereby distribution of fatal failure defective areas of the first and second levels, non-fatal failure defective areas and non-influential defective areas on the wafer can be simultaneously recognized.

According to a sixteenth aspect of the present invention, the failure analysis system further comprises wafer test information supply means supplying wafer test information including a non-faultiness/faultiness determination result of an electric characteristic after substituting the substitute memory cell group for a faulty memory cell among the plurality of memory cells to each of the plurality of chips of the wafer for analysis, while the automatic fatal failure extract processing further includes chip selection processing performed before the X-directional repair judgment processing and the Y-directional repair judgment processing for making the X-directional repair judgment processing and the Y-directional repair judgment processing performed only on a chip satisfying a prescribed condition among the plurality of chips on the basis of the wafer test information.

The fatal failure accumulation processing in the data analysis means of the failure analysis system according to the sixteenth aspect of the present invention further includes the chip selection processing performed before the X-directional repair judgment processing and the Y-directional repair judgment processing for making the X-directional repair judgment processing and the Y-directional repair judgment processing performed only on a chip satisfying a prescribed condition among the plurality of chips on the basis of the wafer test information, whereby the X-directional repair judgment processing and the Y-directional repair judgment processing can be performed on the minimum necessary chips and reduction of the execution time can be attained.

A seventeenth aspect of the present invention is directed to a fatal failure extraction method for a wafer for analysis having a plurality of chips. Each of the plurality of chips has a plurality of memory cells arranged in the form of a matrix defined by an X-direction and a Y-direction and a substitute memory cell group substitutable for a faulty memory cell among the plurality of memory cells, and the substitute memory cell group is substitutable with prescribed X-directional substitutability and prescribed Y-directional substitutability in the X-direction and the Y-direction respectively. The fatal failure extraction method comprises steps (a), (b), (c), (d), (e) and (f) of detecting non-faultiness/faultiness of the plurality of memory cells in each of the plurality of chips and obtaining a memory cell test result adding fail bit information with respect to a faulty memory cell, degenerating the plurality of memory cells to a plurality of X-directional substituted memory cell groups and judging non-faultiness/faultiness on each of the plurality of X-directional substituted memory cell groups on the basis of the fail bit information of the memory cell test result and predetermined Y-directional virtual substitutability in consideration of failures in the Y-direction, performing repair judgment on each of a first number of X-directional substituted memory cell groups in a range repairable on the basis of the X-directional substitutability, the first number of X-directional substituted memory cell groups being judged as faulty in the step (b) among the plurality of X-directional substituted memory cell groups, degenerating the plurality of memory cells to a plurality of Y-directional substituted memory cell groups and judging non-faultiness/faultiness on each of the plurality of Y-directional substituted memory cell groups on the basis of the fail bit information of the memory cell test result and predetermined X-directional virtual substitutability in consideration of failures in the X-direction, performing repair judgment on each of a second number of Y-directional substituted memory cell groups in a range repairable on the basis of the Y-directional substitutability, the second number of Y-directional substituted memory cell groups being judged as faulty in the step (d) among the plurality of Y-directional substituted memory cell groups, and accumulating fatal fail bit information which is fail bit information of a memory cell unrepairable through the step (c) and the step (e) in the fail bit information of the memory cell test result.

The fatal failure extraction method according to the seventeenth aspect of the present invention is performed on the basis of the memory cell test result obtained in the step (a) through the X-directional repair judgment processing through the X-directional substitutability in consideration of failures in the Y-direction through the steps (b) and (c), the Y-directional repair judgment processing with the Y-directional substitutability in consideration of failures in the X-direction through the steps (d) and (e) and the fatal failure accumulation processing through the step (f).

The X-directional repair judgment processing is performed in consideration of failures in the Y-direction and the Y-directional repair judgment processing is performed in consideration of failures in the X-direction, whereby relatively precise fatal fail bit information can be obtained.

An eighteenth aspect of the present invention is directed to recording medium readable through a computer, recording a program for making a computer execute the fatal failure extraction method according to the seventeenth aspect.

The recording medium according to the eighteenth aspect of the present invention records the program for making a computer execute the fatal failure extraction method according to the seventeenth aspect, whereby fatal fail bit information can be automatically accumulated by making the computer execute this program.

An object of the present invention is to provide a failure analysis system capable of automatically investigating the cause of fatal failures without manual processing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is an explanatory diagram showing an X-line substituted area on a chip plane;

FIG. 13 is an explanatory diagram showing a Y-line substituted area on a chip plane;

FIGS. 14 to 17 are explanatory diagrams for illustrating X-line repair judgment processing;

FIGS. 18 to 21 are explanatory diagrams for illustrating Y-line repair judgment processing;

FIGS. 30 and 31 are flow charts showing the details of Y-line repair judgment processing shown in FIGS. 26 and 27;

FIG. 32 is an explanatory diagram showing an output result of accumulation processing according to an embodiment 4;

FIG. 33 is an explanatory diagram showing an output result of accumulation processing according to an embodiment 5;

FIGS. 35 and 36 are explanatory diagrams showing an output result of accumulation processing according to an embodiment 7;

FIG. 37 is an explanatory diagram showing an output result of accumulation processing according to an embodiment 8;

FIGS. 41 to 43 are explanatory diagrams showing output results of accumulation processing according to an embodiment 11;

FIG. 49 is an explanatory diagram showing an output result of accumulation processing according to an embodiment 14;

FIG. 50 is a block diagram showing the system structure of a failure analysis system according to an embodiment 15;

FIGS. 51 and 52 are flow charts showing a first method of the overall processing of an automatic fatal failure extraction method according to the embodiment 15.

DESCRIPTION OF THE PREFERRED EMBODIMENTS

Embodiment 1

<Hard Structure>

Figure 1:
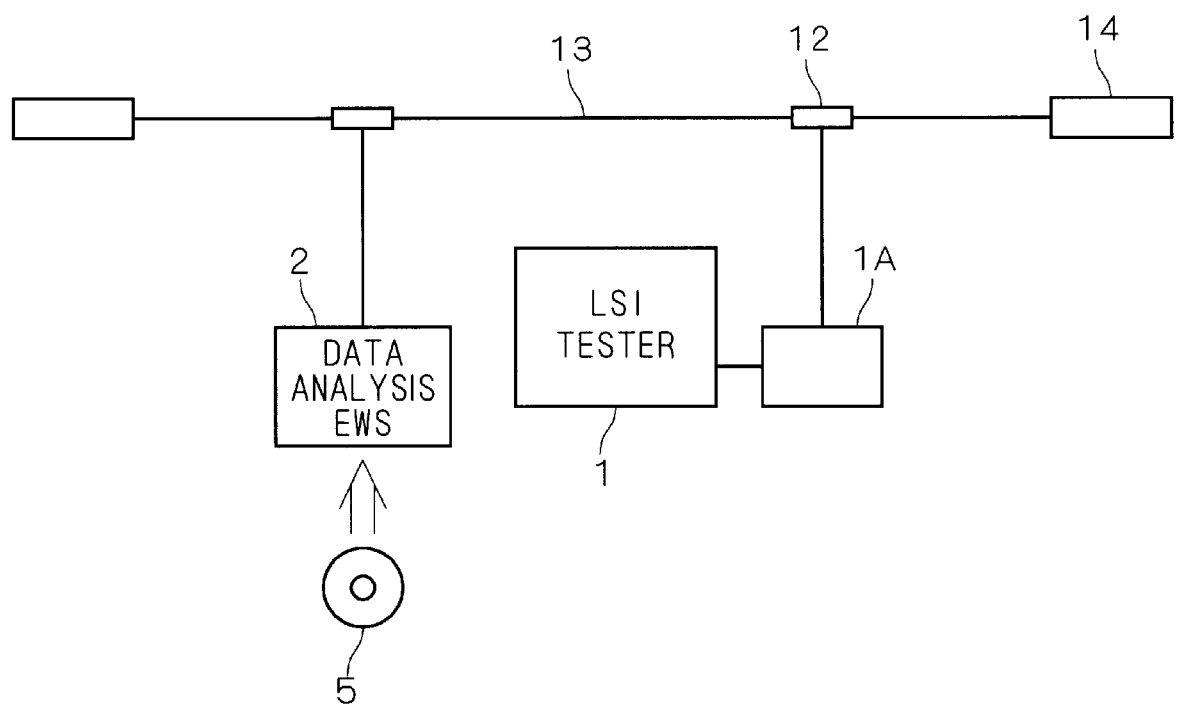
FIG. 1 is a block diagram showing the system structure of a failure analysis system according to an embodiment 1 of the present invention.

FIG. 1 is a block diagram showing the system structure of a failure analysis system according to an embodiment 1 of the present invention. An LSI tester 1 and a data analysis EWS (Engineering Work Station) 2 for data analysis are provided on a network shown in FIG. 1, so that the LSI tester 1 makes a test in relation to electric characteristics on memory cells, excluding substitute memory cells, in a plurality of chips of a semiconductor wafer for analysis in units of the chips and generates test results obtained by detecting memory cell failures.

A tester computer 1A provided on the LSI tester 1 accumulates FBM information expressing the faulty memory cells as fail bit information on the basis of the test results obtained from the LSI tester 1. The data analysis EWS 2 performs automatic fatal failure extract processing on the basis of the FBM information accumulated in the tester computer 1A. The data analysis EWS 2 can also execute a program recorded in a recording medium such as a CD-ROM 5.

The tester computer 1A and the data analysis EWS 2 are respectively connected to corresponding connectors 12, which in turn are connected with each other through a cable 13 for enabling data transfer between the tester computer 1A and the data analysis EWS 2. Terminals 14 are provided on end portions of the cable 13.

<Method>

<Overall Processing>

Figure 2:
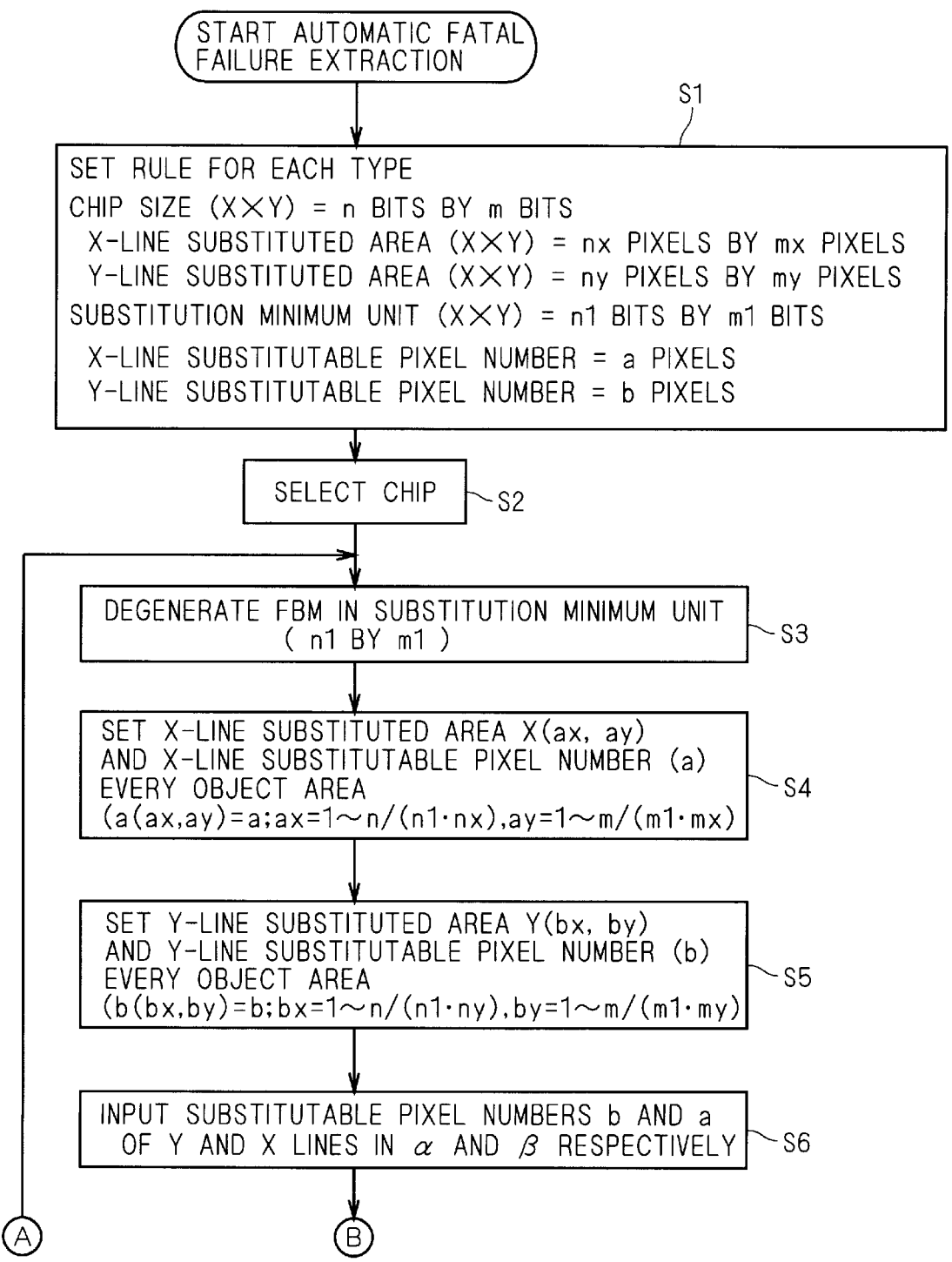
FIGS. 2 and 3 are flow charts showing the overall processing of an automatic fatal failure extraction method according to the embodiment 1.
Figure 3:
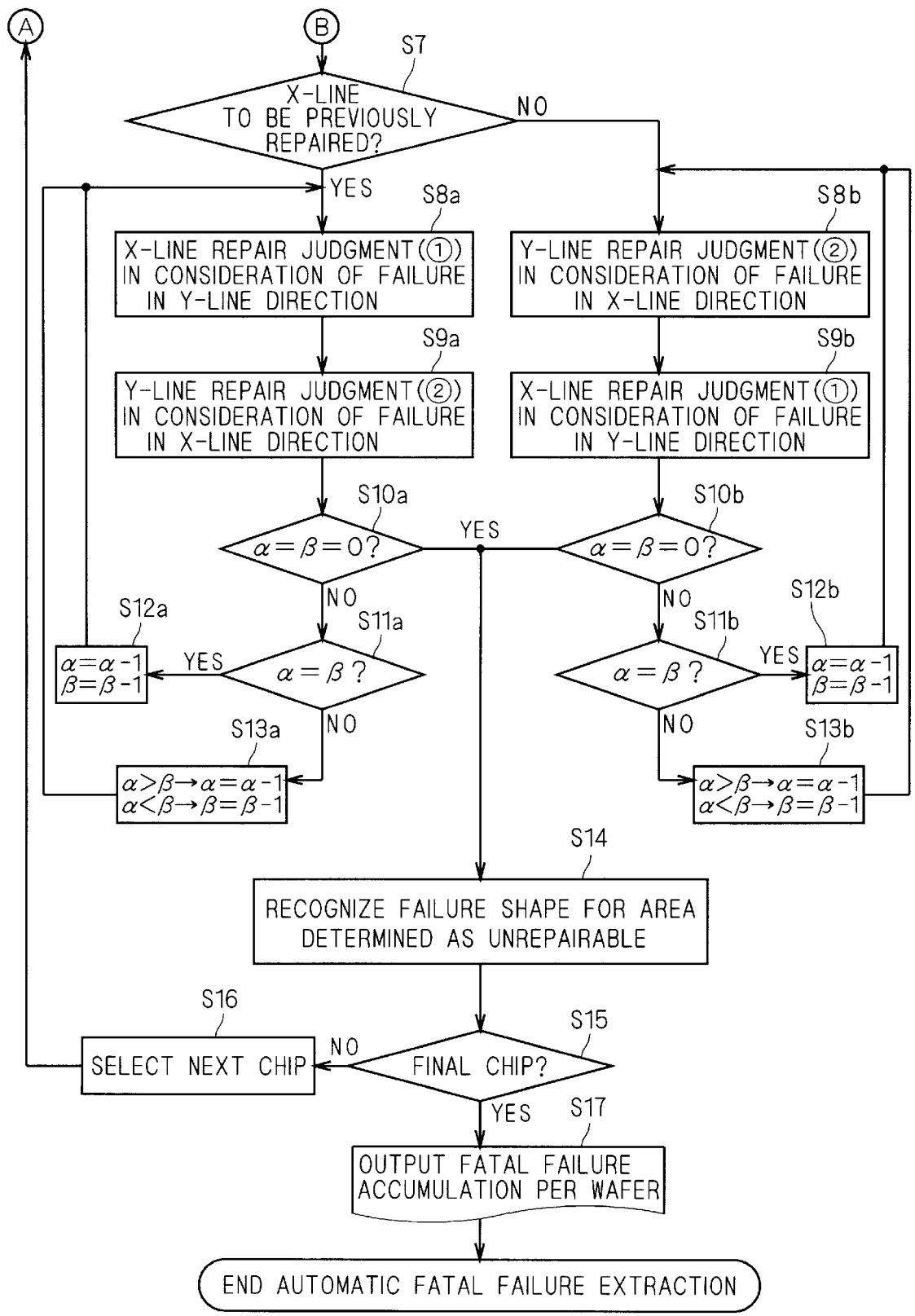

FIGS. 2 and 3 are flow charts showing the flow of the overall processing of automatic fatal failure extract processing (method) through the failure analysis system according to the embodiment 1. The automatic fatal failure extraction method according to the embodiment 1 is now described with reference to FIGS. 2 and 3. The following automatic fatal failure extraction method is carried out after executing a step of capturing the FBM information accumulated by the tester computer 1A in the data analysis EWS 2.

First, a rule for each type set every wafer for analysis is set for setting a chip size to n by m bits, a substitute minimum unit to n1 by m1 bits, an X-line substituted area to nx by mx pixels, a Y-line substituted area to ny by my pixels, an X-line substituted pixel number to a pixels, and a Y-line substituted pixel number to b pixels respectively. The details of each set rule are now described. The X-line substituted area and the Y-line substituted area satisfy relations mx>my and nx<ny.

Figure 8:
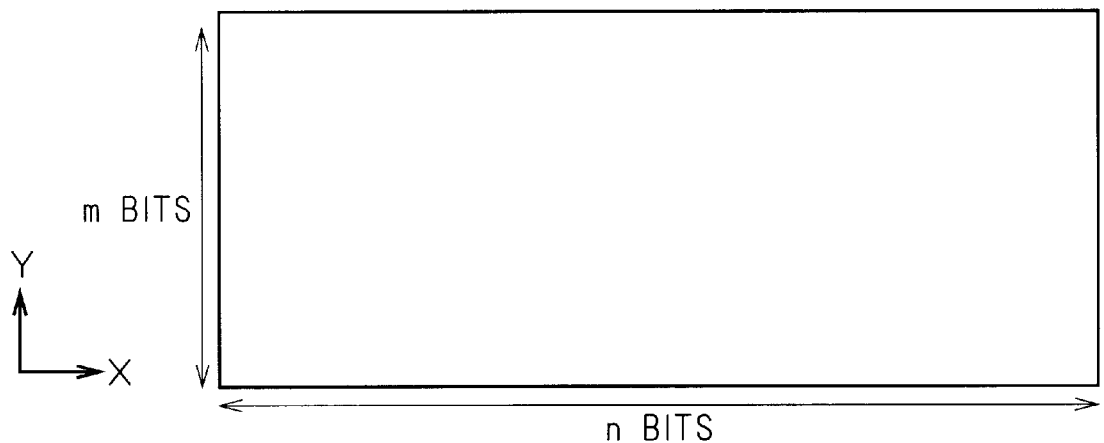
FIG. 8 is an explanatory diagram showing a chip plane shown by bits.

The chip size (x by y bits) is defined by bit numbers of memory cells arranged in a single chip in the form of a matrix along X- and Y-directions respectively, as shown in FIG. 8. FIG. 8 shows an n by m matrix having n bits in the X-direction and m bits in the Y-direction.

The substitute minimum unit (x by y bits) indicates the minimum line width (substitution is performed in units of this line width) in the X-direction and the Y-direction at the time of substitution. When the substitute minimum unit is 3 by 3 bits, for example, nine (3 by 3) bit areas BA form a single substitute minimum unit, which in turn defines a unit of pixel area PA.

Figure 9:
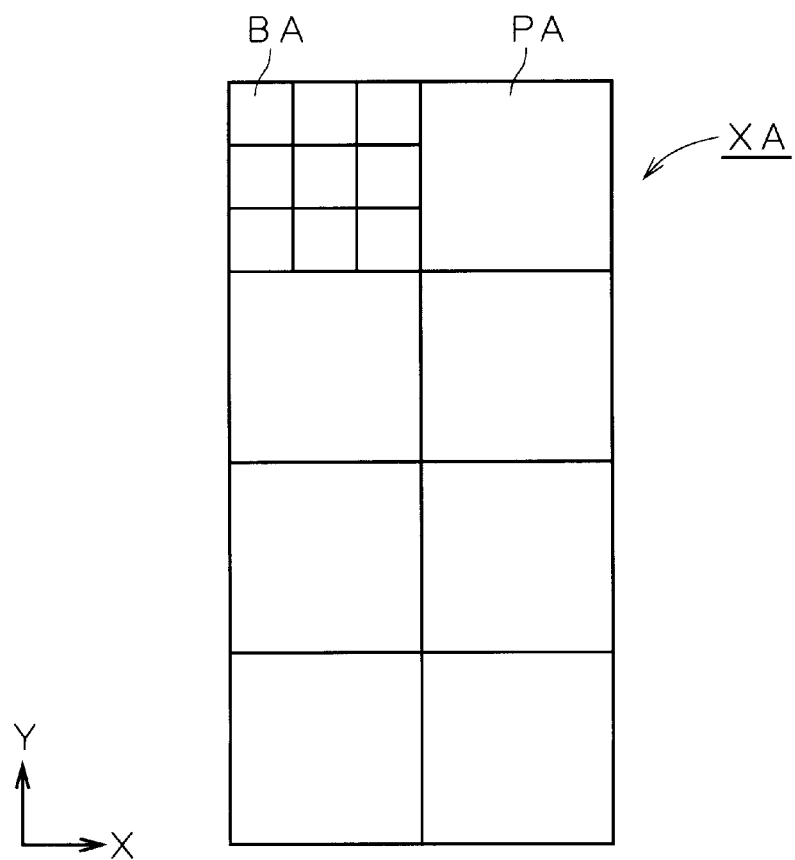
FIG. 9 is an explanatory diagram showing the relation between a bit size, a substitute minimum unit and an X-line substituted area.

"X-line" in the X-line substituted area (x by y pixels) indicates lines having a common X address, and the X-line substituted area indicates a range which can be substituted by an X-line redundancy memory cell. When the substitute minimum unit is 3 by 3 bits and the X-line substituted area is 2 by 4 pixels, for example, eight (2 by 4) pixel areas PA define the X-line substituted area, as shown in FIG. 9.

Figure 10:
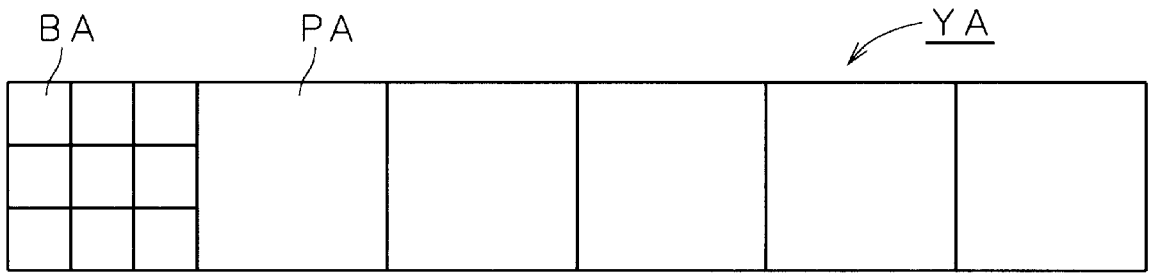
FIG. 10 is an explanatory diagram showing the relation between the bit size, the substitute minimum unit and a Y-line substituted area.

"Y-line" in the Y-line substituted area (x by y pixels) indicates lines having a common Y address, and the Y-line substituted area indicates a range which can be substituted by a Y-line redundancy memory cell. When the substitute minimum unit is 3 by 3 bits and the Y-line substituted area is 5 by 1 pixels, for example, six (6 by 1) pixel areas PA define a Y-line substituted area YA, as shown in FIG. 10.

An X-line substitutable pixel number is obtained by dividing the number of X-line redundancy memory cells substitutable in the X-line substituted area by the X-directional bits of the substitute minimum unit. This expresses substitutability in the X-line direction.

A Y-line substitutable pixel number is obtained by dividing the number of Y-line redundancy memory cells substitutable in the Y-line substituted area by the Y-directional bits of the substitute minimum unit. This expresses substitutability in the Y-line direction.

Figure 11:
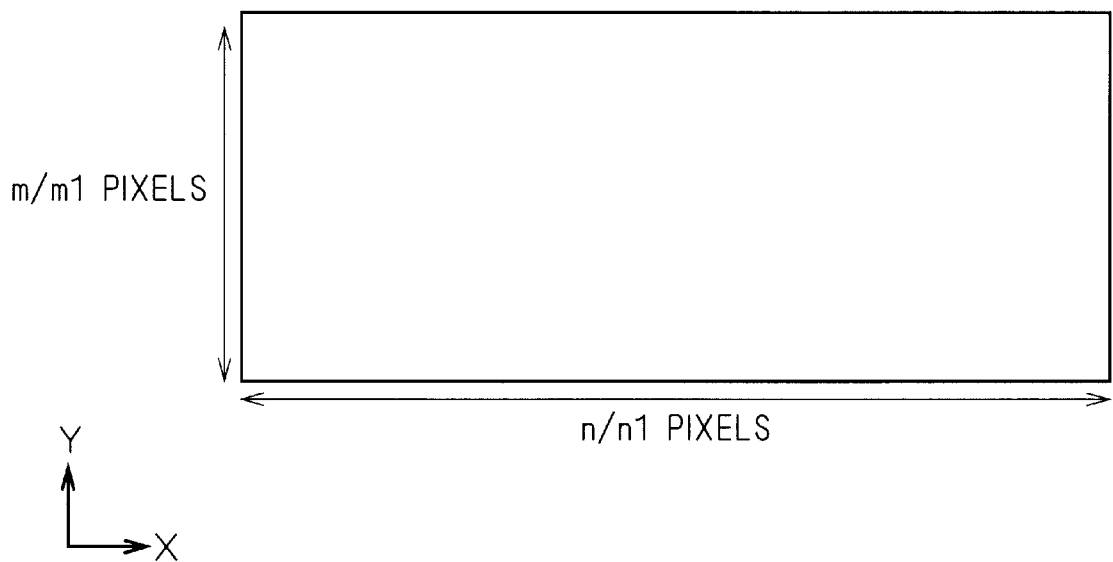
FIG. 11 is an explanatory diagram showing a chip plane degenerated in the substitute minimum unit.

When the step S1 is terminated, an object chip is selected at a step S2 and thereafter an FBM in the object chip is degenerated in the substitute minimum unit (n1 by m1), as shown in FIG. 11.

Then, an X-line substituted area (nx by mx pixels) is set on the FBM shown in FIG. 11 at a step S4 as shown in FIG. 12, while setting an X-line substitutable pixel number (a) every X-line substituted area. In other words, the X-line substituted area is expressed as X(ax, ay) so that {a(ax, ay)=a; ax=1 to n/(n1·nx), ay=1 to m/(m1·mx)}.

At a step S5, a Y-line substituted area (ny by my pixels) is set on the FBM shown in FIG. 11 as shown in FIG. 13, while setting a Y-line substitutable pixel number (b) every Y-line substituted area. In other words, the Y-line substituted area is expressed as Y(bx, by) so that {b(bx, by)=b; bx=1 to n/(n1·ny), by=1 to m/(m1·my)}.

At a step S6, the Y-line substitutable pixel number b is input in a variable $\alpha$ indicating virtual substitutability in the Y-line direction and the X-line substitutable pixel number a in a variable $\beta$ indicating virtual substitutability in the X-line direction respectively, for initializing the variables $\alpha$ and $\beta$. As described later, a plurality of virtually set substitutability can be set by varying these variables $\alpha$ and $\beta$ from b and a to zero respectively.

At a step S7, whether to perform repair judgment order of faulty memory cells in X-line preference or Y-line preference is judged to advance to a step S8a in the case of X-line preference or to a step S8b in the case of Y-line preference. The repair judgment order may be previously initialized.

Processing performed in X-line preference is now described.

X-line repair processing in consideration of failures in the Y-line direction is performed at the step S8a, and then Y-line repair judgment processing is performed at a step S9a in consideration of failures in the X-line direction.

Thereafter whether or not $\alpha=\beta=0$ is judged at a step S10a to make transition to a step S11a if $\alpha=\beta=0$ does not hold, or make transition to a step S14 if $\alpha=\beta=0$.

Whether or not $\alpha=\beta$ is judged at a step S11a, to make transition to a step S12a if $\alpha=\beta$, or make transition to a step S13a if $\alpha\neq\beta$.

1 is subtracted from each of $\alpha$ and $\beta$ at the step S12a, and thereafter the process returns to the step S8a. At the step S13a, on the other hand, 1 is subtracted from only $\alpha$ if $\alpha$ is greater than $\beta$ while 1 is subtracted from only $\beta$ if $\beta$ is greater than $\alpha$, and thereafter the process returns to the step S8a. Thereafter the steps S8a to S13a are repeated until $\alpha=\beta=0$ is judged at the step S10a.

Processing performed in Y-line preference is now described.

Y-line repair processing in consideration of failures in the X-line direction is performed at the step S8b, and X-line repair judgment processing is performed at a step S9b in consideration of failures in the Y-line direction.

Thereafter whether or not $\alpha=\beta=0$ is judged at a step S10b to make transition to a step S11b if $\alpha=\beta=0$ does not hold, or make transition to the step S14 if $\alpha=\beta=0$.

Whether or not $\alpha=\beta$ is judged at a step S11b, to make transition to a step S12b if $\alpha=\beta$, or make transition to a step S13b if $\alpha\neq\beta$.

1 is subtracted from each of $\alpha$ and $\beta$ at the step S12b, and thereafter the process returns to the step S8b. At the step S13b, on the other hand, 1 is subtracted from only $\alpha$ if $\alpha$ is greater than $\beta$ while 1 is subtracted from only $\beta$ if $\beta$ is greater than $\alpha$, and thereafter the process returns to the step S8b. Thereafter the steps S8b to S13b are repeated until $\alpha=\beta=0$ is judged at the step S10b.

The contents of the steps S8a, S8b, S9a and S9b performing repair judgment in consideration of the lines of different directions are described later. When the processing performed in X-line preference or Y-line preference is terminated, the process advances to a step S14.

At the step S14, the failure shape of an area defined by fail bit information judged as unrepairable is classified, and whether or not this chip is the final chip is judged at a step S15 to make transition to a step S17 if the chip is the final one or to select a next chip at a step S15 and return to the step S3 if the chip is not the final one. Thereafter the steps S3 to S16 are repeated until the chip is judged as the final one at the step S15.

When the chip is judged as the final one at the step S15, accumulation of fatal fail bit information per wafer is output at the step S17 to terminate the automatic fatal failure extract processing.

<X-Line Repair judgment ①>

Figure 4:
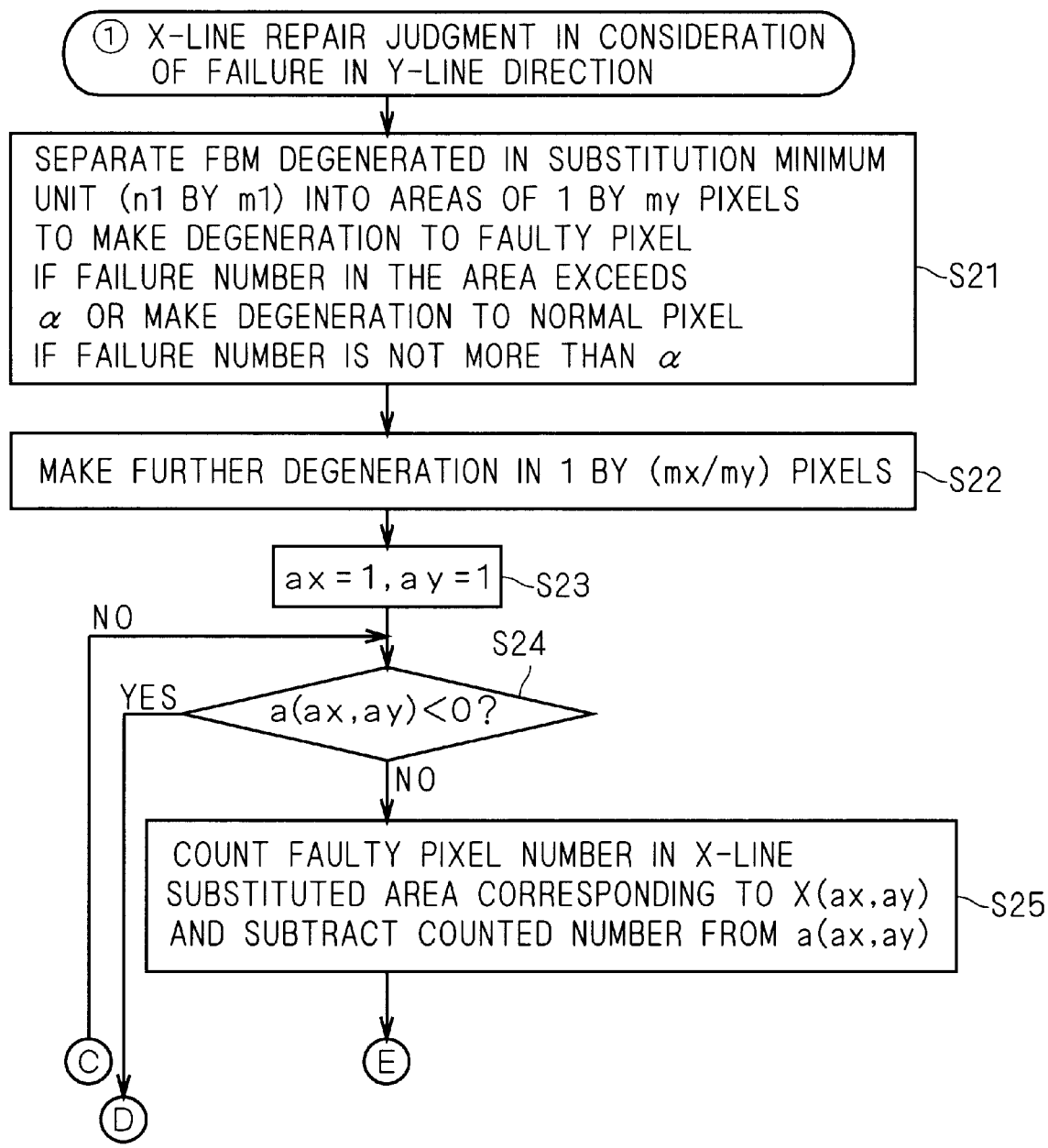
FIGS. 4 and 5 are flow charts showing the details of X-line repair judgment processing shown in FIGS. 2 and 3.
Figure 5:
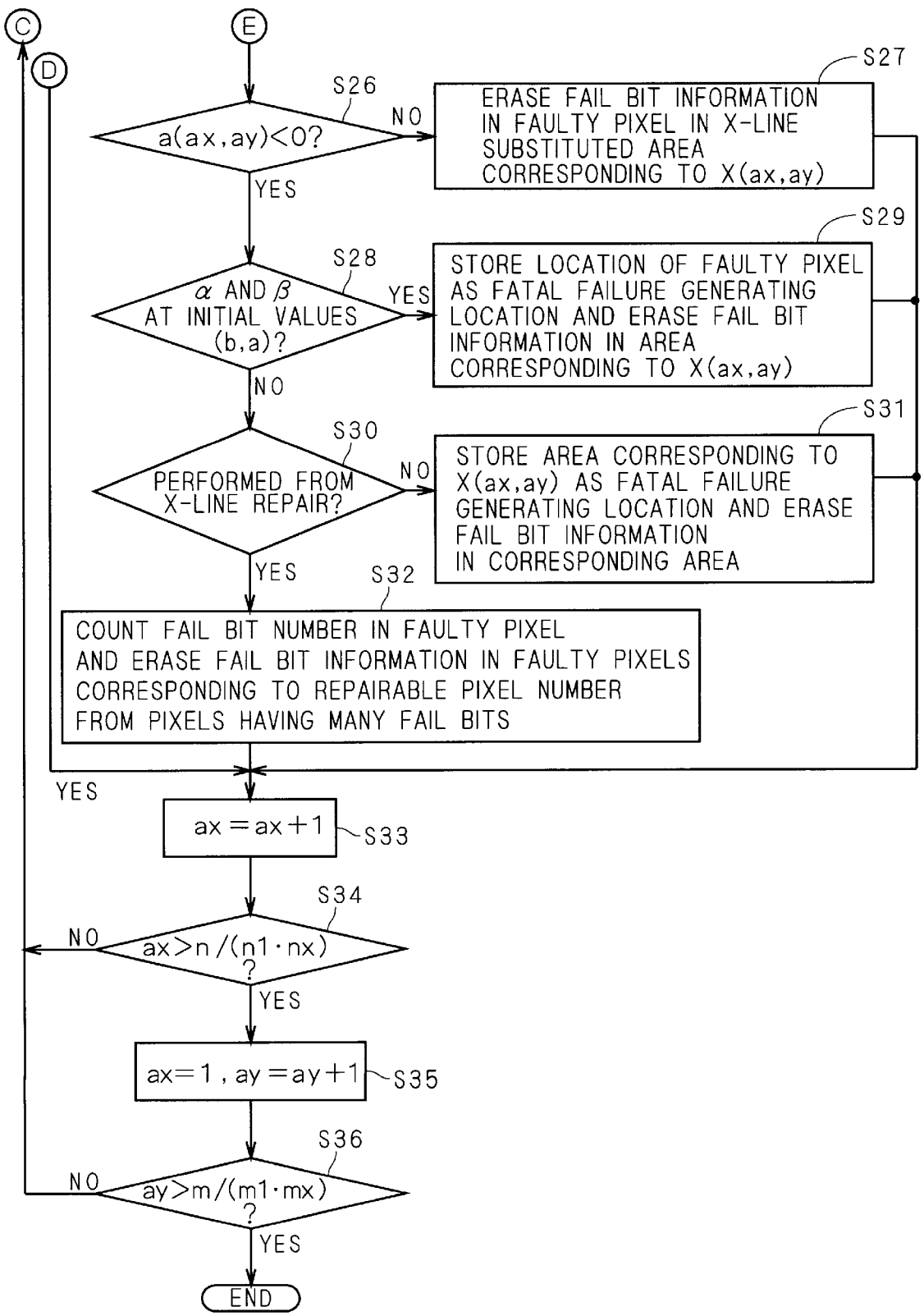

FIGS. 4 and 5 are flow charts showing the details of the process contents in the steps S8a and S9b of performing X-line repair judgment in consideration of failures in the Y-line direction. With reference to FIGS. 4 and 5, the flow of the X-line repair judgment in consideration of failures in the Y-line direction is now described.

At a step S21, the FBM degenerated in the substitute minimum unit (n1 by m1) is separated into areas of 1 by my pixels as shown in FIG. 14, the number of failures in each area is verified, and the area is degenerated as a faulty first degenerated pixel if the number of failures exceeds α while the area is degenerated as a normal first degenerated pixel if the number of failures is not more than α, to create a degenerated FBM shown in FIG. 15. Therefore, each first degenerated pixel shown in FIG. 15 can be identified as a faulty or normal degenerated pixel.

At a step S22, the FBM degenerated at the step S21 is further degenerated in units of 1 by (mx/my) pixels, to create a degenerated FBM formed by second degenerated pixels expressing the Y-direction of the X-line substitute minimum unit in one area as shown in FIG. 16. If at least one pixel of the first degenerated pixels is faulty, the second degenerated pixels after degeneration are also faulty.

At a step S23, "1" is substituted in ax and ay for performing initialization. Then, whether the substitutable pixel number a(ax, ay) is less than "0" or in excess of "0" is judged at a step S24, for determining that the X-line substituted area expressed in X(ax, ay) is unrepairable and making transition to a step S33 for advancing to a next area if the substitutable pixel number a(ax, ay) is less than zero while the X-line substituted area is determined as repairable if the substitutable pixel number a(ax, ay) is in excess of zero since redundancy memory cells for the X-line substituted area XA (see FIG. 17) expressed in X(ax, ay) remain and the process advances to a next step S25.

At the step S25, the number of faulty pixels in the X-line substituted area corresponding to X(ax, ay) is counted and the counted faulty pixel number is subtracted from the substitutable pixel number a(ax, ay).

At a step S26, whether the value of the substitutable pixel number a(ax, ay) after the subtraction at the step S25 is less than zero (negative) or in excess of zero is judged for determining that the X-line substituted area is normally repairable if the value is in excess of zero, erasing fail bit information generated in faulty pixels of the X-line substituted area expressed in X(ax, ay) at a step S27 and advancing to a step S33 for verifying the next X-line substituted area.

If the value is judged as less than zero at the step S26, on the other hand, whether or not α and β are at initial values (i.e., α=b and β=a) is judged at a step S28. If α and β are at the initial values, the X-line substituted area is determined as absolutely unrepairable for storing the location of the faulty pixels in a prescribed storage part of the data analysis ESW 2 as an unrepairable failure generating location (fatal fail bit information) and erasing the fail bit information in the X-line substituted area expressed in X(ax, ay) at a step S29 and advancing to the step S33 for verifying the next X-line substituted area.

If α and β are judged as not at the initial values at the step S28, on the other hand, whether the repair judgment order is performed in X-line preference or Y-line preference is judged at a step S30.

If the repair judgment is performed in Y-line preference, the X-line substituted area is determined as absolutely unrepairable since X-line repair is final repair, the overall X-line substituted area expressed in X(ax, ay) is stored in the prescribed storage part in the data analysis EWS 2 as an unrepairable failure generating location (fatal fail bit information), the fail bit information in the X-line substituted area is erased at a step S31, and the process advances to the step S33 for verifying the next X-line substituted area.

If the repair judgment is judged as performed in X-line preference at the step S30, on the other hand, determination is made that there is a possibility for Y-line repair, the number of fail bits in the faulty pixels is counted, faulty pixels corresponding to the number of repairable pixels (the number before subtraction at the step S25) are selected from pixels having large numbers of fail bits, fail bit information present therein is erased and the process advances to the step S33.

At the step S33, ax is incremented by "1" for changing the object of verification to the next X-line substituted area. At a step S34, whether the value of ax is not more than {n/(n1·nx)} (=maximum value of ax) is judged to return to the step S24 and perform repair judgment of the next X-line substituted area if ax≦{n/(n1·nx)}. Thereafter the steps S24 to S34 are repeated until ax>{n/(n1·nx)} is judged at the step S34.

If ax>{n/(n1·nx)} is judged at the step S34, determination is made that processing for one line has been completed in relation to ax, for returning ax to the initial value (1) and incrementing ay by "1" at a step S35.

At a step S36, whether the value of ay is not more than {m/(m1·bx)} (=maximum value of ay) is judged for returning to the step S24 and performing repair judgment of the next X-line substituted area if ay≦{m/(m1·mx)}. Thereafter the steps S24 to S36 are repeated until ay>{m/(m1·mx)} is judged at the step S36.

When ay>{m/(m1·mx)} is finally judged at the step S36, it follows that repair judgment is completed for all X-line substituted areas in one chip and hence this processing is terminated.

<Y-line Repair judgment ②>

Figure 6:
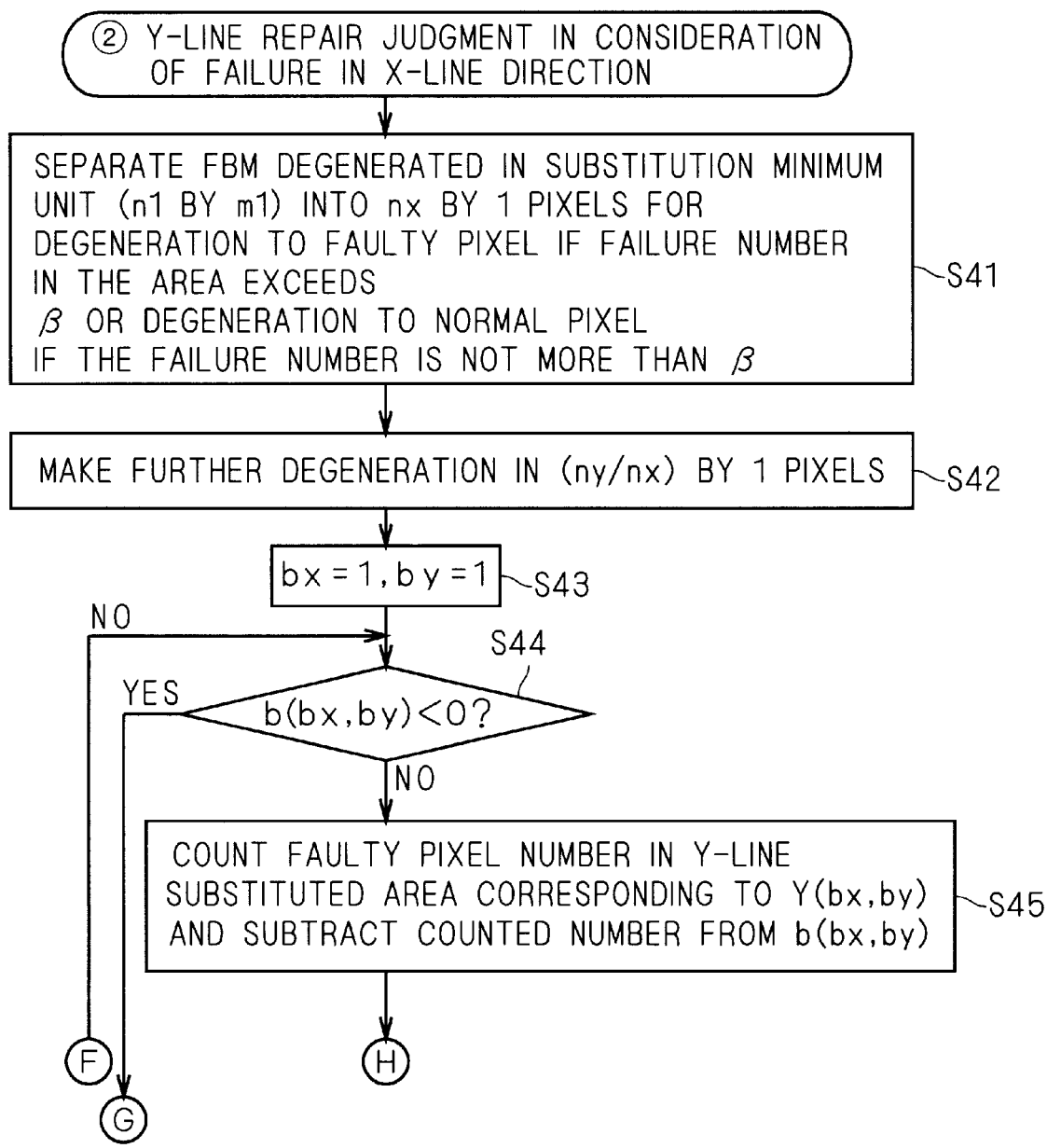
FIGS. 6 and 7 are flow charts showing the details of Y-line repair judgment processing shown in FIGS. 2 and 3.
Figure 7:
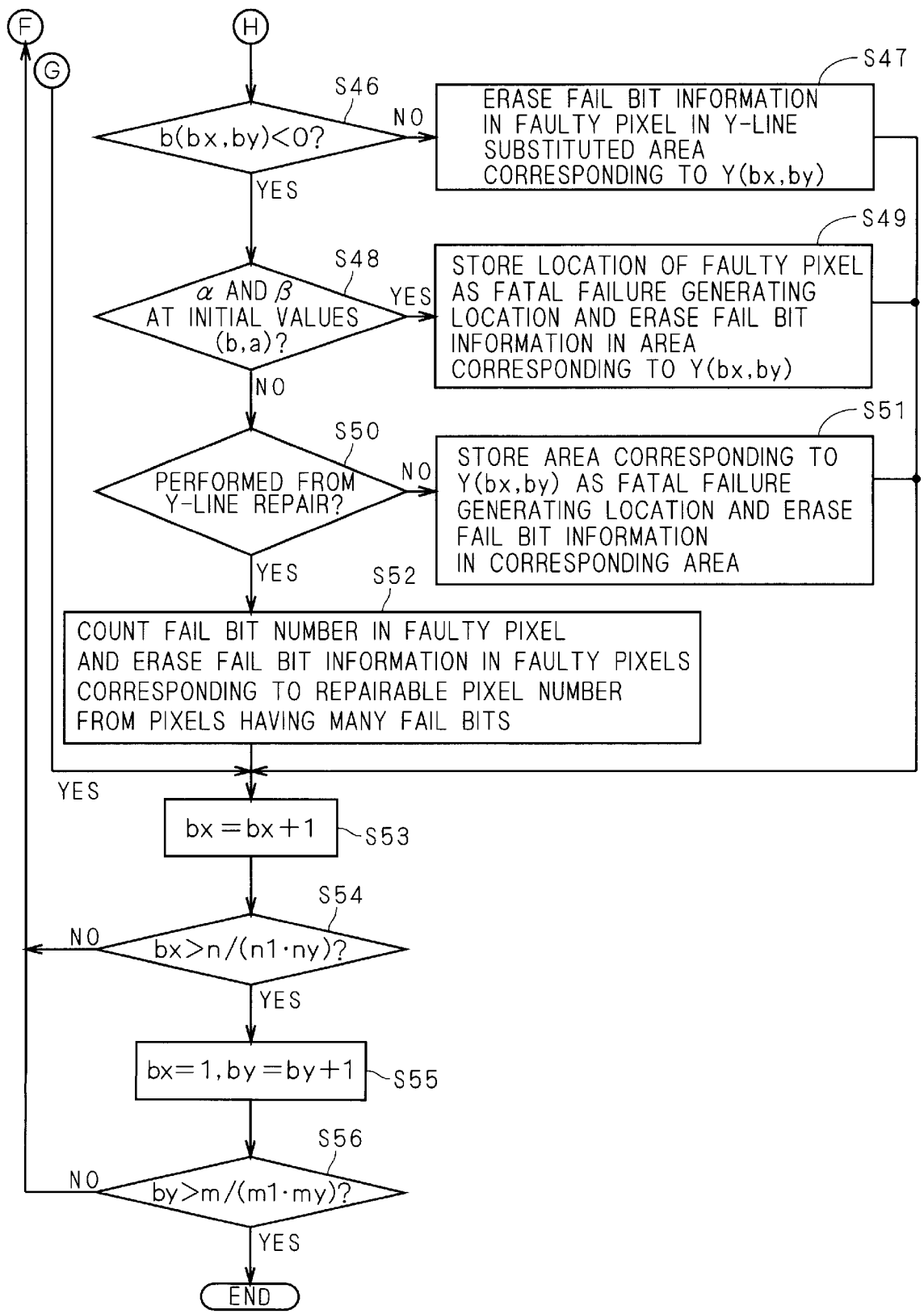

FIGS. 6 and 7 are flow charts showing the details of the process contents in the steps S8b and S9a of performing Y-line repair judgment in consideration of failures in the X-line direction. With reference to FIGS. 6 and 7, the flow of the Y-line repair judgment in consideration of failures in the X-line direction is now described.

At a step S41, the FBM degenerated in the substitute minimum unit (n1 by m1) is separated into areas of nx by 1 pixels as shown in FIG. 18, the number of failures in each area is verified, and the area is degenerated as a faulty third degenerated pixel if the number of failures exceeds α while the area is degenerated as a normal third degenerated pixel if the number of failures is not more than α, to create a degenerated FBM shown in FIG. 19. Therefore, each third degenerated pixel shown in FIG. 19 can be identified as a faulty or normal degenerated pixel.

Figure 20:
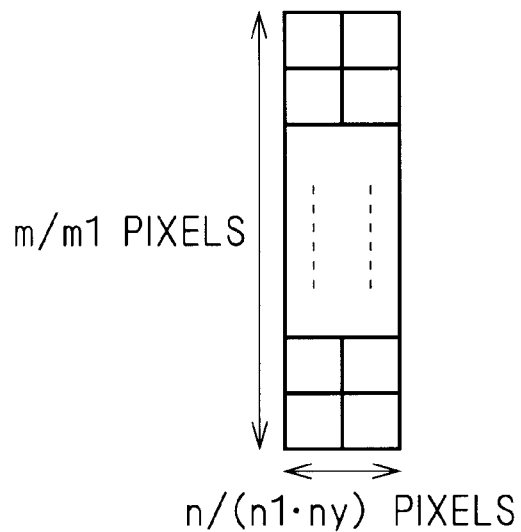

At a step S42, the FBM degenerated at the step S41 is further degenerated in units of (ny/nx) by 1 pixels, to create a degenerated FBM formed by fourth degenerated pixels expressing the X-direction of the Y-line substitute minimum unit in one area as shown in FIG. 20. If at least one pixel of the third degenerated pixels is faulty, the fourth degenerated pixels after degeneration are also faulty.

Figure 21:
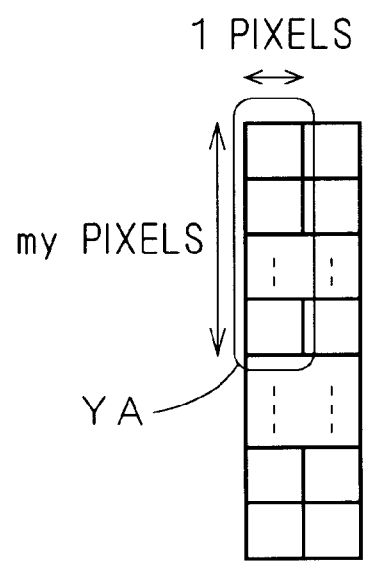

At a step S43, "1" is substituted in bx and by. Then, whether the substitutable pixel number b(bx, by) is less than "0" or in excess of "0" is judged at a step S44, for determining that the Y-line substituted area expressed in Y(bx, by) is unrepairable and making transition to a step S53 for advancing to a next area if the substitutable pixel number b(bx, by) is less than zero while the Y-line substituted area is determined as repairable if the substitutable pixel number b(bx, by) is at least zero since redundancy memory cells for the Y-line substituted area YA (see FIG. 21) expressed in Y(bx, by) remain and advancing to a next step S45.

At the step S45, the number of faulty pixels in the Y-line substituted area corresponding to Y(bx, by) is counted and the counted faulty pixel number is subtracted from the substitutable pixel number b(bx, by).

At a step S46, whether the value of the substitutable pixel number b(bx, by) after the subtraction at the step S45 is less than zero (negative) or in excess of zero is judged for determining that the Y-line substituted area is normally repairable if the value is in excess of zero, erasing information of fail bits generated in faulty pixels of the Y-line substituted area expressed in Y(bx, by) at a step S47 and advancing to a step S53 for verifying the next Y-line substituted area.

If the value is judged as less than zero at the step S46, on the other hand, whether or not α and β are at initial values (i.e., α=b and β=a) is judged at a step S48. If α and β are at the initial values, the Y-line substituted area is determined as absolutely unrepairable for storing the location of the faulty pixels in a prescribed storage part of the data analysis ESW 2 as an unrepairable failure generating location (fatal fail bit information) and erasing the fail bit information in the Y-line substituted area expressed in Y(bx, by) at a step S49 and advancing to the step S53 for verifying the next Y-line substituted area.

If α and β are judged as not at the initial values at the step S48, on the other hand, whether the repair judgment is performed in Y-line preference or X-line preference is judged at a step S50.

If the repair judgment order is performed in X-line preference, the Y-line substituted area is judged as absolutely unrepairable since Y-lie repair is the final repair and the overall Y-line substituted area expressed in Y(bx, by) is stored in the prescribed storage part in the data analysis EWS 2 as an unrepairable failure generating location (fatal fail bit information) and the fail bit information in the Y-line substituted area is erased at a step S51, and the process advances to the step S53 for verifying the next Y-line substituted area.

If the repair judgment order is judged as performed in Y-line preference at the step S50, on the other hand, determination is made that there is a possibility for X-line repair, the number of fail bits in the faulty pixels is counted, faulty pixels corresponding to the number of repairable pixels (the number before subtraction at the step S45) are selected from pixels having large numbers of fail bits, fail bit information present therein is erased and the process advances to the step S53.

At the step S53, bx is incremented by 1 for changing the object of verification to the next Y-line substituted area. At a step S54, whether the value of bx is not more than {n/(n1·ny)} (=maximum value of bx) is judged to return to the step S44 and perform repair judgment of the next Y-line substituted area if bx≦{n/(n1·ny)}. Thereafter the steps S44 to S54 are repeated until bx>{n/(n1·ny)} is judged at the step S54.

If bx>{n/(n1·ny)} is judged at the step S54, determination is made that processing for one line has been completed in relation to bx, for returning bx to the initial value (1) and incrementing by "1" at a step S55.

At a step S56, whether the value of by is not more than {m/(m1·my)} (=maximum value of by) is judged for returning to the step S44 and performing repair judgment of the next Y-line substituted area if by≦{m/(m1·my)}. Thereafter the steps S44 to S56 are repeated until by>{m/(m1·my)} is judged at the step S56.

When by>{m/(m1·my)} is finally judged at the step S56, it follows that repair judgment is completed for all Y-line substituted areas in one chip and hence this processing is terminated.

<Effects>

Thus, the failure analysis system according to the embodiment 1 can automatically perform fatal failure extract processing which has been manually performed by a human operator by capturing a result of an electric test of a wafer for analysis with the LSI tester 1 and automatically executing the automatic fatal failure extract processing shown in FIGS. 2 to 7 on the data analysis EWS 2.

In this case, the X-line repair judgment is performed in consideration of failures in the Y-line direction and the Y-line repair judgment is performed in consideration of failures in the X-line direction, whereby relatively precise fatal fail bit information can be obtained.

Further, α and β indicating the Y-line and X-line set virtual substitutability are successively set from the maximum ability (b, a) decided by the Y-line and X-line substitutability to zero, whereby X-directional and Y-directional repair judgment finely in consideration of failures in the Y-line direction and the X-line direction along actual Y-line and X-line substitutability can be performed, whereby correct fatal fail bit information can be obtained as a result.

Embodiment 2

<Overall Processing>

Figure 22:
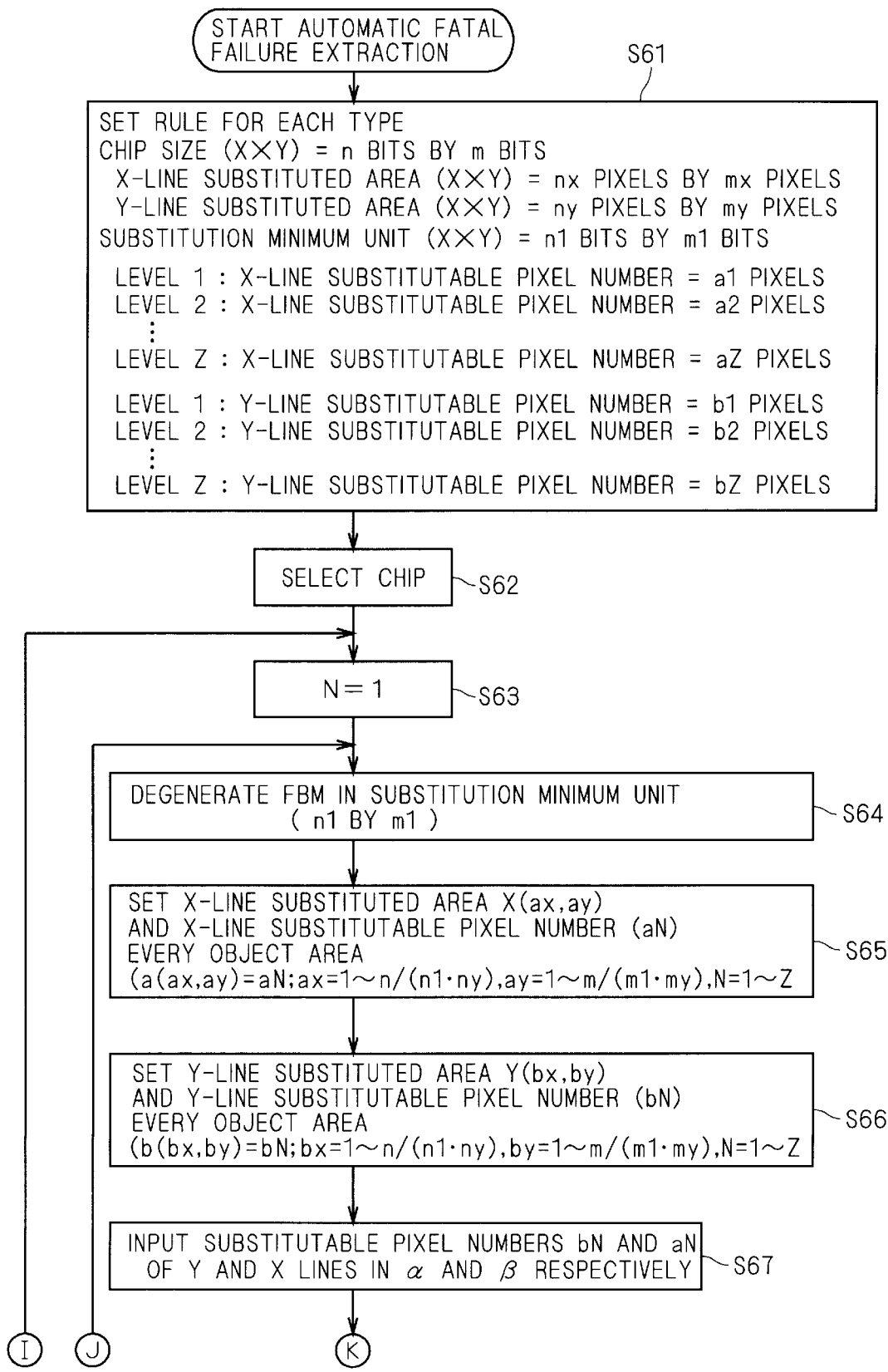
FIGS. 22 and 23 are flow charts showing the overall processing of an automatic fatal failure extraction method according to an embodiment 2 of the present invention.
Figure 23:
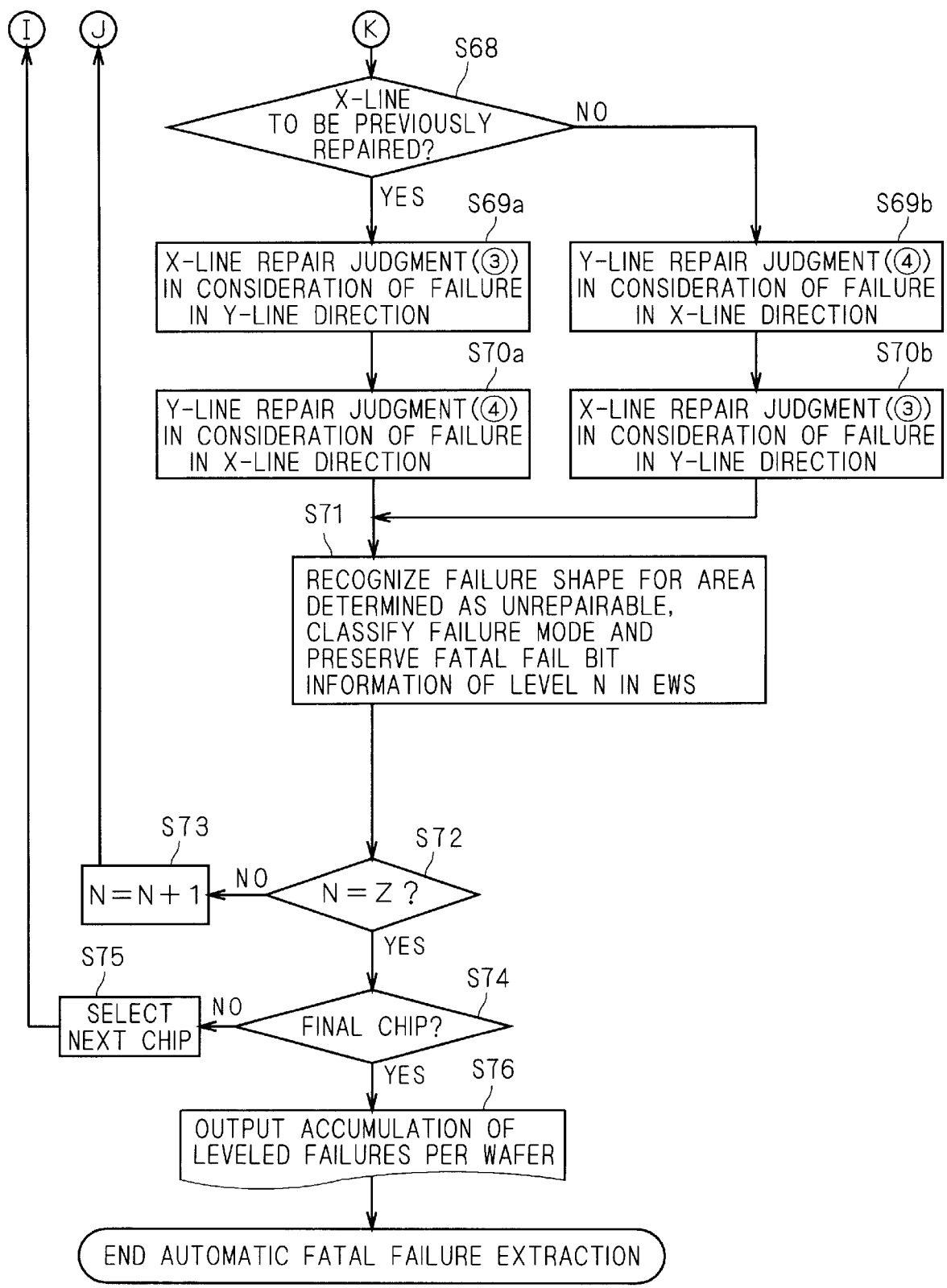

FIGS. 22 and 23 are flow charts showing the flow of the overall processing of an automatic fatal failure extraction method according to a failure analysis system according to an embodiment 2 of the present invention. With reference to FIGS. 22 and 23, the fatal failure extraction method according to the embodiment 2 is described in comparison with the processing of the embodiment 1 described with reference to FIGS. 2 and 3. The hardware structure of the failure analysis system according to the embodiment 2 is similar to that of the embodiment 1 shown in FIG. 1, and the following automatic fatal failure extraction method is carried out after executing a step of capturing FBM information accumulated by a tester computer 1A in a data analysis EWS, similarly to the embodiment 1.

At a step S61, the rule for every type is set similarly to the step S1 in the embodiment 1. Dissimilarly to the embodiment 1, an X-line virtual set substituted pixel number and a Y-line virtual set substituted pixel number indicating virtual set substitutability in an X-line direction and that in a Y-line direction respectively are previously set in classification into Z types of levels (first to Z-th levels).

In other words, the X-line virtual set substituted pixel number is set at a1 to az pixels and the Y-line virtual set substituted pixel number is set at b1 to bz pixels from the first to Z-th levels. The X-line and Y-line virtual set substituted pixel numbers a1 to az and b1 to bz may be set either in association with or not in association with X-line and Y-line substituted pixel numbers a and b.

After the step S61 is terminated, an object chip is selected at a step S62 and "1" is substituted in a variable N for level setting at a step S63 for performing initialization.

At a step S64, an FBM in the object chip is degenerated in a substitute minimum unit (n1 by m1), similarly to the step S3 of the embodiment 1.

Then, at a step S65, an X-line substituted area (nx by mx pixels) is set on the FBM similarly to the step S4 of the embodiment 1. Dissimilarly to the step S4 of the embodiment 1, however, an X-line virtual set substitutable pixel number aN is set every X-line substituted area at a level N. In other words, the X-line substituted area is expressed as X(ax, ay) while the X-line substitutable pixel number (aN) is so set that {a(ax, ay) aN; ax=1 to n/(n1·nx), ay=1 to m/(m1·mx)}.

Then, at a step S66, a Y-line substituted area (ny by my pixels) is set on the FBM similarly to the step S5 of the embodiment 1. Dissimilarly to the step S5 of the embodiment 1, however, a Y-line virtual set substitutable pixel number bN is set every Y-line substituted area at the level N. In other words, the Y-line substituted area is expressed as Y(bx, by) while the Y-line substitutable pixel number bN is so set that {b(bx, by) bN; bx=1 to n/(n1·ny), by=1 to m/(m1·my)}.

Then, at a step S67, the Y-line virtual set substitutable pixel number bN and the X-line virtual set substitutable pixel number aN are input in variables α and β respectively.

Then, at a step S68, whether to perform repair judgment in X-line preference or Y-line preference is judged to advance to a step S69a in the case of X-line preference or to a step S69b in the case of Y-line preference. The repair judgment order can be previously initialized.

First in the processing performed in X-line preference, X-line repair processing in consideration of failures in the Y-line direction is performed at the step S69a, and Y-line repair judgment processing is performed at a step S70a in consideration of failures in the X-line direction.

In the processing performed in Y-line preference, Y-line repair processing in consideration of failures in the X-line direction is performed at the step S69b, and X-line repair judgment processing is performed at a step S70b in consideration of failures in the Y-line direction.

The contents of the steps S69a, S69b, S70a and S70b performing repair judgment in consideration of the lines in different directions are described later. When the processing performed in X-line preference or Y-line preference is terminated, the process advances to a step S71.

At the step S71, classification processing of a failure shape generated in an area determined as unrepairable is performed, and a failure mode (failure shape) is classified to store fatal fail bit information of the level N in a prescribed storage part of the data analysis EWS 2.

Whether or not N=Z is verified at a step S72 to increment N by "1" at a step S73 and return to the step S64 if N≠Z. Thereafter the steps S64 to S73 are repeated until N=Z is judged at the step S72.

If N=Z is judged at the step S72, whether or not this chip is the final one is judged at a step S74 to make transition to a step S76 if the chip is the final one or to select a next chip at a step S75 and thereafter return to the step S63 if the chip is not the final one. Thereafter the steps S63 to S75 are repeated until the chip is judged as the final one at the step S74.

If the chip is judged as the final one at the step S74, accumulation of fatal fail bit information per wafer is output at a step S76 to terminate the automatic fatal failure extract processing.

<X-Line Repair judgment ③>

Figure 24:
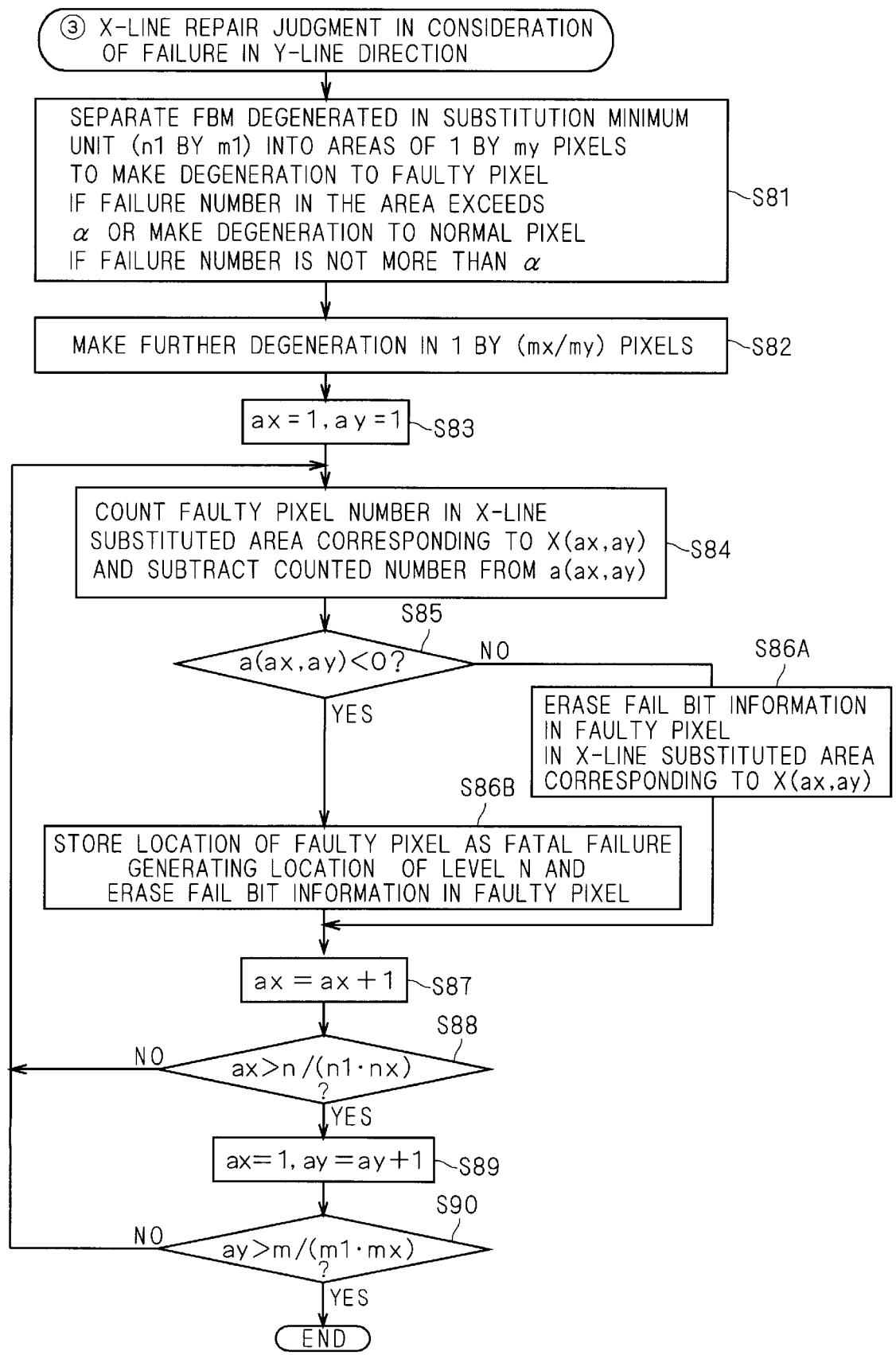
FIG. 24 is a flow chart showing the details of X-line repair judgment processing shown in FIGS. 22 and 23.

FIG. 24 is a flow chart showing the processing contents of the steps S69a and S70b of performing X-line repair judgment in consideration of failures in the Y-line direction. With reference to FIG. 24, the flow of the X-line repair judgment processing ③ in consideration of failures in the Y-line direction is described in comparison with the X-line repair judgment ① according to the embodiment 1 described with reference to FIGS. 4 and 5.

At a step S81, an FBM degenerated in a substitute minimum unit (n1 by m1) is degenerated as a first degenerated pixel, similarly to the step S21 of the embodiment 1.

At a step S82, the FBM degenerated at the step S81 is further degenerated in 1 by (mx/my) pixels to create a degenerated FBM consisting of second degenerated pixels, similarly to the step S22 in the embodiment 1.

At a step S83, "1" is substituted in ax and ay. Then, at a step S84, a faulty pixel number in an X-line substituted area X(ax, ay) is counted to subtract the counted faulty pixel number from the substitutable pixel number a(ax, ay), similarly to the step S25 in the embodiment 1.

Then, at a step S85, whether the value of the substitutable pixel number a(ax, ay) after the subtraction at the step S84 is less than zero (negative) or in excess of zero is judged to determine that the area is normally repairable if the value is in excess of zero and erase fail bit information generated in faulty pixels of the X-line substituted area expressed in X(ax, ay) at a step S86A and the process advances to a step S87 for verifying a next X-line substituted area.

If the value is judged as less than zero at the step S85, on the other hand, the area is determined as unrepairable at the level N, the location of the faulty pixels is stored in a prescribed storage part of the data analysis EWS 2 as a failure generating location (fatal fail bit information) of the level N and the fail bit information in the faulty pixels is erased at a step S86, and the process advances to the step S87 for verifying the next X-line substituted area.

At the step S87, ax is incremented by "1" for changing the object of verification to the next X-line substituted area. At a step S88, whether the value of ax is not more than {n/(n1·nx)} (=maximum value of ax) is judged to return to the step S84 and perform repair judgment of the next X-line substituted area if ax≦{n/(n1·nx)}. Thereafter the steps S84 to S88 are repeated until ax>{n/(n1·nx)} is judged at the step S88.

If ax>{n/(n1·nx)} is determined at the step S88, it is judged that processing for one line has been completed in relation to ax, and ax is returned to an initial value (1) while ay is incremented by "1" at a step S89.

At a step S90, whether the value of ay is not more than {m/(m1·mx)} (=maximum value of ay) is judged to return to the step S84 and perform repair judgment of the next X-line substituted area if ay≦{m/(m1·mx)}. Thereafter the steps S84 to S90 are repeated until ay>{m/(m1·mx)} is judged at the step S90.

If ay>{m/(m1·mx)} is finally judged at the step S90, it follows that repair judgment for all X-line substituted areas in one chip is completed and hence this processing is terminated.

<Y-Line Repair judgment ④>

Figure 25:
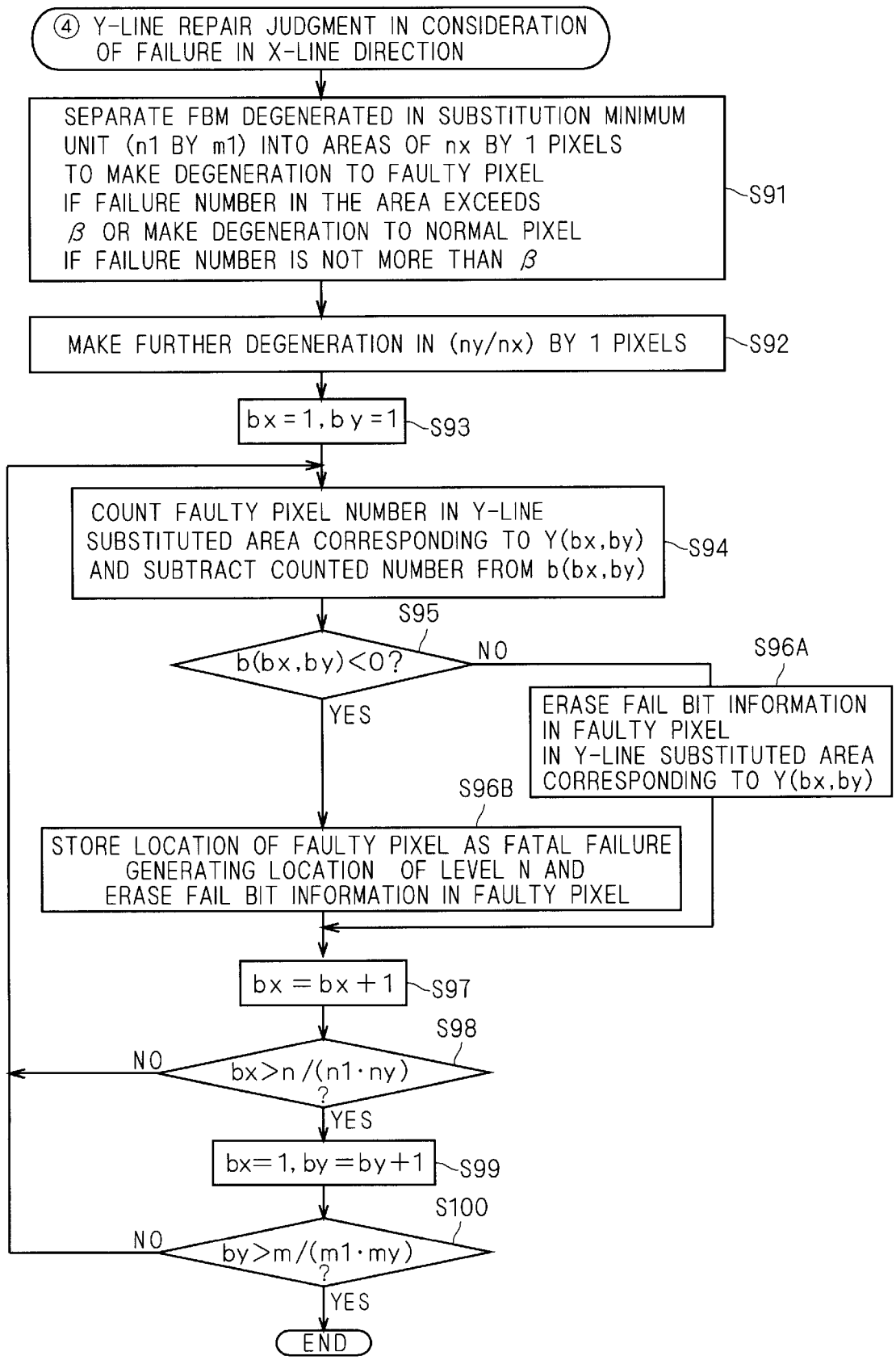
FIG. 25 is a flow chart showing the details of Y-line repair judgment processing shown in FIGS. 22 and 23.

FIG. 25 is a flow chart showing the processing contents of the steps S70a and S69b of performing Y-line repair judgment in consideration of failures in the X-line direction. With reference to FIG. 25, the flow of the Y-line repair judgment processing ④ in consideration of failures in the X-line direction is described in comparison with the Y-line repair judgment ② according to the embodiment 1 described with reference to FIGS. 6 and 7.

At a step S91, an FBM degenerated in the substitute minimum unit (n1 by m1) is degenerated as a third degenerated pixel, similarly to the step S41 of the embodiment 1.

At a step S92, the FBM degenerated at the step S91 is further degenerated in (ny/nx) by 1 pixels to create a degenerated FBM consisting of fourth degenerated pixels, similarly to the step S42 in the embodiment 1.

At a step S93, "1" is substituted in bx and by. Then, at a step S94, a faulty pixel number in a Y-line substituted area Y(bx, by) is counted to subtract the counted faulty pixel number from the substitutable pixel number b(bx, by), similarly to the step S45 in the embodiment 1.

Then, at a step S95, whether the value of the substitutable pixel number b(bx, by) after the subtraction at the step S94 is less than zero (negative) or in excess of zero is judged to determine that the area is normally repairable if the value is in excess of zero and erase fail bit information generated in faulty pixels of the Y-line substituted area expressed in Y(bx, by) at a step S96A and the process advances to a step S97 for verifying a next Y-line substituted area.

If the value is judged as less than zero at the step S95, on the other hand, the area is determined as unrepairable at the level N, the location of the faulty pixels is stored in a prescribed storage part of the data analysis EWS 2 as a failure generating location (fatal fail bit information) of the level N and the fail bit information in the faulty pixels is erased at a step S96B, and the process advances to the step S97 for verifying the next Y-line substituted area.

At the step S97, bx is incremented by "1" for changing the object of verification to the next Y-line substituted area. At a step S98, whether the value of bx is not more than {n/(n1·nx)} (=maximum value of bx) is judged to return to the step S94 and perform repair judgment of the next Y-line substituted area if bx≦{n/(n1·nx)}. Thereafter the steps S94 to S98 are repeated until bx>{n/(n1·nx)} is judged at the step S98.

If bx>{n/(n1·nx)} is judged at the step S98, it is determined that processing for one line has been completed in relation to bx, and bx is returned to an initial value (1) while by is incremented by "1" at a step S99.

At a step S100, whether the value of by is not more than {m/(m1·my)} (=maximum value of by) is judged to return to the step S94 and perform repair judgment of the next Y-line substituted area if by≦{m/(m1·my)}. Thereafter the steps S94 to S100 are repeated until by>{m/(m1·my)} is judged at the step S100.

If by>{m/(m1·my)} is finally judged at the step S100, it follows that repair judgment for all Y-line substituted areas in one chip is completed and hence this processing is terminated.

<Effects>

Thus, the failure analysis system according to the embodiment 2 can automatically perform fatal failure extract processing based on predetermined Z types of virtual set substitutability by capturing a result of an electric test of a wafer for analysis with an LSI tester 1 and automatically executing the processing shown in FIGS. 23 to 25 on the data analysis EWS 2, similarly to the embodiment 1.

In this case, the X-line repair judgment is performed in consideration of failures in the Y-line direction and the Y-line repair judgment is performed in consideration of failures in the X-line direction, whereby relatively precise fatal fail bit information can be obtained.

Further, the failure analysis system according to the embodiment 2 can recognize the risk of failures by classifying the fatal fail bit information of the first to Z-th levels thereby verifying the level of the fatal fail bit information, whereby sampling etc. in failure analysis can be efficiently performed on the basis of the risk.

Embodiment 3

<Overall Processing>

Figure 26:
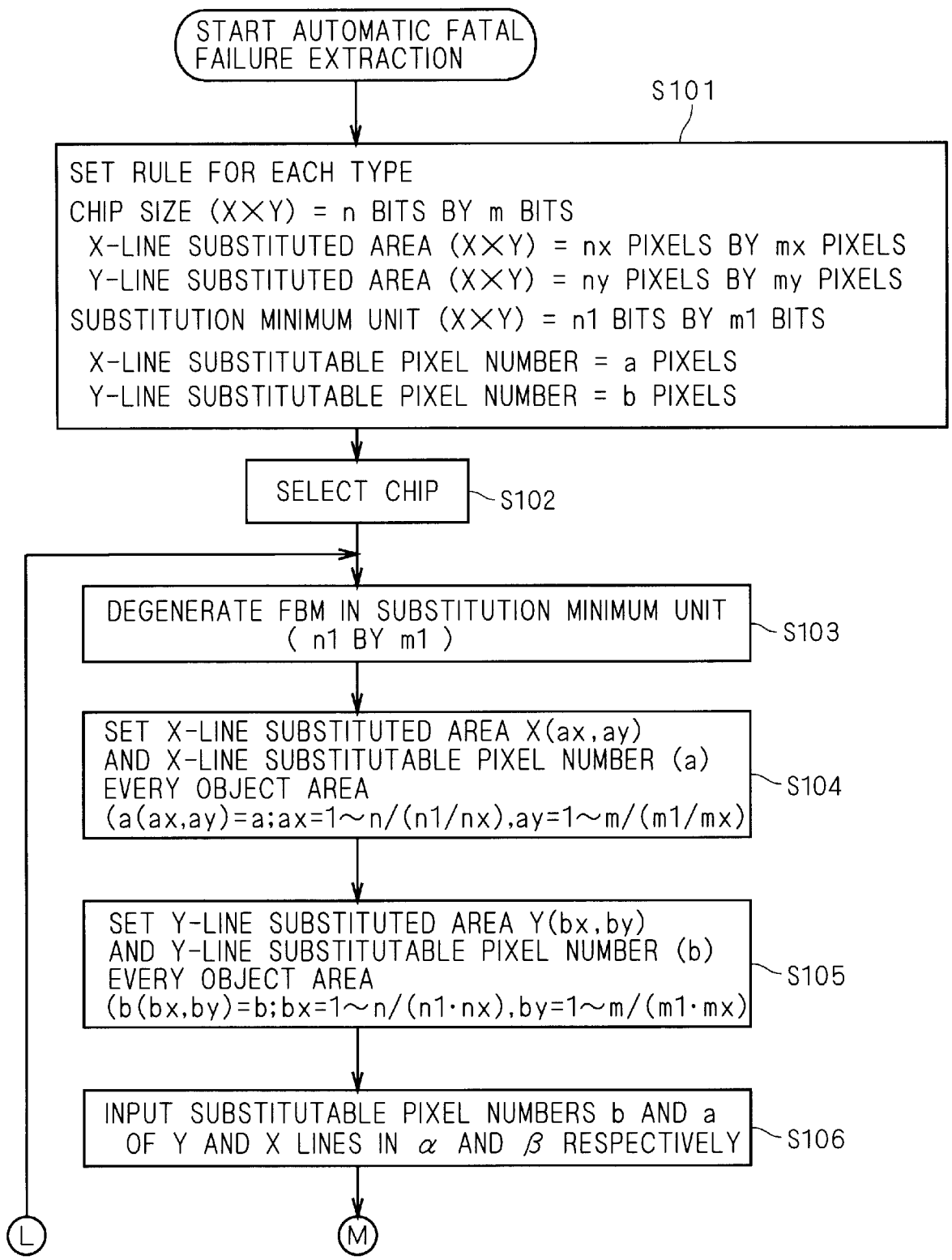
FIGS. 26 and 27 are flow charts showing the overall processing of an automatic fatal failure extraction method according to an embodiment 3 of the present invention.
Figure 27:
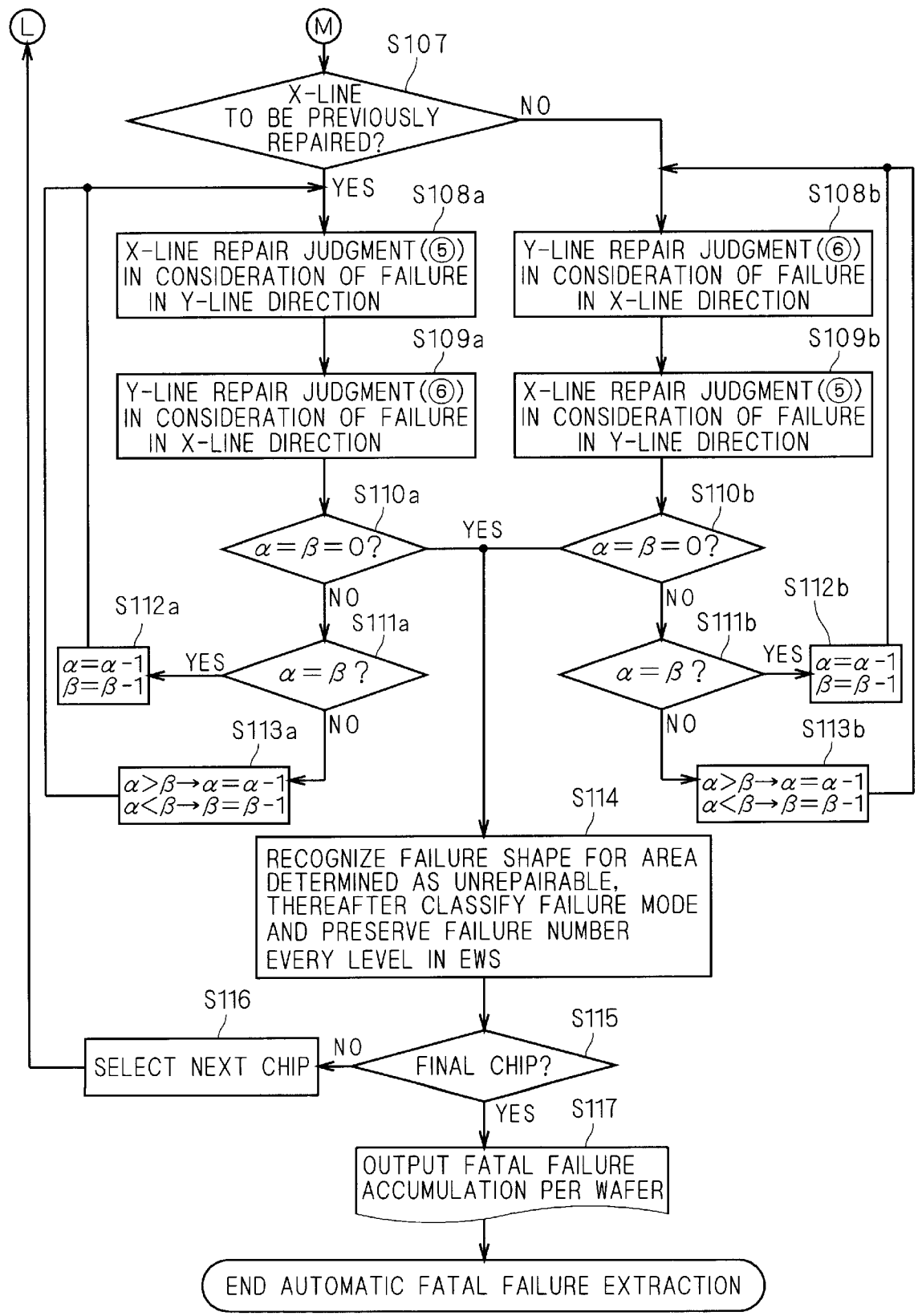

FIGS. 26 and 27 are flow charts showing the flow of the overall processing of an automatic fatal failure extraction method according to a failure analysis system according to an embodiment 3 of the present invention. The overall processing of the embodiment 3 is substantially similar to that of the embodiment 1 shown in FIGS. 2 and 3, and steps S101 to S117 of the embodiment 3 correspond to the steps S1 to S17 of the embodiment 1 respectively. The hardware structure of the failure analysis system according to the embodiment 3 is similar to that of the embodiment 1 shown in FIG. 1, and the following automatic fatal failure extraction method is carried out after executing a step of capturing FBM information accumulated by a tester computer 1A in a data analysis EWS, similarly to the embodiment 1.

However, the contents of X-line repair judgment ⑤ in consideration of failures in a Y-line direction at steps S108a and S109b and Y-line repair judgment ⑥ in consideration of failures in an X-line direction at steps S108b and S109a, which are described later, are different from the contents of the repair judgment ① and ② of the embodiment 1 shown in FIGS. 4, 5, 6 and 7.

Further, while processing at the step S114 is similar to that at the step S14 of the embodiment 1 up to classification of a failure shape generated in an area determined as unrepairable, the former is different from the latter in a point that a failure number per set level is thereafter preserved in a prescribed storage part of the data analysis EWS 2.

<X-line Repair judgment ⑤>

Figure 28:
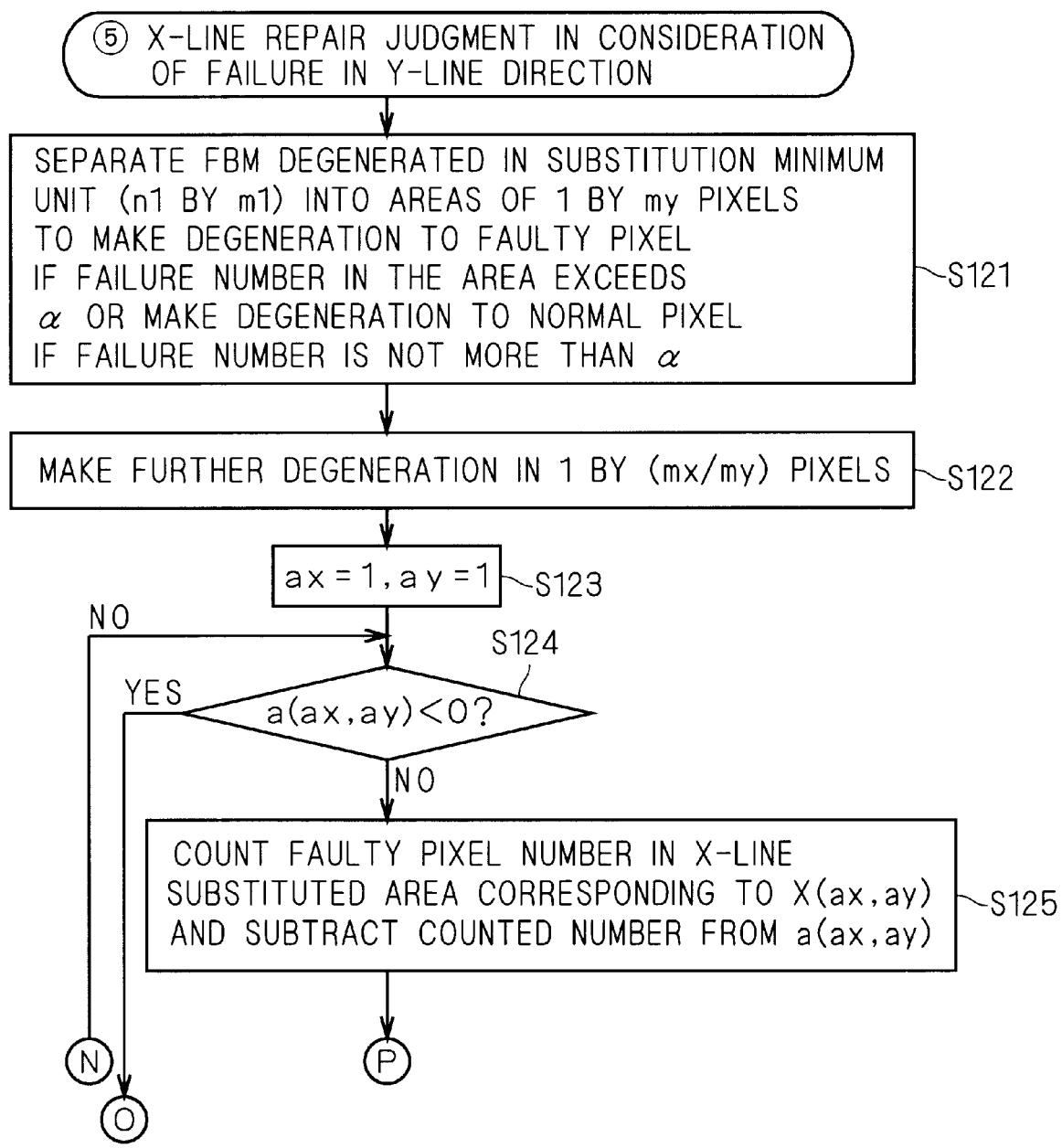
FIGS. 28 and 29 are flow charts showing the details of X-line repair judgment processing shown in FIGS. 26 and 27.
Figure 29:
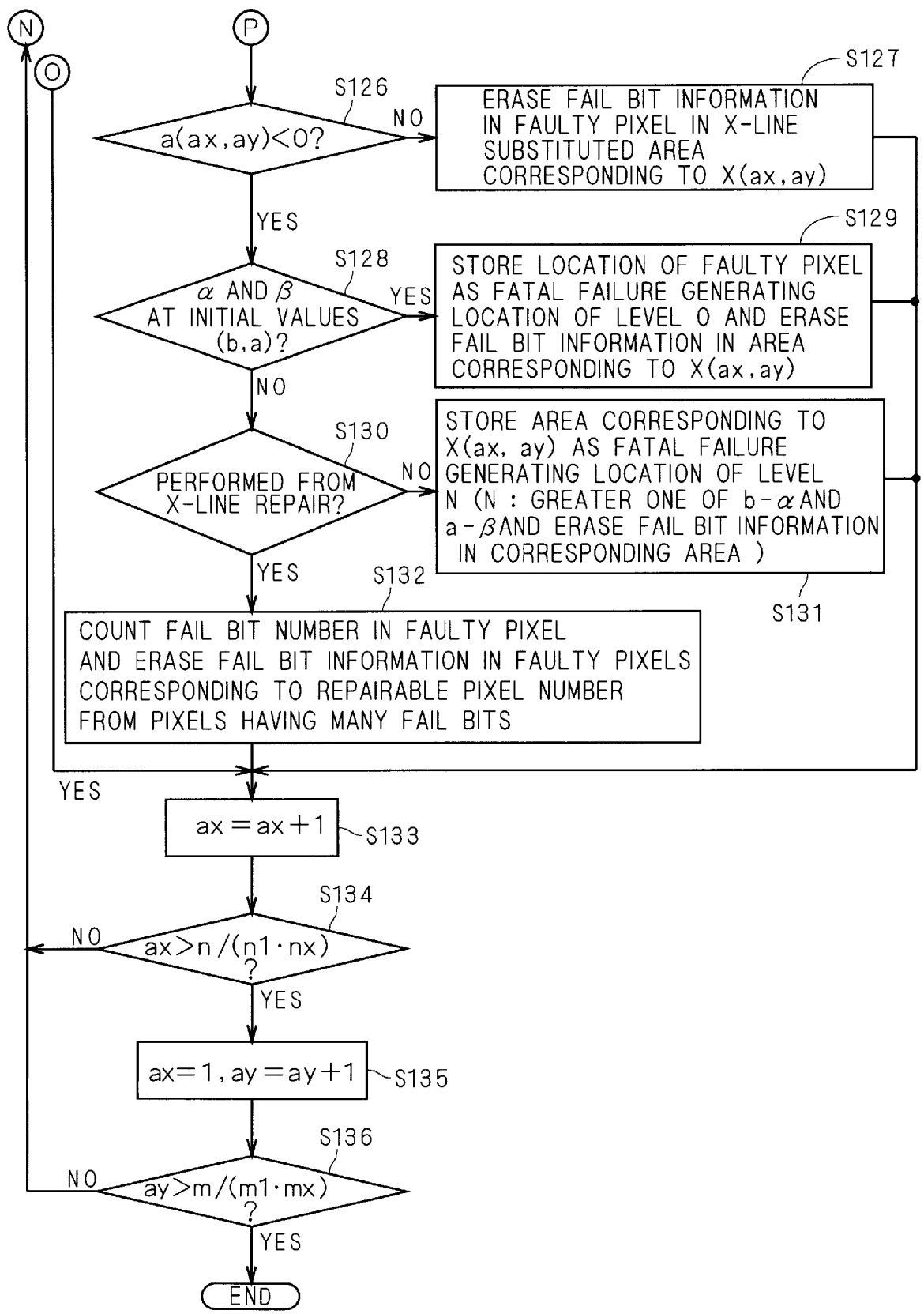

FIGS. 28 and 29 are flow charts showing the processing contents of the aforementioned steps S108a and S109b performing X-line repair judgment in consideration of failures in the Y-line direction. The X-line repair judgment ⑤ according to the embodiment 3 is substantially similar to the X-line repair judgment ① according to the embodiment 1 shown in FIGS. 4 and 5, and steps S121 to S136 of the embodiment 3 correspond to the steps S21 to S36 of the embodiment 1.

In the steps S129 and S131, however, the level of failures is taken into consideration in addition to processing contents similar to those of the steps S29 and S31.

At the step S129, a location having faulty pixels is stored in a prescribed storage part of the data analysis EWS 2 as an unrepairable failure generating location (fatal fail bit information) of "level zero", fail bit information in an X-line substituted area expressed as X(ax, ay) is erased and the process advances to a step S133 for verifying a next X-line substituted area.

At the step S131, the overall X-line substituted area expressed as X(ax, ay) is stored in the prescribed storage part of the data analysis EWS 2 as an unrepairable failure generating location (fatal fail bit information) of "level N (N: greater one of b−α and b−β)", fail bit information in this X-line substituted area is erased and the process advances to the step S133 for verifying the next X-line substituted area.

<Y-line Repair judgment ⑥>

Figure 30:
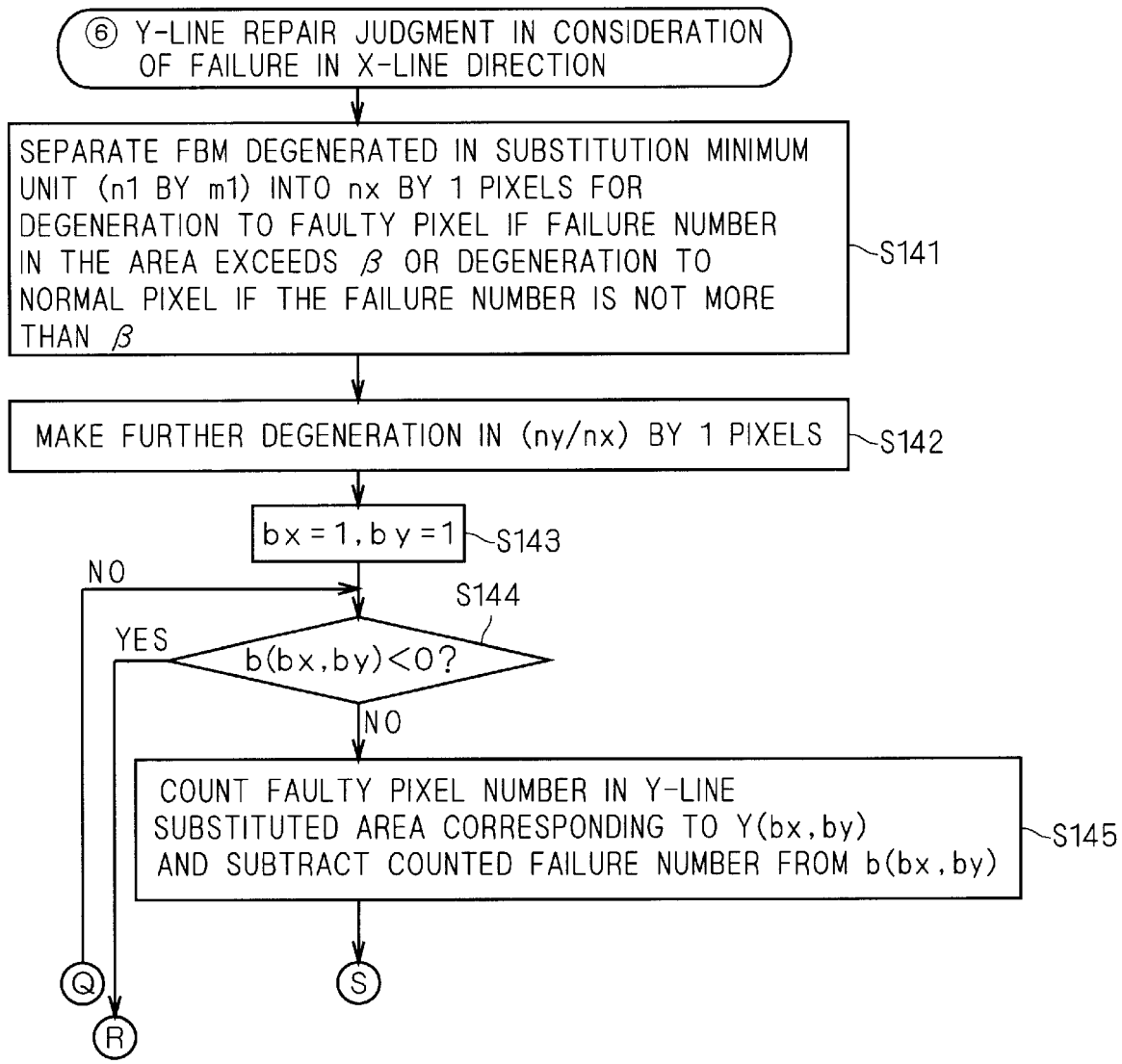

FIGS. 30 and 31 are flow charts showing the processing contents of the aforementioned steps S108b and S109a performing Y-line repair judgment in consideration of failures in the X-line direction. The Y-line repair judgment ⑥ according to the embodiment 3 is substantially similar to the Y-line repair judgment ② according to the embodiment 1 shown in FIGS. 4 and 5, and steps S141 to S156 of the embodiment 3 correspond to the steps S41 to S56 of the embodiment 1.

In the steps S149 and S151, however, the level of failures is taken into consideration in addition to processing contents similar to those of the steps S49 and S51.

At the step S149, a location having faulty pixels is stored in a prescribed storage part of the data analysis EWS 2 as an unrepairable failure generating location (fatal fail bit information) of "level zero", fail bit information in a Y-line substituted area expressed as Y(bx, by) is erased and the process advances to a step S153 for verifying a next Y-line substituted area.

At the step S151, the overall Y-line substituted area expressed as Y(bx, by) is stored in the prescribed storage part in the data analysis EWS 2 as an unrepairable failure generating location (fatal fail bit information) of "level N (N: greater one of b−α and b−β)", fail bit information in this Y-line substituted area is erased and the process advances to the step S153 for verifying the next Y-line substituted area.

<Effects>

Thus, the failure analysis system according to the embodiment 3 can automatically perform fatal failure extract processing which has been manually performed by a human operator by capturing a result of an electric test of a wafer for analysis with an LSI tester 1 and automatically executing the processing shown in FIGS. 26 and 27, 30 and 31 on the data analysis EWS 2, similarly to the embodiment 1.

In this case, the X-line repair judgment is performed in consideration of failures in the Y-line direction and the Y-line repair judgment is performed in consideration of failures in the X-line direction, whereby relatively precise fatal fail bit information can be obtained.

Further, α and β indicating the Y-line and X-line set substitutability are successively set from the maximum ability (b, a) decided by Y-line and X-line set virtual substitutability to zero, whereby correct fatal fail bit information can be obtained similarly to the embodiment 1.

In addition, the failure analysis system according to the embodiment 3 can recognize the risk of failures by classifying the fatal fail bit information per level thereby verifying the level of the fatal fail bit information, whereby sampling etc. in failure analysis can be efficiently performed on the basis of the risk.

Embodiment 4

FIG. 32 is an explanatory diagram showing an output result of fatal failure accumulation in an automatic fatal failure extraction method according to an embodiment 4 of the present invention. The output result shown in FIG. 32 corresponds to that of accumulation of fatal failures per wafer through the step S17 in the overall processing of the embodiment 1 shown in FIG. 2.

As shown in FIG. 32, a plurality of chips 38 provided on a display wafer 37 which is a measured sample are classified into fatal failure generating chips 38a and fatal failure non-generating chips 38b.

Thus, the embodiment 4 identifiably displays the fatal failure generating chips and the fatal failure non-generating chips as a wafer map on the basis of the repair judgment result according to the automatic fatal failure extraction method of the embodiment 1, whereby distribution of fatal failure chips on a wafer for analysis can be visually recognized.

The output result shown in FIG. 32 can also be output as an output result of accumulation of fatal failures per wafer through the step S76 in the overall processing of the embodiment 2 shown in FIGS. 22 and 23 or through the step S117 in the overall processing of the embodiment 3 shown in FIGS. 26 and 27 by omitting level classification and rendering fatal fail bit information common at all levels.

Embodiment 5

FIG. 33 is an explanatory diagram showing an output result of fatal failure accumulation in an automatic fatal failure extraction method according to an embodiment 5 of the present invention. The output result shown in FIG. 33 corresponds to that of accumulation of fatal failures per wafer through the step S17 in the overall processing of the embodiment 1 shown in FIG. 2.

As shown in FIG. 33, fail bit areas 39a which are faulty areas defined by fatal fail bit information are displayed on fatal failure generating chips among a plurality of chips 38 provided on a wafer 37 for display which is a measured sample.

Thus, the embodiment 5 displays the fail bit areas in the fatal failure generating chips on a wafer map on the basis of the repair judgment result according to the automatic fatal failure extraction method of the embodiment 1, whereby distribution and types (blocks, lines, bits etc.) of the fail bit areas can be visually recognized.

The output result shown in FIG. 33 can also be output as an output result of accumulation of fatal failures per wafer through the step S76 in the overall processing of the embodiment 2 shown in FIGS. 22 and 23 or through the step S117 in the overall processing of the embodiment 3 shown in FIGS. 26 and 27 by omitting level classification and rendering fatal fail bit information common at all levels.

Embodiment 6

Figure 34:
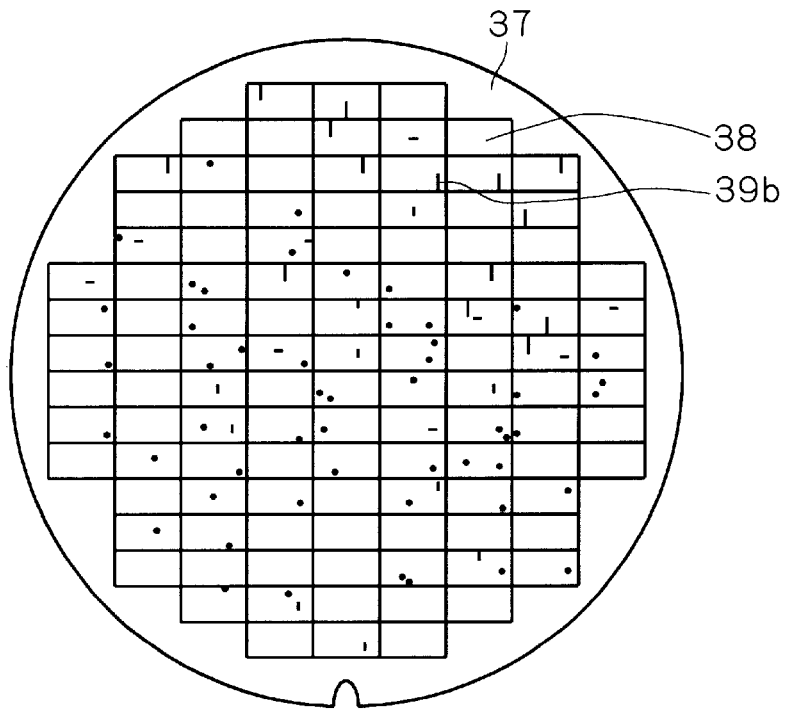
FIG. 34 is an explanatory diagram showing an output result of accumulation processing according to an embodiment 6.

FIG. 34 is an explanatory diagram showing an output result of fatal failure accumulation in an automatic fatal failure extraction method according to an embodiment 6 of the present invention. The output result shown in FIG. 34 corresponds to that of accumulation of fatal failures per wafer through the step S17 in the overall processing of the embodiment 1 shown in FIG. 2.

As shown in FIG. 34, a fail bit area 39b of a non-fatal failure is displayed on a plurality of chips 38 provided on a wafer 37 for display, which is a measured sample. The fail bit area 39b of a non-fatal failure is a faulty area defined by fail bit information, excluding fatal fail bit information, in FBM information.

Thus, the embodiment 6 displays the fail bit area of a non-fatal failure on a wafer map on the basis of a repair judgment result according to the automatic fatal failure extraction method of the embodiment 1, whereby distribution and types (blocks, lines, bits etc.) of fail bit areas not influencing the yield can be visually recognized.

The output result shown in FIG. 34 can also be output as an output result of accumulation of fatal failures per wafer through the step S76 in the overall processing of the embodiment 2 shown in FIGS. 22 and 23 or through the step S117 in the overall processing of the embodiment 3 shown in FIGS. 26 and 27 by omitting level classification and rendering fatal fail bit information common at all levels.

Embodiment 7

Figure 35:
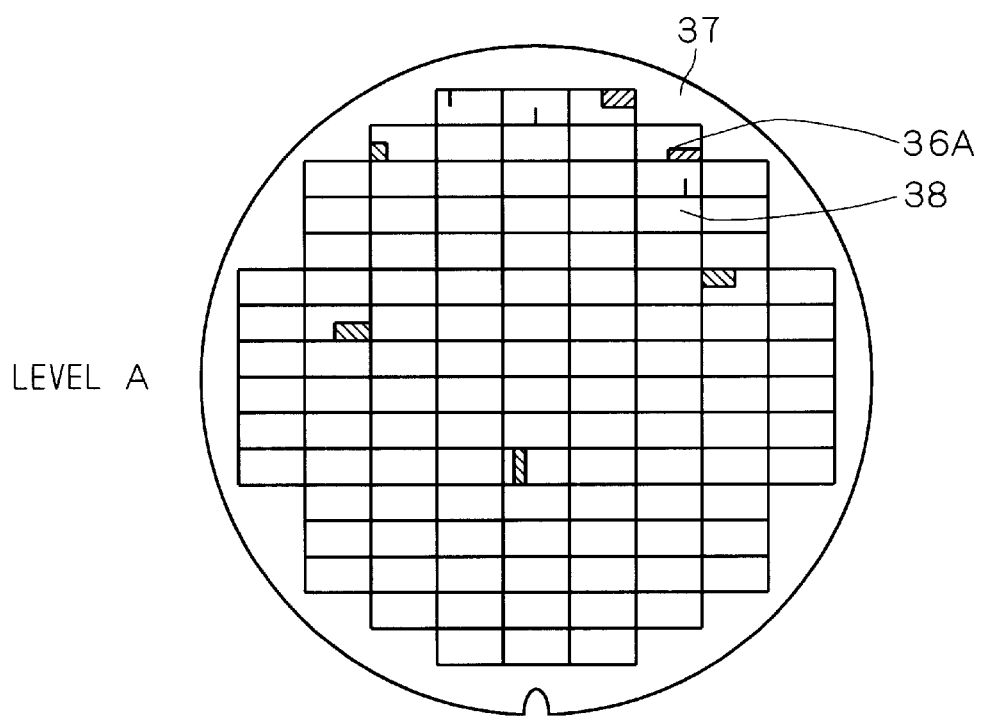

FIGS. 35 and 36 are explanatory diagrams showing output results of fatal failure accumulation in an automatic fatal failure extraction method according to an embodiment 7 of the present invention. The output results shown in FIGS. 35 and 36 correspond to those of accumulation of fatal failures per wafer through the step S76 in the overall processing of the embodiment 2 shown in FIGS. 22 and 23 or through the step S117 in the overall processing of the embodiment 3 shown in FIGS. 26 and 27.

FIG. 35 shows a fail bit area 36A defined by fatal fail bit information of a level A (A=any of 0, 1, 2, . . . ) in a plurality of chips 38 provided on a wafer 37 for display, which is a measured sample.

FIG. 36 shows a fail bit area 36B defined by fatal fail bit information of a level B (B=any of 0, 1, 2, . . . , which is different from the level A) in the plurality of chips 38 provided on the wafer 37 for display, the measured sample. The displays of FIGS. 35 and 36 may be simultaneously or separately made.

Thus, the embodiment 7 displays the fail bit areas in fatal failure generating chips on a wafer map in units of levels on the basis of a repair judgment result according to the automatic fatal failure extraction method of the embodiment 2 or 3, whereby distribution and types (blocks, lines, bits etc.) of fail bit areas can be visually recognized per level.

Embodiment 8

FIG. 37 is an explanatory diagram showing an output result of fatal failure accumulation in an automatic fatal failure extraction method according to an embodiment 8 of the present invention. The output result shown in FIG. 37 corresponds to that of accumulation of fatal failures per wafer through the step S76 in the overall processing of the embodiment 2 shown in FIGS. 22 and 23 or through the step S117 in the overall processing of the embodiment 3 shown in FIGS. 26 and 27.

As shown in FIG. 37, a fail bit area 36A defined by fatal fail bit information of a level A (A=any of 0, 1, 2, . . . ) and a fail bit area 36B defined by fatal fail bit information of a level B (B=any of 0, 1, 2, . . . , which is different from the level A) are collectively displayed in a plurality of chips 38 provided on a wafer 37 for display, which is a measured sample.

Thus, the embodiment 8 collectively displays fail bit areas defined by fatal fail bit information on a wafer map in units of a plurality of levels on the basis of a repair judgment result according to the automatic fatal failure extraction method of the embodiment 2 or 3, whereby distribution and types (blocks, lines, bits etc.) of fail bit areas can be visually recognized per level while the correlation between distribution and types of collectively displayed fail bit areas of a plurality of levels can be visually instantaneously recognized.

Embodiment 9

<Hard Structure>

Figure 38:
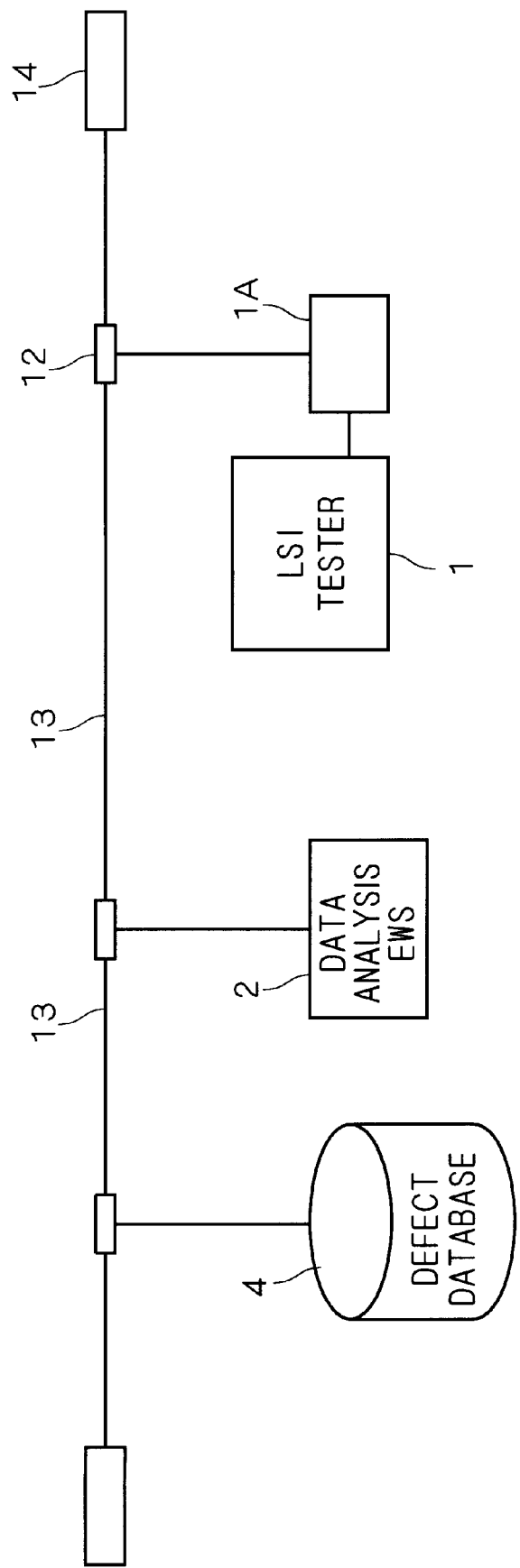
FIG. 38 is a block diagram showing the system structure of a failure analysis system according to an embodiment 9.

FIG. 38 is a block diagram showing the system structure of a failure analysis system according to an embodiment 9 of the present invention. As shown in FIG. 38, this failure analysis system is substantially similar in structure to the failure analysis system according to the embodiment 1 shown in FIG. 1, except that a defect database 4 is added.

The defect database 4 stores information of defective areas including pattern defects, foreign matter and the like on a wafer for analysis. The defective areas can be detected by an existing defect tester. The defect database 4 storing the information of the defective areas constructs a network with an LSI tester 1 and a data analysis EWS 2 through corresponding connectors 12. The remaining structure is similar to that shown in FIG. 1, and hence redundant description is omitted.

<Classification Method>

Figure 39:
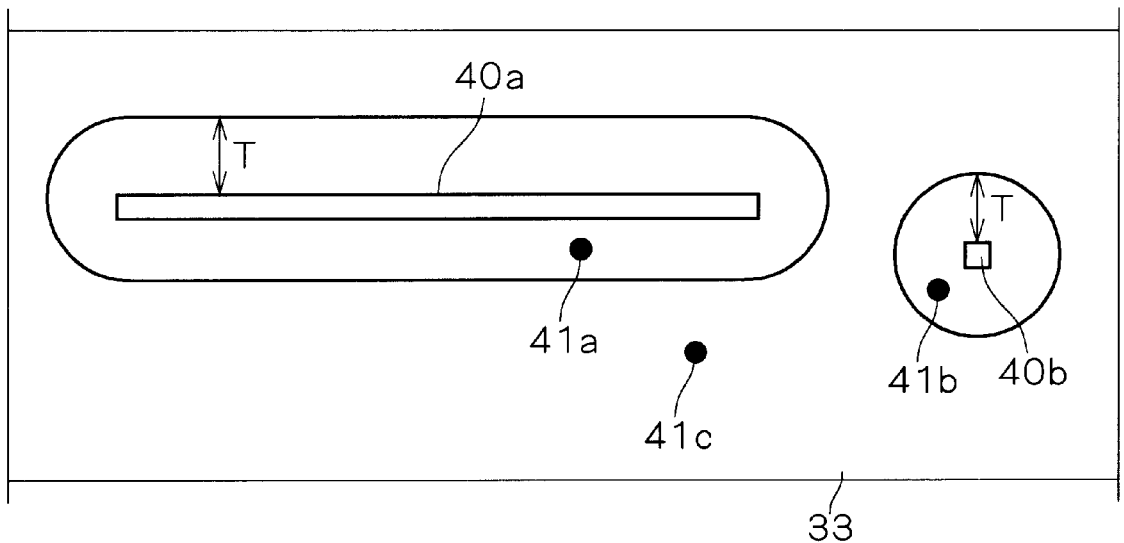
FIG. 39 is an explanatory diagram for illustrating a classification method according to the embodiment 9.

FIG. 39 is an explanatory diagram showing a classification method in fatal failure accumulation in an automatic fatal failure extraction method according to the embodiment 9. The classification method shown in FIG. 39 corresponds to that performed in accumulation of fatal failures per wafer through the step S17 in the overall processing according to the embodiment 1 shown in FIGS. 2 and 3.

As shown in FIG. 39, pattern defect areas 41a to 41c, a fail bit area 40a of a fatal failure and a fail bit area 40b of a non-fatal failure obtained from the defect database 4 are compared with each other on the same plane through the same coordinate system.

The pattern defect areas 41a to 41c are areas of pattern defects, foreign matter etc. on a wafer for analysis, as described above. The fail bit area 40a of a fatal failure and the fail bit area 40b of a non-fatal failure are obtained by transforming the coordinates of the fail bit area 39a (see FIG. 33) of a fatal failure and the fail bit area 39b (see FIG. 34) of a non-fatal failure extracted by the automatic fatal failure extraction method according to the embodiment 1 to the coordinate system for the pattern defect areas 41a to 41c.

As shown in FIG. 39, an area at a distance T from the coordinates of the fail bit areas 40a and 40b of fatal and non-fatal failures is set for judging whether or not the pattern defect areas 41a to 41c are in the range of the distance T from the fail bit area 40a or 40b of the fatal or non-fatal failure.

As shown in FIG. 39, the pattern defect area 41a present in a first area in the range of the distance T from the fail bit area 40a of a fatal failure is identified as a fatal defect, the pattern defect area 41b present in a second area in the range of the distance T from the fail bit area 40b of a non-fatal failure is identified as a non-fatal failure defect, and the pattern defect area 41c not present in the first and second areas is identified as a non-influential defect.

Thus, the embodiment 9 can classify pattern defects into fatal defects influencing the yield, non-fatal defects influencing failures while not influencing the yield and non-influential defects not influencing failures by collating a repair judgment result by the automatic fatal failure extraction method according to the embodiment 1 and pattern defect areas obtained from the defect database.

The classification method shown in FIG. 39 can also be employed for accumulation of fatal failures per wafer through the step S76 in the overall processing according to the embodiment 2 shown in FIGS. 22 and 23 or through the step S117 in the overall processing according to the embodiment 3 shown in FIGS. 26 and 27 by omitting level classification and rendering fatal fail bit information common at all levels.

Embodiment 10

Figure 40:
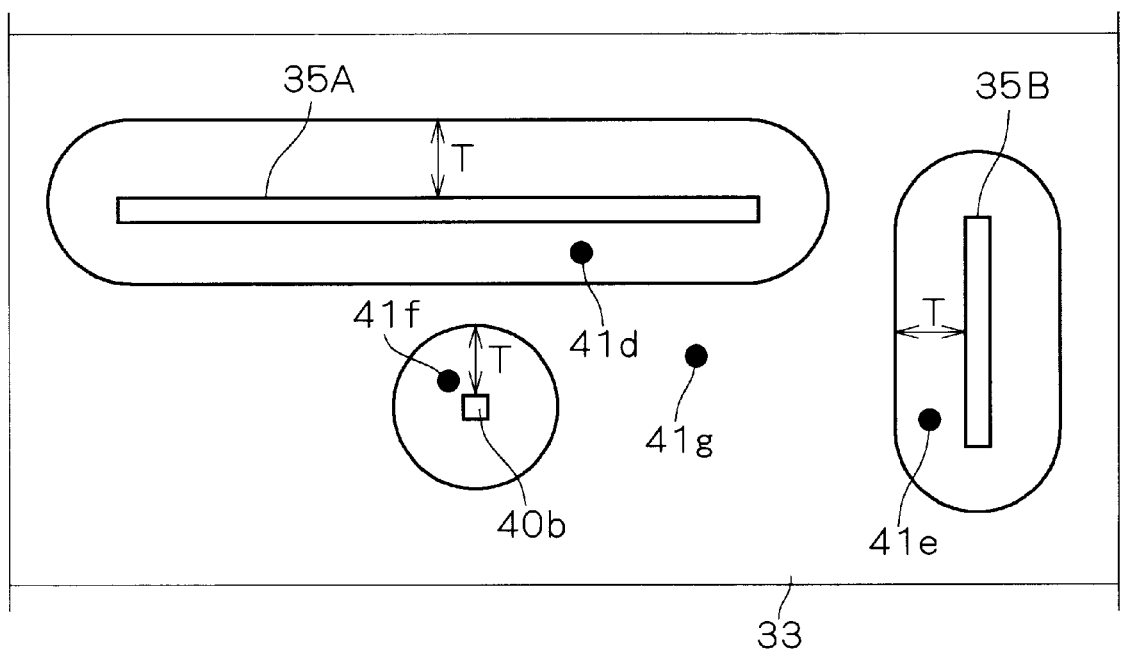
FIG. 40 is an explanatory diagram for illustrating a classification method according to an embodiment 10.

FIG. 40 is an explanatory diagram showing a classification method in fatal failure accumulation in an automatic fatal failure extraction method according to an embodiment 10 of the present invention. The classification method shown in FIG. 40 is that for an output result of accumulation of fatal failures per wafer through the step S76 in the overall processing according to the embodiment 2 shown in FIGS. 22 and 23 or through the step S117 in the overall processing according to the embodiment 3 shown in FIG. 40. The hardware structure of a failure analysis system according to the embodiment 10 is similar to that of the embodiment 9 shown in FIG. 38.

As shown in FIG. 40, pattern defect areas 41d to 41g, a fail bit area 35A of a level A (A=any of 0, 1, 2, . . . ), a fail bit area 35B of a level B (B=any of 0, 1, 2, . . . , which is different from the level A) and a fail bit area 40b of a non-fatal failure are compared with each other on the same wafer area 33.

The pattern defect areas 41d to 41g are areas of pattern defects, foreign matter etc. on a wafer for analysis, as described above. The fail bit area 35A of the level A, the fail bit area 35B of the level B and the fail bit area 40b of a non-fatal failure are obtained by transforming the coordinates of the fail bit area 36A (see FIG. 35) of the level A, the fail bit area 36B (see FIG. 36) of the level B and the fail bit area 39 of a non-fatal failure extracted by the automatic fatal failure extraction method according to the embodiment 2 or 3 to the coordinate system for the pattern defect areas 41d to 41g.

As shown in FIG. 40, an area at a distance T from the coordinates of the fail bit areas 35A and 35B of the levels A and B and the fail bit area 40b of a non-fatal failure is set for judging whether or not the pattern defect areas 41d to 41g are in the range of the distance T from the fail bit area 35A of the level A, the fail bit area 35B of the level B or the fail bit area 40b of a non-fatal failure.

As shown in FIG. 40, the pattern defect area 41d present in a first area in the range of the distance T from the fail bit area 35A of the level A is identified as a fatal defect of the level A, the pattern defect area 41e present in a second area in the range of the distance T from the fail bit area 35B of the level is identified as a fatal defect of the level B, the pattern defect area 41f present in a third area in the range of the distance T from the fail bit area 40b of a non-fatal failure is identified as a non-fatal failure defect matching with a failure other than a fatal failure, and the pattern defect area 41g not present in the first to third areas is identified as a non-influential defect.

Thus, the embodiment 10 can classify pattern defects into level-classified fatal defects influencing the yield, non-fatal failure defects influencing failures while not influencing the yield and non-influential defects not influencing failures by collating a repair judgment result by the automatic fatal failure extraction method according to the embodiment 2 or 3 and the pattern defect areas obtained from a defect database.

Embodiment 11

Figure 43:
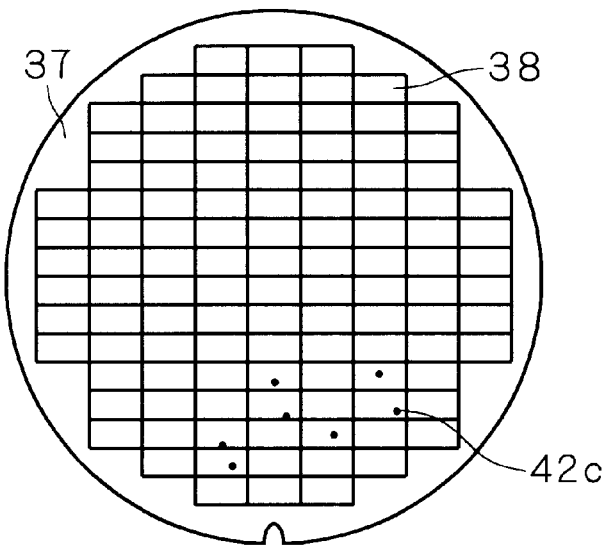

FIGS. 41 to 43 are explanatory diagrams showing output results of fatal failure accumulation in an automatic fatal failure extraction method according to an embodiment 11 of the present invention. The output results shown in FIGS. 41 to 43 are those based on the classification method according to the embodiment 9 shown in FIG. 39.

As shown in FIG. 41, a fatal defect area 42a (corresponding to the pattern defect area 41a of FIG. 39) in a plurality of chips 38 provided on a wafer 37 for display, which is a measured sample, is displayed.

As shown in FIG. 42, a non-fatal defect area 42b (corresponding to the pattern defect area 41b of FIG. 39) in the plurality of chips 38 provided on the wafer 37 for display is displayed.

As shown in FIG. 43, a non-influential defect area 42c (corresponding to the pattern defect area 41c of FIG. 39) in the plurality of chips 38 provided on the wafer 37 is displayed. The displays of FIGS. 41 to 43 may be simultaneously or separately made.

Thus, generation distribution of pattern defects per weight classified into fatal defects influencing the yield, non-fatal failure defects influencing failures while not influencing the yield and non-influential defects not influencing failures can be visually recognized according to the embodiment 11 through the identification method according to the embodiment 9.

Embodiment 12

FIGS. 44 to 47 are explanatory diagrams showing output results of fatal failure accumulation in an automatic fatal failure extraction method according to an embodiment 12 of the present invention. The output results shown in FIGS. 44 to 47 are those based on the classification method according to the embodiment 10 shown in FIG. 40.

Figure 44:
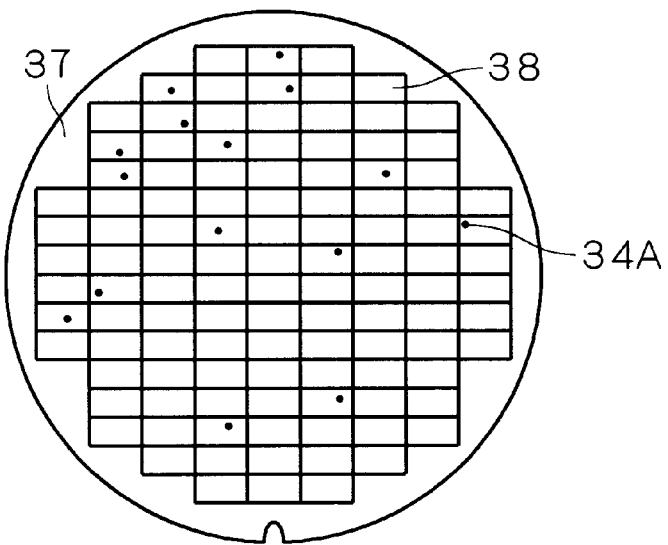
FIGS. 44 to 47 are explanatory diagrams showing output results of accumulation processing according to an embodiment 12.

As shown in FIG. 44, a fatal defect area 34A (corresponding to the pattern defect area 41d of FIG. 40) of a level A in a plurality of chips 38 provided on a wafer 37 for display, which is a measured sample, is displayed.

Figure 45:
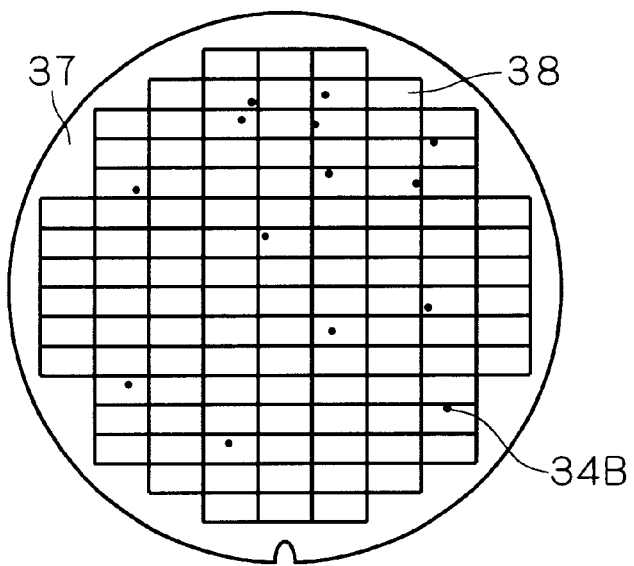

As shown in FIG. 45, a fatal defect area 34B (corresponding to the pattern defect area 41e of FIG. 40) of a level B in the plurality of chips 38 provided on the wafer 37 is displayed.

Figure 46:
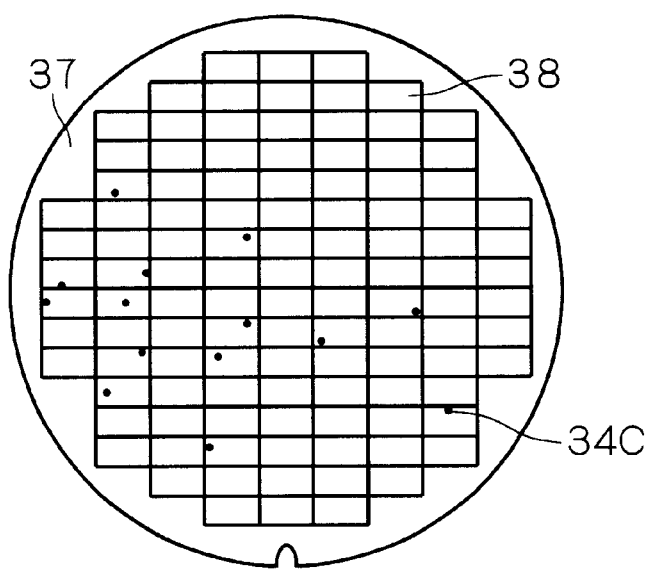

As shown in FIG. 46, a non-fatal failure defect area 34C (corresponding to the pattern defect area 41f of FIG. 40) in the plurality of chips 38 provided on the wafer 37 is displayed.

Figure 47:
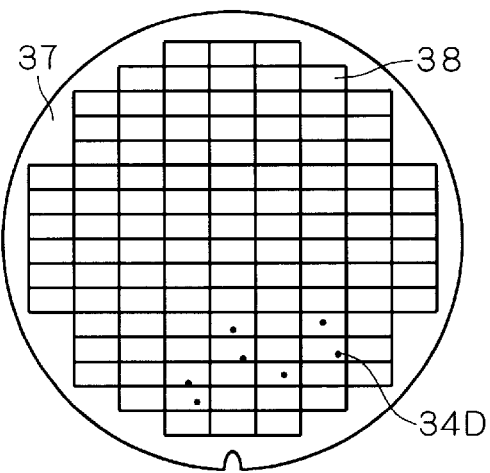

As shown in FIG. 47, a non-influential defect area 34D (corresponding to the pattern defect area 41g of FIG. 40) in the plurality of chips 38 provided on the wafer 37 is displayed. The displays of FIGS. 44 to 47 may be simultaneously or separately made.

Thus, generation distribution of pattern defects per level classified into leveled fatal defects influencing the yield, non-fatal failure defects influencing failures while not influencing the yield and non-influential defects not influencing failures can be visually recognized according to the embodiment 12 through the identification method according to the embodiment 10.

Embodiment 13

Figure 48:
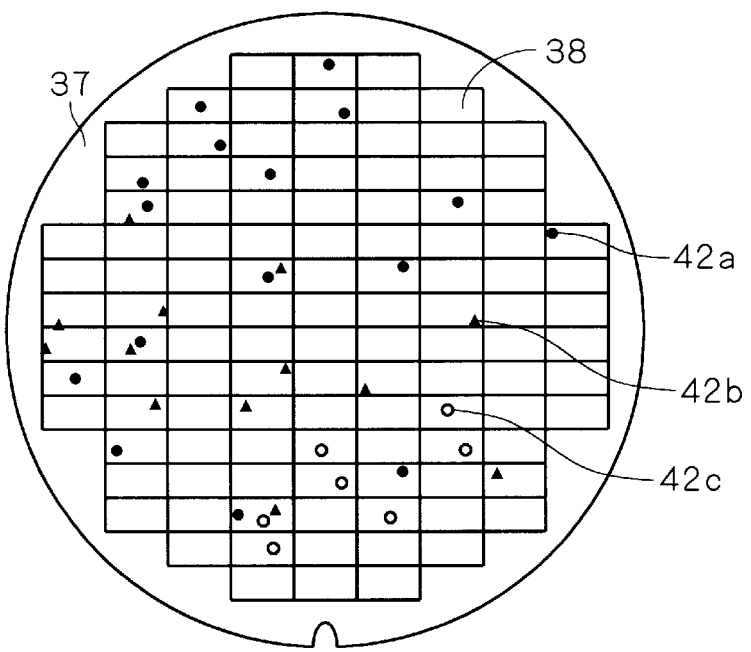
FIG. 48 is an explanatory diagram showing an output result of accumulation processing according to an embodiment 13.

FIG. 48 is an explanatory diagram showing an output result of fatal failure accumulation in an automatic fatal failure extraction method according to an embodiment 13 of the present invention. The output result shown in FIG. 48 is based on the classification method according to the embodiment 9 shown in FIG. 39.

As shown in FIG. 48, a fatal defect area 42a (corresponding to the pattern defect area 41a of FIG. 39), a non-fatal failure defect area 42b (corresponding to the pattern defect area 41b of FIG. 39) and a non-influential defect area 42c (corresponding to the pattern defect area 41c of FIG. 39) in a plurality of chips 38 provided on a wafer 37 for display, which is a measured sample, are collectively displayed.

Thus, generation distribution of pattern defects per weight can be visually instantaneously recognized according to the embodiment 13 by identifiably displaying pattern defects classified into fatal defects influencing the yield, non-fatal failure defects influencing failures while not influencing the yield and non-influential defects not influencing failures on a single wafer through the identification method according to the embodiment 9.

Embodiment 14

FIG. 49 is an explanatory diagram showing an output result of fatal failure accumulation in an automatic fatal failure extraction method according to an embodiment 14 of the present invention. The output result shown in FIG. 49 is based on the classification method according to the embodiment 10 shown in FIG. 40.

As shown in FIG. 49, a fatal defect area 34A (corresponding to the pattern defect area 41d of FIG. 40) of a level A, a fatal defect area 34B (corresponding to the pattern defect area 41e of FIG. 40) of a level B, a non-fatal failure defect area 34C (corresponding to the pattern defect area 41f of FIG. 40) and a non-influential defect area 34D (corresponding to the pattern defect area 41g of FIG. 40) in a plurality of chips 38 provided on a wafer 37, which is a measured sample, are collectively displayed.

Thus, generation distribution of pattern defects per level can be visually instantaneously recognized by identifiably displaying leveled fatal defects influencing the yield, non-fatal failure defects influencing failures while not influencing the yield and non-influential defects not influencing failures on a single wafer according to the embodiment 14 through the identification method according to the embodiment 10.

Embodiment 15

<Hard Structure>

FIG. 50 is a block diagram showing the system structure of a failure analysis system according to an embodiment 15 of the present invention. As shown in FIG. 50, this failure analysis system is substantially identical in structure to the failure analysis system according to the embodiment 1 shown in FIG. 1, except that a WT database 3 is added.

The WT database 3 stores results of a wafer test (WT) for determining non-faultiness/faultiness by electrically testing a plurality of chips on a wafer for analysis. The wafer test is performed including determination as to whether or not substitution with memory cells for substitution is possible, and hence a chip judged as faulty in the wafer test has fatal failures unrepairable with the memory cells for substitution. In the wafer test, further, categories such as malfunctions, standby current abnormality and the like are tested. The WT database 3 storing such WT information constructs a network with an LSI tester 1 and a data analysis EWS 2 through connectors 12. The remaining structure of this system is similar to that shown in FIG. 1, and hence redundant description is omitted.

<First Method>

<Overall Structure>

Figure 52:
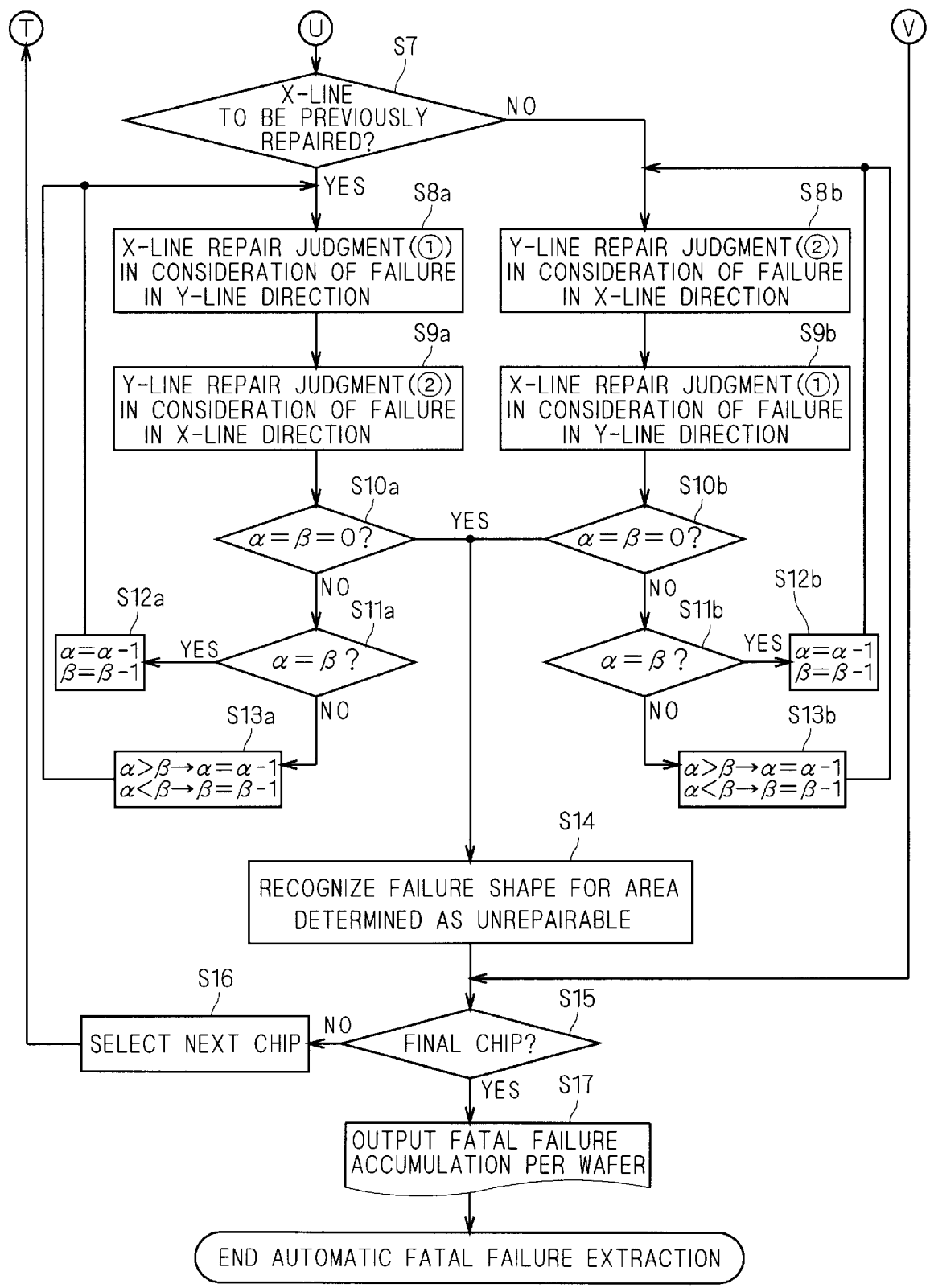

FIGS. 51 and 52 are flow charts showing the flow of the overall processing of a first method of an automatic fatal failure extraction method according to the failure analysis system of the embodiment 15. As shown in FIGS. 51 and 52, the flow of the overall processing of the first method is substantially similar to that of the overall processing of the embodiment 1 shown in FIGS. 2 and 3, except that a step S18 is added between steps S2 and S3.

At the step S18, which is carried out next to the step S2, judgment is made as to whether or not to perform automatic fatal failure extract processing through steps S3 to S14 on a chip selected at the step S2.

If the chip is judged to be subjected to automatic fatal failure extract processing at the step S18, transition to the step S3 is made for executing automatic fatal failure extract processing similar to that according to the embodiment 1. If the chip is judged not to be subjected to automatic fatal failure extract processing, transition to a step S15 is made to immediately select a next chip without performing automatic fatal failure extract processing.

For the step S18, a criterion (1) directed to only a faulty chip, (2) directed to only a faulty chip belonging to a specific category (a malfunction, standby current abnormality or the like) among faulty chips, or (3) directed to only a faulty chip belonging to any of a plurality of categories is conceivable. According to the embodiment 15, automatic fatal failure extract processing is performed only on a chip corresponding to the criterion.

<Second Method>

<Overall Processing>

Figure 53:
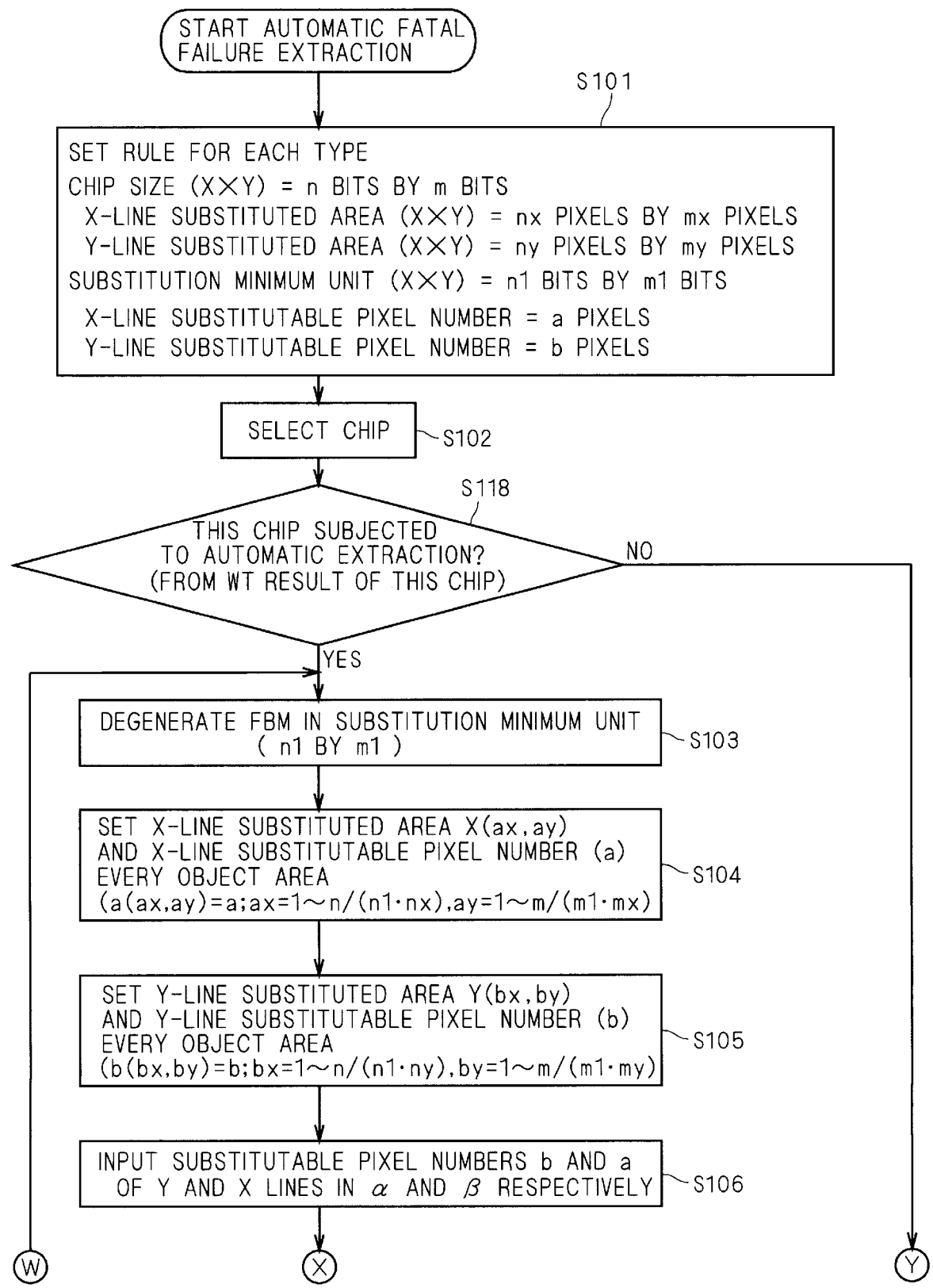
FIGS. 53 and 54 are flow charts showing a second method of the overall processing of the automatic fatal failure extraction method according to the embodiment 15.
Figure 54:
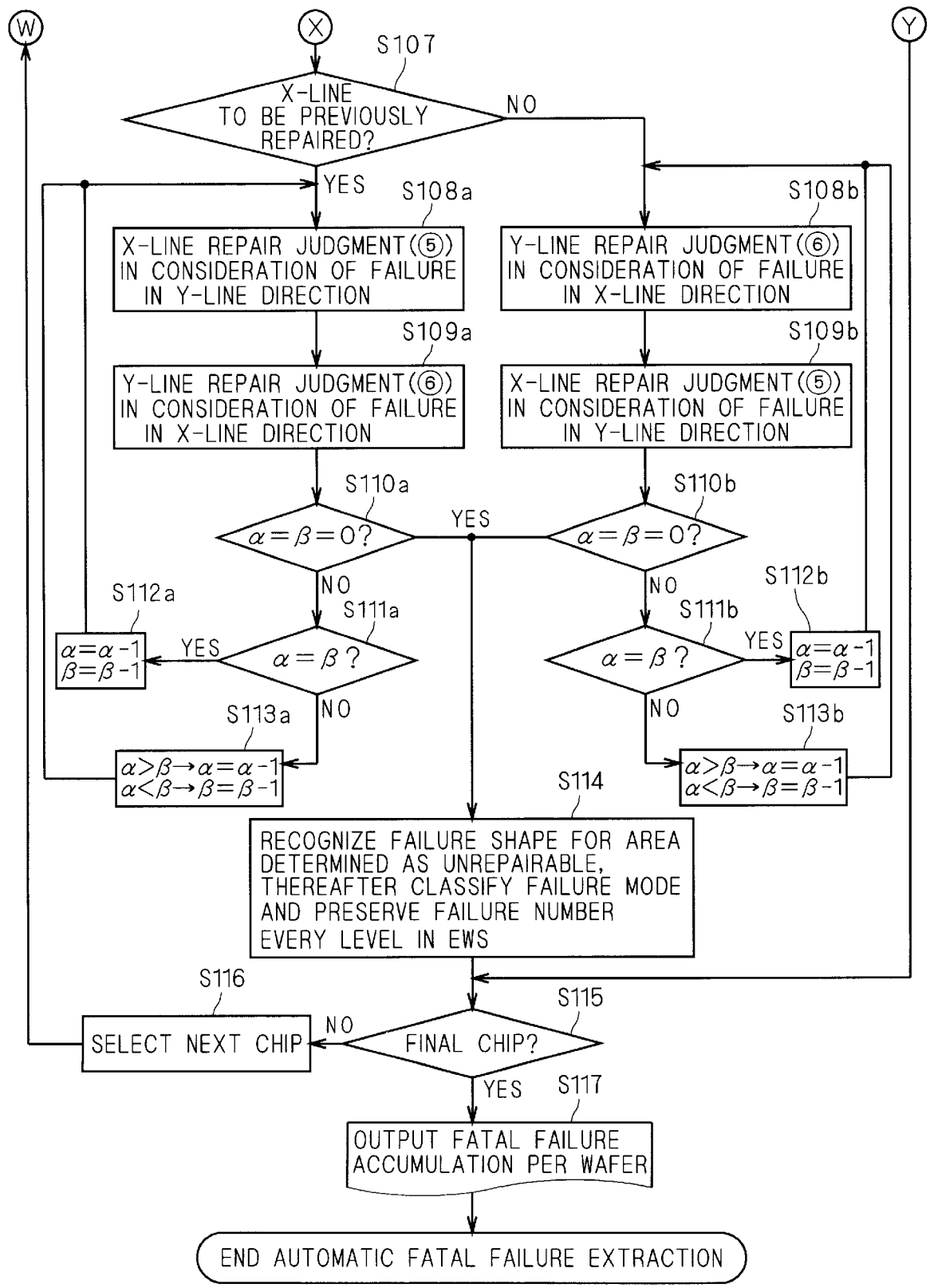

FIGS. 53 and 54 are flow charts showing the flow of the overall processing of a second method of the automatic fatal failure extraction method according to the failure analysis system of the embodiment 15. As shown in FIGS. 53 and 54, the flow of the overall processing of the second method is substantially similar to that of the overall processing of the embodiment 3 shown in FIGS. 26 and 27, except that a step S118 is added.

At the step S118, which is carried out next to a step S102, judgment is made as to whether or not to perform automatic fatal failure extract processing through steps S103 to S114 on a chip selected at the step S102 on the basis of past WT results stored in the WT database 3.

If the chip is judged to be subjected to automatic fatal failure extract processing at the step S118, transition to the step S103 is made for executing automatic fatal failure extract processing similar to that according to the embodiment 3. If the chip is judged not to be subjected to automatic fatal failure extract processing, transition to a step S115 is made to immediately select a next chip without performing automatic fatal failure extract processing.

The criterion at the step S118 is similar to that at the step S18 in the first method.

<Effects>

Thus, the automatic fatal failure extract processing can be performed in a short time by selecting chips subjected to the automatic fatal failure extract processing with reference to the WT results stored in the WT database 3 in execution of the automatic fatal failure extraction method. Further, it is also possible to automatically accumulate fatal failures per failure category by employing the aforementioned criterion (2) or (3).

Application to Recording Medium

An automatic fatal failure extract processing executing program describing any of the automatic fatal failure extraction methods according to the embodiments 1 to 15 may be recorded in a recording medium such as the CD-ROM 5 (see FIG. 1) readable by a CPU of the data analysis EWS 2, so that the data analysis EWS 2 executes the automatic fatal failure extract processing on the basis of the automatic fatal failure extract processing executing program recorded in the CD-ROM 5.

While the invention has been shown and described in detail, the foregoing description is in all aspects illustrative and not restrictive. It is therefore understood that numerous modifications and variations can be devised without departing from the scope of the invention.

What is claimed is:

1. A failure analysis system for a wafer for analysis having a plurality of chips, each of said plurality of chips having a plurality of memory cells arranged in the form of a matrix defined in an X-direction and a Y-direction and a substitute memory cell group capable of substituting for a faulty memory cell among said plurality of memory cells, said substitute memory cell group being substitutable with prescribed X-directional substitutability and prescribed Y-directional substitutability in said X- and Y-directions, said failure analysis system comprising:

memory cell test means detecting non-faultiness/faultiness of said plurality of memory cells in each of said plurality of chips and outputting a memory cell test result adding fail bit information with respect to a faulty memory cell; and data analysis means executing automatic fatal failure extract processing including consecutive processing of X-directional repair judgment processing with said X-directional substitutability in consideration of failures in said Y-direction and with said Y-directional substitutability in consideration of failures in said X-direction and fatal failure accumulation processing on the basis of said memory cell test result, wherein said X-directional repair judgment processing includes steps of:

(a) degenerating said plurality of memory cells to a plurality of X-directional substituted memory cell groups and judging non-faultiness/faultiness of each of said plurality of X-directional substituted memory cell groups on the basis of said fail bit information and predetermined Y-directional virtual substitutability in consideration of failures in said Y-direction; and (b) performing repair judgment on each of a first number of X-directional substituted memory cell groups in a range repairable on the basis of said X-directional substitutability, said first number of X-directional substituted memory cell groups being judged as faulty in said step (a) among said plurality of X-directional substituted memory cell groups, said Y-directional repair judgment processing includes steps of:

(c) degenerating said plurality of memory cells to a plurality of Y-directional substituted memory cell groups and judging non-faultiness/faultiness on each of said plurality of Y-directional substituted memory cell groups on the basis of said fail bit information and predetermined X-directional virtual substitutability in consideration of failures in said X-direction; and (d) performing repair judgment on each of a first number of Y-directional substituted memory cell groups in a range repairable on the basis of said Y-directional substitutability, said first number of Y-directional substituted memory cell groups being judged as faulty in said step (c) among said plurality of Y-directional substituted memory cell groups, and said fatal failure accumulation processing includes a step of:

(e) accumulating fatal fail bit information being fail bit information of a memory cell unrepairable through said X-directional repair judgment processing and said Y-directional repair judgment processing among said fail bit information of said memory cell test result.

2. The failure analysis system according to claim 1, wherein said Y-directional virtual substitutability includes a third number of Y-directionally set virtual substitutability set respectively from maximum ability decided by said Y-directional substitutability to zero, said X-directional virtual substitutability includes said third number of X-directionally set virtual substitutability set respectively from maximum ability decided by said X-directional substitutability to zero, said third number of X-directionally set virtual substitutability corresponds to said third number of Y-directionally set virtual substitutability, and said X-directional repair judgment processing and said Y-directional repair judgment processing are continuously performed said third number of times every said third number of Y-directionally set virtual substitutability and said X-directionally set virtual substitutability for recognizing unrepairable said fatal fail bit information per time.

3. The failure analysis system according to claim 2, wherein the level of said fatal fail bit information is set at any of a plurality of previously set levels on the basis of at least one of said Y-directionally set virtual substitutability and said X-directionally set virtual substitutability when regarded as unrepairable in said X-directional repair judgment processing and said Y-directional repair judgment processing performed said third number of times, and said fatal failure accumulation processing accumulates said fatal fail bit information in classification into said plurality of levels.

4. The failure analysis system according to claim 1, wherein said Y-directional virtual substitutability includes first to Z-th Y-directionally set virtual substitutability subjected to first to Z-th ($Z \geq 2$) level setting and said X-directional virtual substitutability includes first to Z-th X-directionally set virtual substitutability subjected to said first to Z-th level setting, said X-directional repair judgment processing and said Y-directional repair judgment processing are continuously performed Z times every said first to Z-th Y-directionally set virtual substitutability and said X-directional virtual substitutability for recognizing unrepairable said fatal fail bit information per time, said fatal fail bit information is classified as an i-th (i=any one of 1 to Z) level when recognized as unrepairable in i-th said X-directional repair judgment processing and said Y-directional repair judgment processing, and said fatal failure accumulation processing accumulates said fatal fail bit information in classification into first to Z-th levels.

5. The failure analysis system according to claim 1, wherein said fatal failure accumulation processing further includes a step of:

(f) displaying a display wafer allowing visual recognition of a chip having said fatal fail bit information among said plurality of chips, said step (f) being performed after said step (e).

6. The failure analysis system according to claim 1, wherein said fatal failure accumulation processing further includes a step of:

(f) displaying a display wafer allowing visual recognition of a faulty area defined by said fatal fail bit information, said step (f) being performed after said step (e).

7. The failure analysis system according to claim 1, wherein said fatal failure accumulation processing further includes a step of:

(f) displaying a display wafer allowing visual recognition of a faulty area defined by a non-fatal fail bit information obtained by excluding said fatal fail bit information from said fail bit information, said step (f) being performed after said step (e).

8. The failure analysis system according to claim 4, wherein said fatal failure accumulation processing further includes steps of:

(f) displaying a first display wafer allowing visual recognition of a faulty area defined by said fatal fail bit information of a first level, and (g) displaying a second display wafer allowing visual recognition of a faulty area defined by said fatal fail bit information of a second level different from said first level, said steps (f) and (g) being performed after said step (e).

9. The failure analysis system according to claim 4, wherein said fatal failure accumulation processing further includes a step of:

(f) displaying a display wafer allowing identification and visual recognition of a faulty area defined by said fatal fail bit information of a first level and a faulty area defined by said fatal fail bit information of a second level different from said first level, said step (f) being performed after said step (e).

10. The failure analysis system according to claim 1, further comprising:

defective area information supply means supplying defective area information defining a defective area including a pattern defect in said wafer for analysis, wherein said fatal failure accumulation processing further includes a step of:

(f) classifying said defective area defined by said defective area information obtained by said defective area information supply means into a fatal failure defective area existing in a first area based on a faulty area defined by said fatal fail bit information, a non-fatal failure defective area existing in a second area based on a faulty area defined by non-fatal fail bit information obtained by excluding said fatal fail bit information from said fail bit information and a non-influential defective area not existing in said first and second areas, said step (f) being performed after said step (e).

11. The failure analysis system according to claim 10, wherein said fatal failure accumulation processing further includes steps of:

(g) displaying a first display wafer allowing visual recognition of said fatal failure defective area, (h) displaying a second display wafer allowing visual recognition of said non-fatal failure defective area, and (i) displaying a third display wafer allowing visual recognition of said non-influential defective area, said steps (g), (h), and (i) being performed after said step (f).

12. The failure analysis system according to claim 10, wherein said fatal failure accumulation processing further includes a step of:

(g) displaying a display wafer allowing identification and visual recognition of each of said fatal failure defective area, said non-fatal failure defective area and said non-influential defective area, said step (g) being performed after said step (f).

13. The failure analysis system according to claim 4, further comprising:

defective area information supply means supplying defective area information defining a defective area including a pattern defect in said wafer for analysis, wherein said fatal failure accumulation processing further includes a step of:

(f) classifying said defective area defined by said defective area information obtained by said defective area information supply means into a fatal failure defective area of a first level existing in a first area based on a faulty area defined by said fatal fail bit information of a first level, a fatal failure defective area of a second level existing in a second area based on a faulty area defined by said fatal fail bit information of a second level different from said first level, a non-fatal failure defective area existing in a third area based on a faulty area defined by non-fatal fail bit information obtained by excluding said fatal fail bit information of said first and second level from said fail bit information and a non-influential defective area not existing in said first to third areas, said step (f) being performed after said step (e).

14. The failure analysis system according to claim 13, wherein said fatal failure accumulation processing further includes steps of:

(g) displaying a first display wafer allowing visual recognition of said fatal failure defective area of said first level, (h) displaying a second display wafer allowing visual recognition of said fatal failure defective area of said second level, (i) displaying a third display wafer allowing visual recognition of said non-fatal failure defective area, and (j) displaying a fourth display wafer allowing visual recognition of said non-influential defective area, said steps (g), (h), (i), and (j) being performed after said step (f).

15. The failure analysis system according to claim 13, wherein said fatal failure accumulation processing further includes a step of:

(g) displaying a display wafer allowing identification and visual recognition of each of said fatal failure defective area of said first level, said fatal failure defective area of said second level, said non-fatal failure defective area and said non-influential defective area, said step (g) being performed after said step (f).

16. The failure analysis system according to claim 1, further comprising:

wafer test information supply means supplying wafer test information including a non-faultiness/faultiness determination result of an electric characteristic after substituting said substitute memory cell group for a faulty memory cell among said plurality of memory cells to each of said plurality of chips of said wafer for analysis, wherein said automatic fatal failure extract processing further includes:

chip selection processing performed before said X-directional repair judgment processing and said Y-directional repair judgment processing for making said X-directional repair judgment processing and said Y-directional repair judgment processing performed only on a chip satisfying a prescribed condition among said plurality of chips on the basis of said wafer test information.

17. A fatal failure extraction method for a wafer for analysis having a plurality of chips, each of said plurality of chips having a plurality of memory cells arranged in the form of a matrix defined by an X-direction and a Y-direction and a substitute memory cell group substitutable for a faulty memory cell among said plurality of memory cells, said substitute memory cell group being substitutable with prescribed X-directional substitutability and prescribed Y-directional substitutability in said X-direction and said Y-direction respectively, said fatal failure extraction method comprising steps of:

(a) detecting non-faultiness/faultiness of said plurality of memory cells in each of said plurality of chips and obtaining a memory cell test result adding fail bit information with respect to a faulty memory cell;

(b) degenerating said plurality of memory cells to a plurality of X-directional substituted memory cell groups and judging non-faultiness/faultiness on each of said plurality of X-directional substituted memory cell groups on the basis of said fail bit information of said memory cell test result and predetermined Y-directional virtual substitutability in consideration of failures in said Y-direction;

(c) performing repair judgment on each of a first number of X-directional substituted memory cell groups in a range repairable on the basis of said X-directional substitutability, said first number of X-directional substituted memory cell groups being judged as faulty in said step (b) among said plurality of X-directional substituted memory cell groups;

(d) degenerating said plurality of memory cells to a plurality of Y-directional substituted memory cell groups and judging non-faultiness/faultiness on each of said plurality of Y-directional substituted memory cell groups on the basis of said fail bit information of said memory cell test result and predetermined X-directional virtual substitutability in consideration of failures in said X-direction;

(e) performing repair judgment on each of a second number of Y-directional substituted memory cell groups in a range repairable on the basis of said Y-directional substitutability, said second number of Y-directional substituted memory cell groups being-judged as faulty in said step (d) among said plurality of Y-directional substituted memory cell groups; and (f) accumulating fatal fail bit information being fail bit information of a memory cell unrepairable through said step (c) and said step (e) in said fail bit information of said memory cell test result.

18. A recording medium readable through a computer, recording a program for making a computer execute the fatal failure extraction method according to claim 17.

* * * * *

UNITED STATES PATENT AND TRADEMARK OFFICE
CERTIFICATE OF CORRECTION

PATENT NO. : 6,108,253

DATED : August 22, 2000

INVENTOR(S): Fumihito Ohta

It is certified that an error appears in the above-identified patent and that said Letters Patent is hereby corrected as shown below:

In column 31, line 10, delete "le;.5q";
             line 21, delete "le;.5q";
             line 29, delete "le;.5q";
             line 52, delete "le;.5q".
In column 32, line 7, delete "le;.5q";
             line 16, delete "le;.5q;"
             line 35, delete "le;.5q".

Signed and Sealed this

Eighth Day of May, 2001

Attest:

NICHOLAS P. GODICI

Attesting Officer      Acting Director of the United States Patent and Trademark Office